United States Patent
Paladugu et al.

(10) Patent No.: US 11,689,957 B2
(45) Date of Patent: Jun. 27, 2023

(54) QUALITY OF SERVICE SUPPORT FOR SIDELINK RELAY SERVICE

(71) Applicant: QUALCOMM Incorporated, San Diego, CA (US)

(72) Inventors: Karthika Paladugu, San Diego, CA (US); Hong Cheng, Basking Ridge, NJ (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/199,397

(22) Filed: Mar. 11, 2021

(65) Prior Publication Data
US 2021/0289391 A1    Sep. 16, 2021

Related U.S. Application Data

(60) Provisional application No. 63/023,848, filed on May 12, 2020, provisional application No. 62/989,570, filed on Mar. 13, 2020.

(51) Int. Cl.
*H04W 28/02* (2009.01)
*H04W 76/27* (2018.01)
(Continued)

(52) U.S. Cl.
CPC ... *H04W 28/0263* (2013.01); *H04W 28/0268* (2013.01); *H04W 28/24* (2013.01);
(Continued)

(58) Field of Classification Search
CPC ......... H04W 28/0263; H04W 28/0268; H04W 92/18; H04W 76/27; H04W 88/04; H04W 28/24
See application file for complete search history.

(56) References Cited

U.S. PATENT DOCUMENTS 8,107,436 B2 * 1/2012 Schiff ............... H04B 7/18534
455/12.1
10,341,009 B2 * 7/2019 Hwang ............ H04W 28/0278
(Continued)

FOREIGN PATENT DOCUMENTS

WO    WO-2017146710 A1    8/2017
WO    WO-2018016882 A1    1/2018
(Continued)

OTHER PUBLICATIONS

International Search Report and Written Opinion—PCT/US2021/022159—ISA/EPO—Jun. 22, 2021.
(Continued)

*Primary Examiner* — Parth Patel
(74) *Attorney, Agent, or Firm* — Danai Nelisile Mhembere; Holland & Hart LLP

(57) ABSTRACT

Methods, systems, and devices for wireless communications are described. A first user equipment (UE) (e.g., a relay UE) may establish a relay connection for routing communications between a network entity (e.g., a base station) and a second UE (e.g., a remote UE). The relay connection may include a sidelink connection and an access link connection. The remote UE may transmit a request to the network entity via the relay UE. The request may include a relay service code associated with the sidelink connection, as well as a request for quality of service (QoS) support for the relay connection. Based on the request, the network entity may determine a QoS configuration for the relay connection. The network entity may indicate the QoS configuration to the UEs via the relay connection. The UEs may adjust parameters of the relay connection to meet the specifications of the QoS configuration.

29 Claims, 37 Drawing Sheets

(51) Int. Cl.
*H04W 88/04* (2009.01)
*H04W 28/24* (2009.01)
*H04W 92/18* (2009.01)

(52) U.S. Cl.
CPC ........... *H04W 76/27* (2018.02); *H04W 88/04* (2013.01); *H04W 92/18* (2013.01)

(56) References Cited

U.S. PATENT DOCUMENTS

| | | | | |
|---|---|---|---|---|
| 10,904,933 | B2* | 1/2021 | Bangolae | H04W 76/27 |
| 11,197,180 | B2* | 12/2021 | Uchiyama | H04W 24/08 |
| 11,297,524 | B2* | 4/2022 | Na | H04W 36/0044 |
| 2013/0143569 | A1* | 6/2013 | Kapoor | H04W 36/14 455/436 |
| 2016/0295494 | A1* | 10/2016 | Gulati | H04B 7/15507 |
| 2016/0381720 | A1 | 12/2016 | Baek et al. | |
| 2018/0054237 | A1* | 2/2018 | Tseng | H04W 72/085 |
| 2018/0139682 | A1* | 5/2018 | Xu | H04W 40/12 |
| 2018/0234163 | A1* | 8/2018 | Yasukawa | H04B 7/15592 |
| 2018/0234524 | A1* | 8/2018 | Cheng | H04B 7/15 |
| 2018/0242381 | A1* | 8/2018 | Wei | H04W 76/14 |
| 2019/0053215 | A1* | 2/2019 | Yu | H04W 76/14 |
| 2019/0335332 | A1* | 10/2019 | Ying | H04W 40/22 |
| 2019/0387446 | A1* | 12/2019 | Xu | H04W 40/34 |
| 2020/0128447 | A1* | 4/2020 | Ying | H04W 36/08 |
| 2020/0221298 | A1* | 7/2020 | Pan | H04W 76/14 |
| 2020/0287615 | A1* | 9/2020 | Zhu | H04B 7/155 |
| 2020/0329419 | A1* | 10/2020 | Tang | H04W 40/20 |
| 2020/0396789 | A1* | 12/2020 | Hori | H04W 28/18 |
| 2021/0051758 | A1* | 2/2021 | Xu | H04W 76/27 |
| 2021/0105863 | A1* | 4/2021 | Martin | H04W 72/02 |
| 2021/0144606 | A1* | 5/2021 | Xu | H04W 76/14 |
| 2021/0144641 | A1* | 5/2021 | Sun | H04W 48/12 |
| 2021/0144783 | A1* | 5/2021 | Yang | H04W 76/14 |
| 2021/0153063 | A1* | 5/2021 | Zhang | H04L 45/24 |
| 2021/0160956 | A1* | 5/2021 | Wang | H04W 76/14 |
| 2021/0176820 | A1* | 6/2021 | Zhang | H04W 88/04 |
| 2021/0282195 | A1* | 9/2021 | Paladugu | H04W 76/10 |
| 2021/0289391 | A1* | 9/2021 | Paladugu | H04W 28/24 |
| 2021/0289392 | A1* | 9/2021 | Paladugu | H04B 7/026 |
| 2021/0368417 | A1* | 11/2021 | Luo | H04W 76/27 |
| 2022/0053584 | A1* | 2/2022 | Xu | H04W 4/40 |
| 2022/0110025 | A1* | 4/2022 | Liu | H04W 28/0236 |
| 2022/0141898 | A1 | 5/2022 | Kim et al. | |
| 2022/0295375 | A1* | 9/2022 | Wang | H04W 40/22 |
| 2022/0345879 | A1 | 10/2022 | Park et al. | |

FOREIGN PATENT DOCUMENTS

| | | |
|---|---|---|
| WO | WO-2018085568 A1 | 5/2018 |
| WO | WO-2021082715 A1 * | 5/2021 |

OTHER PUBLICATIONS

Nokia Networks: "Providing QoS in UE-to-NW Relay Scenario," 3GPP Draft, SA WG2 Meeting #110AH, S2-152864 WAS 152838_ (RELAYQOS_DISC)V6, 3rd Generation Partnership Project (3GPP), Mobile Competence Centre; 650, Route Des Lucioles; F-06921, Sophia-Antipolis Cedex; France, vol. SA WG2, No. Sophia Antipolis, France; Aug. 31, 2015-Sep. 3, 2015, Sep. 3, 2015 (Sep. 3, 2015), XP051043093, 10 pages, Retrieved from the Internet: URL: http://www.3gpp.org/ftp/tsg_sa/WG2_Arch/TSGS2_110AH_Sophia/Docs/ [retrieved on—Sep. 3, 2015], the whole document.

ZTE Corporation: "Priority in UE-to-Network Relay," 3GPP Draft, 3GPP TSG-RAN WG2 Meeting #91, R2-153770—Priority in UE to NW Relay, 3rd Generation Partnership Project (3GPP), Mobile Competence Centre; 650, Route Des Lucioles; F-06921, Sophia-Antipolis Cedex; France, vol. RAN WG2, No. Beijing, Aug. 24, 2015-Aug 28, 2015, Aug. 15, 2015 (Aug. 15, 2015), XP050994149, 3 pages, Retrieved from the Internet: URL: http://www.3gpp.org/ftp/tsg_ran/WG2_RL2/TSGR2_91/Docs/ [retrieved on Aug. 15, 2015] the whole document.

* cited by examiner

QUALITY OF SERVICE SUPPORT FOR SIDELINK RELAY SERVICE

CROSS REFERENCE

The present application for patent claims the benefit of U.S. Provisional Patent Application No. 62/989,570 by PALADUGU et al., entitled "QUALITY OF SERVICE SUPPORT FOR SIDELINK RELAY SERVICE," filed Mar. 13, 2020, and the benefit of U.S. Provisional Patent Application No. 63/023,848 by PALADUGU et al., entitled "QUALITY OF SERVICE SUPPORT FOR SIDELINK RELAY SERVICE," filed May 12, 2020, each of which is assigned to the assignee hereof, and each of which is expressly incorporated by reference herein.

INTRODUCTION

The following relates generally to wireless communications and more specifically to quality of service (QoS) support.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a first UE is described. The method may include transmitting, to a network entity, an indication for a relay connection for a second UE via the first UE, the relay connection including a first connection between the first UE and the second UE and a second connection between the first UE and the network entity; receiving, from the network entity, a QoS mapping configuration for mapping a first QoS configuration associated with a first interface to a second QoS configuration associated with a second interface, or for mapping the second QoS configuration associated with the second interface to the first QoS configuration associated with the first interface, or a combination thereof; configuring a first QoS of the first connection and a second QoS of the second connection based on the QoS mapping configuration; and routing traffic from the second UE to the network entity via the relay connection based on the first QoS and the second QoS.

An apparatus for wireless communications at a first UE is described. The apparatus may include a processor and memory coupled with the processor. The processor and the memory may be configured to transmit, to a network entity, an indication for a relay connection for a second UE via the first UE, the relay connection including a first connection between the first UE and the second UE and a second connection between the first UE and the network entity; to receive, from the network entity, a QoS mapping configuration for mapping a first QoS configuration associated with a first interface to a second QoS configuration associated with a second interface, or for mapping the second QoS configuration associated with the second interface to the first QoS configuration associated with the first interface, or a combination thereof; to configure a first QoS of the first connection and a second QoS of the second connection based on the QoS mapping configuration; and to route traffic from the second UE to the network entity via the relay connection based on the first QoS and the second QoS.

Another apparatus for wireless communications at a first UE is described. The apparatus may include means for transmitting, to a network entity, an indication for a relay connection for a second UE via the first UE, the relay connection including a first connection between the first UE and the second UE and a second connection between the first UE and the network entity; means for receiving, from the network entity, a QoS mapping configuration for mapping a first QoS configuration associated with a first interface to a second QoS configuration associated with a second interface, or for mapping the second QoS configuration associated with the second interface to the first QoS configuration associated with the first interface, or a combination thereof; means for configuring a first QoS of the first connection and a second QoS of the second connection based on the QoS mapping configuration; and means for routing traffic from the second UE to the network entity via the relay connection based on the first QoS and the second QoS.

A non-transitory computer-readable medium storing code for wireless communications at a first UE is described. The code may include instructions executable by a processor to transmit, to a network entity, an indication for a relay connection for a second UE via the first UE, the relay connection including a first connection between the first UE and the second UE and a second connection between the first UE and the network entity; to receive, from the network entity, a QoS mapping configuration for mapping a first QoS configuration associated with a first interface to a second QoS configuration associated with a second interface, or for mapping the second QoS configuration associated with the second interface to the first QoS configuration associated with the first interface, or a combination thereof; to configure a first QoS of the first connection and a second QoS of the second connection based on the QoS mapping configuration; and to route traffic from the second UE to the network entity via the relay connection based on the first QoS and the second QoS.

Some examples of the method, apparatuses, and non-transitory computer-readable medium described herein may further include operations, features, means, or instructions for receiving, from the second UE, a first request including an indication of a relay service code, where the first connection between the first UE and the second UE is associated with the relay service code and establishing a unicast sidelink connection with the second UE based on receiving the first request.

Some examples of the method, apparatuses, and non-transitory computer-readable medium described herein may further include operations, features, means, or instructions for transmitting, to the network entity, an assistance information including the indication of the relay connection and a second request for the first interface of the first connection.

In some examples of the method, apparatuses, and non-transitory computer-readable medium described herein, the first connection may include the unicast sidelink connection.

In some examples of the method, apparatuses, and non-transitory computer-readable medium described herein, the first QoS configuration may correspond to a first QoS indicator, and the second QoS configuration may correspond to a second QoS indicator.

Some examples of the method, apparatuses, and non-transitory computer-readable medium described herein may further include operations, features, means, or instructions for generating a mapping between the first interface and the second interface based on the QoS mapping configuration and determining, based on the generated mapping, a first indicator associated with the first interface, or a second indicator associated with the second interface, or both, where the first indicator is determined for the relay connection for services that have been switched from a connection between the second UE and an additional network entity to the relay connection and the second indicator is determined for the connection between the second UE and the additional network entity for services that has been switched from the relay connection to the connection between the second UE and the additional network entity.

Some examples of the method, apparatuses, and non-transitory computer-readable medium described herein may further include operations, features, means, or instructions for receiving, from the network entity, the QoS mapping configuration in a registration policy message as part of a registration procedure, a protocol data unit (PDU) session establishment response message, a PDU session modification response message, or a combination thereof.

In some examples of the method, apparatuses, and non-transitory computer-readable medium described herein, the QoS mapping configuration may be preconfigured in the first UE.

Some examples of the method, apparatuses, and non-transitory computer-readable medium described herein may further include operations, features, means, or instructions for determining a first QoS indicator for the first interface, a second QoS indicator for the second interface, or both.

Some examples of the method, apparatuses, and non-transitory computer-readable medium described herein may further include operations, features, means, or instructions for determining the first QoS indicator, the second QoS indicator, or both based on an end-to-end QoS for the relay connection.

In some examples of the method, apparatuses, and non-transitory computer-readable medium described herein, the first QoS indicator, the second QoS indicator, or both may be indicative of a QoS identifier associated with a resource type, a priority level, a packet delay budget, a packet error rate, an averaging window duration, a maximum data burst volume, or a combination thereof, for different types of services.

In some examples of the method, apparatuses, and non-transitory computer-readable medium described herein, receiving the QoS mapping configuration message may include operations, features, means, or instructions for receiving a Radio Resource Control (RRC) reconfiguration message including the QoS mapping configuration message and modifying the first connection based on the RRC reconfiguration message.

Some examples of the method, apparatuses, and non-transitory computer-readable medium described herein may further include operations, features, means, or instructions for generating a mapping configuration between the first interface and the second interface based on the RRC reconfiguration message.

In some examples of the method, apparatuses, and non-transitory computer-readable medium described herein, the mapping configuration may include a mapping between QoS flow identifiers for each interface, logical channel identifiers for each interface, or a combination thereof.

Some examples of the method, apparatuses, and non-transitory computer-readable medium described herein may further include operations, features, means, or instructions for determining a change in a QoS for the first interface of the first connection, transmitting, to the base station, assistance information indicating the determined change, and for receiving, from the base station, a modified QoS configuration for the first interface, for the second interface, or both, based on the transmitted assistance information.

Some examples of the method, apparatuses, and non-transitory computer-readable medium described herein may further include operations, features, means, or instructions for receiving, from the second UE, a reception link performance indication for the first connection, where the change in the QoS may be determined based on the reception link performance indication.

In some examples of the method, apparatuses, and non-transitory computer-readable medium described herein, the first interface may include a PC5 interface, and the second interface may include a Uu interface.

A method for wireless communications at a first network entity is described. The method may include receiving, from a second network entity, a QoS mapping configuration including a first configuration associated with a first interface of a first connection and a second configuration associated with a second interface of a second connection; receiving, from a first UE, a request including a relay service code associated with the first connection between the first UE and a second UE and an indication of a relay connection for the second UE via the first UE, the relay connection including the first connection between the first UE and the second UE and the second connection between the first UE and the first network entity; transmitting, to the first UE, a configuration message based on the QoS mapping configuration, the configuration message including the first configuration and the second configuration; and communicating with the second UE via the first UE on the relay connection.

An apparatus for wireless communications at a first network entity is described. The apparatus may include a processor and memory coupled with the processor. The processor and the memory may be configured to receive, from a second network entity, a QoS mapping configuration including a first configuration associated with a first interface of a first connection and a second configuration associated with a second interface of a second connection; to receive, from a first UE, a request including a relay service code associated with the first connection between the first UE and a second UE and an indication of a relay connection for the second UE via the first UE, the relay connection including the first connection between the first UE and the second UE and the second connection between the first UE and the first network entity; to transmit, to the first UE, a configuration message based on the QoS mapping configuration, the configuration message including the first configuration and the second configuration; and to communicate with the second UE via the first UE on the relay connection.

Another apparatus for wireless communications at a first network entity is described. The apparatus may include means for receiving, from a second network entity, a QoS mapping configuration including a first configuration associated with a first interface of a first connection and a second configuration associated with a second interface of a second connection; means for receiving, from a first UE, a request including a relay service code associated with the first connection between the first UE and a second UE and an indication of a relay connection for the second UE via the first UE, the relay connection including the first connection between the first UE and the second UE and the second connection between the first UE and the first network entity; means for transmitting, to the first UE, a configuration message based on the QoS mapping configuration, the configuration message including the first configuration and the second configuration; and means for communicating with the second UE via the first UE on the relay connection.

A non-transitory computer-readable medium storing code for wireless communications at a first network entity is described. The code may include instructions executable by a processor to receive, from a second network entity, a QoS mapping configuration including a first configuration associated with a first interface of a first connection and a second configuration associated with a second interface of a second connection; to receive, from a first UE, a request including a relay service code associated with the first connection between the first UE and a second UE and an indication of a relay connection for the second UE via the first UE, the relay connection including the first connection between the first UE and the second UE and the second connection between the first UE and the first network entity; to transmit, to the first UE, a configuration message based on the QoS mapping configuration, the configuration message including the first configuration and the second configuration; and to communicate with the second UE via the first UE on the relay connection.

Some examples of the method, apparatuses, and non-transitory computer-readable medium described herein may further include operations, features, means, or instructions for transmitting, to a network device, the request including the relay service code associated with the first connection.

In some examples of the method, apparatuses, and non-transitory computer-readable medium described herein, the request including the relay service code may be forwarded from the first UE to the network device.

In some examples of the method, apparatuses, and non-transitory computer-readable medium described herein, the request including the relay service code may be transmitted to the network device via an N2 reference interface.

Some examples of the method, apparatuses, and non-transitory computer-readable medium described herein may further include operations, features, means, or instructions for determining a first QoS indicator for the first interface, a second QoS indicator for the second interface, or both.

A method for wireless communications at a first network entity is described. The method may include receiving, from a second network entity, a request including a relay service code associated with a first connection between a first UE and a second UE and an indication of a relay connection for the second UE via the first UE, the relay connection including the first connection between the first UE and the second UE and a second connection between the first UE and the second network entity; transmitting, to a session management function (SMF) of the first network entity, a message indicating a support for a relay service code for the relay connection; receiving, from the SMF of the first network entity, a QoS mapping configuration for mapping a first QoS configuration associated with a first interface to a second QoS configuration associated with a second interface, or for mapping the second QoS configuration associated with the second interface to the first QoS configuration associated with the first interface, or a combination thereof; and transmitting, to the second network entity, an indication of a QoS configuration for the relay connection, the QoS configuration including a first configuration associated with the first interface for the first connection and a second configuration associated with the second interface for the second connection.

An apparatus for wireless communications at a first network entity is described. The apparatus may include a processor and memory coupled with the processor. The processor and the memory may be configured to receive, from a second network entity, a request including a relay service code associated with a first connection between a first UE and a second UE and an indication of a relay connection for the second UE via the first UE, the relay connection including the first connection between the first UE and the second UE and a second connection between the first UE and the second network entity; to transmit, to an SMF of the first network entity, a message indicating a support for a relay service code for the relay connection; to receive, from the SMF of the first network entity, a QoS mapping configuration for mapping a first QoS configuration associated with a first interface to a second QoS configuration associated with a second interface, or for mapping the second QoS configuration associated with the second interface to the first QoS configuration associated with the first interface, or a combination thereof; and to transmit, to the second network entity, an indication of a QoS configuration for the relay connection, the QoS configuration including a first configuration associated with the first interface for the first connection and a second configuration associated with the second interface for the second connection.

Another apparatus for wireless communications at a first network entity is described. The apparatus may include means for receiving, from a second network entity, a request including a relay service code associated with a first connection between a first UE and a second UE and an indication of a relay connection for the second UE via the first UE, the relay connection including the first connection between the first UE and the second UE and a second connection between the first UE and the second network entity; means for transmitting, to an SMF of the first network entity, a message indicating a support for a relay service code for the relay connection; means for receiving, from the SMF of the first network entity, a QoS mapping configuration for mapping a first QoS configuration associated with a first interface to a second QoS configuration associated with a second interface, or for mapping the second QoS configuration associated with the second interface to the first QoS configuration associated with the first interface, or a combination thereof; and means for transmitting, to the second network entity, an indication of a QoS configuration for the relay connection, the QoS configuration including a first configuration associated with the first interface for the first connection and a second configuration associated with the second interface for the second connection.

A non-transitory computer-readable medium storing code for wireless communications at a first network entity is described. The code may include instructions executable by a processor to receive, from a second network entity, a request including a relay service code associated with a first connection between a first UE and a second UE and an indication of a relay connection for the second UE via the first UE, the relay connection including the first connection between the first UE and the second UE and a second connection between the first UE and the second network entity; to transmit, to an SMF of the first network entity, a message indicating a support for a relay service code for the relay connection; to receive, from the SMF of the first network entity, a QoS mapping configuration for mapping a first QoS configuration associated with a first interface to a second QoS configuration associated with a second interface, or for mapping the second QoS configuration associated with the second interface to the first QoS configuration associated with the first interface, or a combination thereof; and to transmit, to the second network entity, an indication of a QoS configuration for the relay connection, the QoS configuration including a first configuration associated with the first interface for the first connection and a second configuration associated with the second interface for the second connection.

Some examples of the method, apparatuses, and non-transitory computer-readable medium described herein may further include operations, features, means, or instructions for determining a first QoS indicator for the first interface, a second QoS indicator for the second interface, or both.

In some examples of the method, apparatuses, and non-transitory computer-readable medium described herein, the first QoS indicator, the second QoS indicator, or both may be determined based on an end-to-end QoS for the relay connection.

In some examples of the method, apparatuses, and non-transitory computer-readable medium described herein, determining the QoS configuration may include operations, features, means, or instructions for determining the first UE may be authorized for supporting the relay service code based on a set of policy and charging control rules, where the QoS configuration may be determined based on the first UE being authorized to support the relay service code.

A method for wireless communications at a second UE is described. The method may include receiving, from a first network entity, a QoS mapping configuration message, the QoS mapping configuration message including a mapping between a first interface of a first connection between a first UE and the second UE and a second interface of a second connection between the first UE and a second network entity, the first connection associated with a relay service code; configuring a QoS of the first connection based on the QoS mapping configuration message; and communicating with the second network entity via the first UE using the first connection based on the configured QoS.

An apparatus for wireless communications at a second UE is described. The apparatus may include a processor and memory coupled with the processor. The processor and the memory may be configured to receive, from a first network entity, a QoS mapping configuration message, the QoS mapping configuration message including a mapping between a first interface of a first connection between a first UE and the second UE and a second interface of a second connection between the first UE and a second network entity, the first connection associated with a relay service code; to configure a QoS of the first connection based on the QoS mapping configuration message; and to communicate with the second network entity via the first UE using the first connection based on the configured QoS.

Another apparatus for wireless communications at a second UE is described. The apparatus may include means for receiving, from a first network entity, a QoS mapping configuration message, the QoS mapping configuration message including a mapping between a first interface of a first connection between a first UE and the second UE and a second interface of a second connection between the first UE and a second network entity, the first connection associated with a relay service code; means for configuring a QoS of the first connection based on the QoS mapping configuration; and means for communicating with the second network entity via the first UE using the first connection based on the configured QoS.

A non-transitory computer-readable medium storing code for wireless communications at a second UE is described. The code may include instructions executable by a processor to receive, from a first network entity, a QoS mapping configuration message, the QoS mapping configuration message including a mapping between a first interface of a first connection between a first UE and the second UE and a second interface of a second connection between the first UE and a second network entity, the first connection associated with a relay service code; to configure a QoS of the first connection based on the QoS mapping configuration message; and to communicate with the second network entity via the first UE using the first connection based on the configured QoS.

Some examples of the method, apparatuses, and non-transitory computer-readable medium described herein may further include operations, features, means, or instructions for determining one or more first QoS indicators associated with the first interface for the first connection to use for services that have been switched from a connection between the second UE and the first network entity to the first connection and/or determining or one or more second QoS indicators associated with the second interface for the connection between the second UE and the first network entity to use for services that have been switched from the first connection to the connection between the second UE and the first network entity.

In some examples of the method, apparatuses, and non-transitory computer-readable medium described herein, the one or more first QoS indicators may include one or more PC5 specific QoS indicators, one or more PC5 specific QoS identifiers, or a combination thereof, and the one or more second QoS indicators may include one or more Uu specific QoS indicators, one or more Uu specific QoS identifiers, or a combination thereof.

In some examples of the method, apparatuses, and non-transitory computer-readable medium described herein, receiving the QoS mapping configuration message may include operations, features, means, or instructions for receiving, from the first network entity, a registration policy message as part of a registration procedure, a PDU session establishment response message, a PDU session modification response message, or a combination thereof indicating the QoS mapping configuration message.

In some examples of the method, apparatuses, and non-transitory computer-readable medium described herein, the QoS mapping configuration message may be associated with a relay service or a group of relay services.

A method of wireless communications at a first UE is described. The method may include establishing a first connection between the first UE and a second UE, the first connection associated with a relay service code, transmitting, to a base station, a request including the relay service code and an indication of a relay connection for the second UE via the first UE, the relay connection including the first connection between the first UE and the second UE and a second connection between the first UE and the base station, receiving, from the base station, a configuration message in response to transmitting the request, the configuration message including a first configuration associated with a first interface of the first connection and a second configuration associated with a second interface of the second connection, determining a QoS configuration based on the first configuration and the second configuration, and routing traffic from the second UE to the base station via the relay connection based on the QoS configuration.

An apparatus for wireless communications at a first UE is described. The apparatus may include a processor and memory coupled with the processor. The processor and the memory may be configured to establish a first connection between the first UE and a second UE, the first connection associated with a relay service code, transmit, to a base station, a request including the relay service code and an indication of a relay connection for the second UE via the first UE, the relay connection including the first connection between the first UE and the second UE and a second connection between the first UE and the base station, receive, from the base station, a configuration message in response to transmitting the request, the configuration message including a first configuration associated with a first interface of the first connection and a second configuration associated with a second interface of the second connection, determine a QoS configuration based on the first configuration and the second configuration, and route traffic from the second UE to the base station via the relay connection based on the QoS configuration.

Another apparatus for wireless communications at a first UE is described. The apparatus may include means for establishing a first connection between the first UE and a second UE, the first connection associated with a relay service code, transmitting, to a base station, a request including the relay service code and an indication of a relay connection for the second UE via the first UE, the relay connection including the first connection between the first UE and the second UE and a second connection between the first UE and the base station, receiving, from the base station, a configuration message in response to transmitting the request, the configuration message including a first configuration associated with a first interface of the first connection and a second configuration associated with a second interface of the second connection, determining a QoS configuration based on the first configuration and the second configuration, and routing traffic from the second UE to the base station via the relay connection based on the QoS configuration.

A non-transitory computer-readable medium storing code for wireless communications at a first UE is described. The code may include instructions executable by a processor to establish a first connection between the first UE and a second UE, the first connection associated with a relay service code, transmit, to a base station, a request including the relay service code and an indication of a relay connection for the second UE via the first UE, the relay connection including the first connection between the first UE and the second UE and a second connection between the first UE and the base station, receive, from the base station, a configuration message in response to transmitting the request, the configuration message including a first configuration associated with a first interface of the first connection and a second configuration associated with a second interface of the second connection, determine a QoS configuration based on the first configuration and the second configuration, and route traffic from the second UE to the base station via the relay connection based on the QoS configuration.

In some examples of the method, apparatuses, and non-transitory computer-readable medium described herein, establishing the first connection between the first UE and the second UE may include operations, features, means, or instructions for receiving, from the second UE, a relaying request including an indication of the relay service code, and establishing a unicast sidelink connection with the second UE based on receiving the relaying request.

Some examples of the method, apparatuses, and non-transitory computer-readable medium described herein may further include operations, features, means, or instructions for transmitting, to the base station, an assistance information including the indication of the relay connection and a QoS indicator request for the first interface of the first connection.

In some examples of the method, apparatuses, and non-transitory computer-readable medium described herein, the first connection includes the unicast sidelink connection.

Some examples of the method, apparatuses, and non-transitory computer-readable medium described herein may further include operations, features, means, or instructions for determining a mapping configuration for a first indicator associated with the first interface to a second indicator associated with the second interface, for the second indicator associated with the second interface to the first indicator associated with the first interface, or a combination thereof, where the request transmitted to the base station further includes the mapping configuration.

Some examples of the method, apparatuses, and non-transitory computer-readable medium described herein may further include operations, features, means, or instructions for generating a mapping between the first interface and the second interface based on the mapping configuration, wherein the mapping is used to determine the first indicator for the relay connection for services that have been switched from a connection between the second UE and an additional base station to the relay connection, the second indicator for the connection between the second UE and the additional base station for services that have been switched from the relay connection to the connection between the second UE and the additional base station, or a combination thereof.

Some examples of the method, apparatuses, and non-transitory computer-readable medium described herein may further include operations, features, means, or instructions for receiving, from the base station, the mapping configuration in a registration policy message as part of a registration procedure, a PDU session establishment response message, a PDU session modification response message, or a combination thereof.

In some examples of the method, apparatuses, and non-transitory computer-readable medium described herein, the mapping configuration may be preconfigured in the first UE.

Some examples of the method, apparatuses, and non-transitory computer-readable medium described herein may further include operations, features, means, or instructions for determining a first QoS indicator for the first interface, a second QoS indicator for the second interface, or both.

In some examples of the method, apparatuses, and non-transitory computer-readable medium described herein, the first QoS indicator, the second QoS indicator, or both may be determined based on an end-to-end QoS for the relay connection.

In some examples of the method, apparatuses, and non-transitory computer-readable medium described herein, the first QoS indicator, the second QoS indicator, or both may be indicative of a resource type, a priority level, a packet delay budget, a packet error rate, an averaging window duration, a maximum data burst volume, or a combination thereof for different types of services.

In some examples of the method, apparatuses, and non-transitory computer-readable medium described herein, receiving the configuration message may include operations, features, means, or instructions for receiving an RRC reconfiguration message including the configuration message, and modifying the first connection based on the RRC reconfiguration message.

Some examples of the method, apparatuses, and non-transitory computer-readable medium described herein may further include operations, features, means, or instructions for generating a mapping configuration between the first interface and the second interface based on the RRC reconfiguration message.

In some examples of the method, apparatuses, and non-transitory computer-readable medium described herein, the mapping configuration includes a mapping between QoS flow identifiers for each interface, logical channel (LCH) identifiers for each interface, or a combination thereof.

Some examples of the method, apparatuses, and non-transitory computer-readable medium described herein may further include operations, features, means, or instructions for determining a change in a QoS for the first interface of the first connection, transmitting, to the base station, assistance information indicating the determined change, and receiving, from the base station, a modified QoS configuration for the first interface, for the second interface, or both, based on the transmitted assistance information.

Some examples of the method, apparatuses, and non-transitory computer-readable medium described herein may further include operations, features, means, or instructions for receiving, from the second UE, a reception link performance indication for the first connection, where the change in the QoS may be determined based on the reception link performance indication.

In some examples of the method, apparatuses, and non-transitory computer-readable medium described herein, the first interface may include a PC5 interface, and the second interface may include a Uu interface.

Some examples of the method, apparatuses, and non-transitory computer-readable medium described herein may further include operations, features, means, or instructions for establishing a unicast link with the second user equipment, where the relay connection may be established based on establishing the unicast link.

In some examples of the method, apparatuses, and non-transitory computer-readable medium described herein, the request includes a PDU session establishment request or a PDU session modification request.

A method of wireless communications at a base station is described. The method may include receiving, from a first UE, a request including a relay service code associated with a first connection between the first UE and a second UE and an indication of a relay connection for the second UE via the first UE, the relay connection including the first connection between the first UE and the second UE and a second connection between the first UE and the base station, determining a QoS configuration for the relay connection, the QoS configuration including a first configuration associated with a first interface of the first connection and a second configuration associated with a second interface of the second connection, transmitting, to the first UE, a configuration message based on determining the QoS configuration, the configuration message including the first configuration and the second configuration, and communicating with the second UE via the first UE on the relay connection based on the determined QoS configuration.

An apparatus for wireless communications at a base station is described. The apparatus may include a processor and memory coupled with the processor. The processor and the memory may be configured to receive, from a first UE, a request including a relay service code associated with a first connection between the first UE and a second UE and an indication of a relay connection for the second UE via the first UE, the relay connection including the first connection between the first UE and the second UE and a second connection between the first UE and the base station, determine a QoS configuration for the relay connection, the QoS configuration including a first configuration associated with a first interface of the first connection and a second configuration associated with a second interface of the second connection, transmit, to the first UE, a configuration message based on determining the QoS configuration, the configuration message including the first configuration and the second configuration, and communicate with the second UE via the first UE on the relay connection based on the determined QoS configuration.

Another apparatus for wireless communications at a base station is described. The apparatus may include means for receiving, from a first UE, a request including a relay service code associated with a first connection between the first UE and a second UE and an indication of a relay connection for the second UE via the first UE, the relay connection including the first connection between the first UE and the second UE and a second connection between the first UE and the base station, determining a QoS configuration for the relay connection, the QoS configuration including a first configuration associated with a first interface of the first connection and a second configuration associated with a second interface of the second connection, transmitting, to the first UE, a configuration message based on determining the QoS configuration, the configuration message including the first configuration and the second configuration, and communicating with the second UE via the first UE on the relay connection based on the determined QoS configuration.

A non-transitory computer-readable medium storing code for wireless communications at a base station is described. The code may include instructions executable by a processor to receive, from a first UE, a request including a relay service code associated with a first connection between the first UE and a second UE and an indication of a relay connection for the second UE via the first UE, the relay connection including the first connection between the first UE and the second UE and a second connection between the first UE and the base station, determine a QoS configuration for the relay connection, the QoS configuration including a first configuration associated with a first interface of the first connection and a second configuration associated with a second interface of the second connection, transmit, to the first UE, a configuration message based on determining the QoS configuration, the configuration message including the first configuration and the second configuration, and communicate with the second UE via the first UE on the relay connection based on the determined QoS configuration.

Some examples of the method, apparatuses, and non-transitory computer-readable medium described herein may further include operations, features, means, or instructions for transmitting, to a network device, the request including the relay service code associated with the first connection.

In some examples of the method, apparatuses, and non-transitory computer-readable medium described herein, the request including the relay service code may be forwarded from the first UE to the network device.

In some examples of the method, apparatuses, and non-transitory computer-readable medium described herein, the request including the relay service code may be transmitted to the network device via an N2 reference interface.

In some examples of the method, apparatuses, and non-transitory computer-readable medium described herein, determining the QoS configuration may include operations, features, means, or instructions for receiving, from a network device, an indication of the QoS configuration.

In some examples of the method, apparatuses, and non-transitory computer-readable medium described herein, the indication of the QoS configuration may be received in a PDU session request during PDU session establishment or modification.

Some examples of the method, apparatuses, and non-transitory computer-readable medium described herein may further include operations, features, means, or instructions for determining a first QoS indicator for the first interface, a second QoS indicator for the second interface, or both.

In some examples of the method, apparatuses, and non-transitory computer-readable medium described herein, the first QoS indicator, the second QoS indicator, or both may be determined based on an end-to-end QoS for the relay connection.

In some examples of the method, apparatuses, and non-transitory computer-readable medium described herein, the first QoS indicator, the second QoS indicator, or both may be indicative of a resource type, a priority level, a packet delay budget, a packet error rate, an averaging window duration, a maximum data burst volume, or a combination thereof for different types of services.

Some examples of the method, apparatuses, and non-transitory computer-readable medium described herein may further include operations, features, means, or instructions for determining to modify a QoS for the first interface of the first connection based on the QoS configuration, and transmitting, to the first UE, an indication of the modified QoS.

Some examples of the method, apparatuses, and non-transitory computer-readable medium described herein may further include operations, features, means, or instructions for determining a mapping configuration for a first indicator associated with the first interface to a second indicator associated with the second interface, where the request transmitted to the base station further includes the mapping configuration, and transmitting, to the first UE, the second UE, or both, the mapping configuration in a registration policy message as part of a registration procedure, a PDU session establishment response message, a PDU session modification response message, or a combination thereof.

In some examples of the method, apparatuses, and non-transitory computer-readable medium described herein, determining the mapping configuration may include operations, features, means, or instructions for receiving the mapping configuration from a network device.

Some examples of the method, apparatuses, and non-transitory computer-readable medium described herein may further include operations, features, means, or instructions for receiving, from the first UE, assistance information indicating a change in a QoS for the first interface of the first connection, and transmitting, to the first UE, a modified QoS configuration for the first interface, for the second interface, or both, based on the received assistance information.

In some examples of the method, apparatuses, and non-transitory computer-readable medium described herein, the first interface may include a PC5 interface, and the second interface may include a Uu interface.

In some examples of the method, apparatuses, and non-transitory computer-readable medium described herein, the request includes a PDU session establishment request, or a PDU session modification request, or a sidelink assistance information message from the first UE, the second UE, or both.

In some examples of the method, apparatuses, and non-transitory computer-readable medium described herein, the configuration message includes an RRC reconfiguration message.

A method of wireless communications at a network device is described. The method may include receiving, from a base station and at an access and mobility management function (AMF) of the network device, a request including a relay service code associated with a first connection between a first UE and a second UE and an indication of a relay connection for the second UE via the first UE, the relay connection including the first connection between the first UE and the second UE and a second connection between the first UE and the base station, transmitting, to an SMF of the network device, a message indicating a support for the relay service code, determining a QoS configuration for the relay connection, the QoS configuration including a first configuration associated with a first interface of the first connection and a second configuration associated with a second interface of the second connection, and transmitting, to the base station, an indication of the QoS configuration.

An apparatus for wireless communications at a network device is described. The apparatus may include a processor and memory coupled with the processor. The processor and the memory may be configured to receive, from a base station and at an AMF of the network device, a request including a relay service code associated with a first connection between a first UE and a second UE and an indication of a relay connection for the second UE via the first UE, the relay connection including the first connection between the first UE and the second UE and a second connection between the first UE and the base station, transmit, to an SMF of the network device, a message indicating a support for the relay service code, determine a QoS configuration for the relay connection, the QoS configuration including a first configuration associated with a first interface of the first connection and a second configuration associated with a second interface of the second connection, and transmit, to the base station, an indication of the QoS configuration.

Another apparatus for wireless communications at a network device is described. The apparatus may include means for receiving, from a base station and at an AMF of the network device, a request including a relay service code associated with a first connection between a first UE and a second UE and an indication of a relay connection for the second UE via the first UE, the relay connection including the first connection between the first UE and the second UE and a second connection between the first UE and the base station, transmitting, to an SMF of the network device, a message indicating a support for the relay service code, determining a QoS configuration for the relay connection, the QoS configuration including a first configuration associated with a first interface of the first connection and a second configuration associated with a second interface of the second connection, and transmitting, to the base station, an indication of the QoS configuration.

A non-transitory computer-readable medium storing code for wireless communications at a network device is described. The code may include instructions executable by a processor to receive, from a base station and at an AMF of the network device, a request including a relay service code associated with a first connection between a first UE and a second UE and an indication of a relay connection for the second UE via the first UE, the relay connection including the first connection between the first UE and the second UE and a second connection between the first UE and the base station, transmit, to an SMF of the network device, a message indicating a support for the relay service code, determine a QoS configuration for the relay connection, the QoS configuration including a first configuration associated with a first interface of the first connection and a second configuration associated with a second interface of the second connection, and transmit, to the base station, an indication of the QoS configuration.

Some examples of the method, apparatuses, and non-transitory computer-readable medium described herein may further include operations, features, means, or instructions for determining a first QoS indicator for the first interface, a second QoS indicator for the second interface, or both.

In some examples of the method, apparatuses, and non-transitory computer-readable medium described herein, the first QoS indicator, the second QoS indicator, or both may be determined based on an end-to-end QoS for the relay connection.

In some examples of the method, apparatuses, and non-transitory computer-readable medium described herein, the first QoS indicator, the second QoS indicator, or both may be indicative of a resource type, a priority level, a packet delay budget, a packet error rate, an averaging window duration, a maximum data burst volume, or a combination thereof for different types of services.

In some examples of the method, apparatuses, and non-transitory computer-readable medium described herein, determining the QoS configuration further may include operations, features, means, or instructions for determining the first UE may be authorized for supporting the relay service code based on a set of policy and charging control rules, where the QoS configuration may be determined based on the first UE being authorized to support the relay service code.

In some examples of the method, apparatuses, and non-transitory computer-readable medium described herein, transmitting the message indicating the support for the relay service code may include operations, features, means, or instructions for transmitting, to the SMF of the network device, a network slice management function (Nsmf) message including the support for the relay service code.

Some examples of the method, apparatuses, and non-transitory computer-readable medium described herein may further include operations, features, means, or instructions for performing a QoS modification procedure based on a change in a QoS for the first connection, the second connection, or both.

In some examples of the method, apparatuses, and non-transitory computer-readable medium described herein, the indication of the QoS configuration includes a PDU session establishment request or a PDU session modification request.

In some examples of the method, apparatuses, and non-transitory computer-readable medium described herein, the indication of the QoS configuration includes an end-to-end QoS configuration for the first connection and the second connection.

A method of wireless communications at a second UE is described. The method may include establishing a first connection between a first UE and the second UE, the first connection associated with a relay service code, receiving, from a first base station, a mapping configuration message, the mapping configuration message including a mapping between a first interface of the first connection and a second interface of a second connection between the first UE and a second base station, determining a quality of service configuration based on the mapping configuration message, and communicating with the second base station via the first UE using the first connection based on the quality of service configuration.

An apparatus for wireless communications at a network device is described. The apparatus may include a processor and memory coupled with the processor. The processor and the memory may be configured to establish a first connection between a first UE and the second UE, the first connection associated with a relay service code, receive, from a first base station, a mapping configuration message, the mapping configuration message including a mapping between a first interface of the first connection and a second interface of a second connection between the first UE and a second base station, determine a quality of service configuration based on the mapping configuration message, and communicate with the second base station via the first UE using the first connection based on the quality of service configuration.

Another apparatus for wireless communications at a network device is described. The apparatus may include means for establishing a first connection between a first UE and the second UE, the first connection associated with a relay service code, receiving, from a first base station, a mapping configuration message, the mapping configuration message including a mapping between a first interface of the first connection and a second interface of a second connection between the first UE and a second base station, determining a quality of service configuration based on the mapping configuration message, and communicating with the second base station via the first UE using the first connection based on the quality of service configuration.

A non-transitory computer-readable medium storing code for wireless communications at a network device is described. The code may include instructions executable by a processor to establish a first connection between a first UE and the second UE, the first connection associated with a relay service code, receive, from a first base station, a mapping configuration message, the mapping configuration message including a mapping between a first interface of the first connection and a second interface of a second connection between the first UE and a second base station, determine a quality of service configuration based on the mapping configuration message, and communicate with the second base station via the first UE using the first connection based on the quality of service configuration.

Some examples of the method, apparatuses, and non-transitory computer-readable medium described herein may further include operations, features, means, or instructions for determining one or more first QoS indicators for the first connection to use for services that have been switched from a connection between the second UE and the first base station to the first connection, one or more second QoS indicators for the second interface for the connection between the second UE and the first base station to use for services that have been switched from the first connection to the connection between the second UE and the first base station, or a combination thereof.

In some examples of the method, apparatuses, and non-transitory computer-readable medium described herein, the one or more first QoS indicators may include one or more PC5 specific QoS indicators, one or more PC5 specific QoS identifiers, or a combination thereof, and the one or more second QoS indicators may include one or more Uu specific quality of service indicators, one or more Uu specific quality of service identifiers, or a combination thereof.

In some examples of the method, apparatuses, and non-transitory computer-readable medium described herein, receiving the mapping configuration message may include operations, features, means, or instructions for receiving, from the first base station, a registration policy message as part of a registration procedure, a PDU session establishment response message, a PDU session modification response message, or a combination thereof indicating the mapping configuration message.

In some examples of the method, apparatuses, and non-transitory computer-readable medium described herein, the first interface may include a PC5 interface, and the second interface may include a Uu interface.

DETAILED DESCRIPTION

Figure 1:
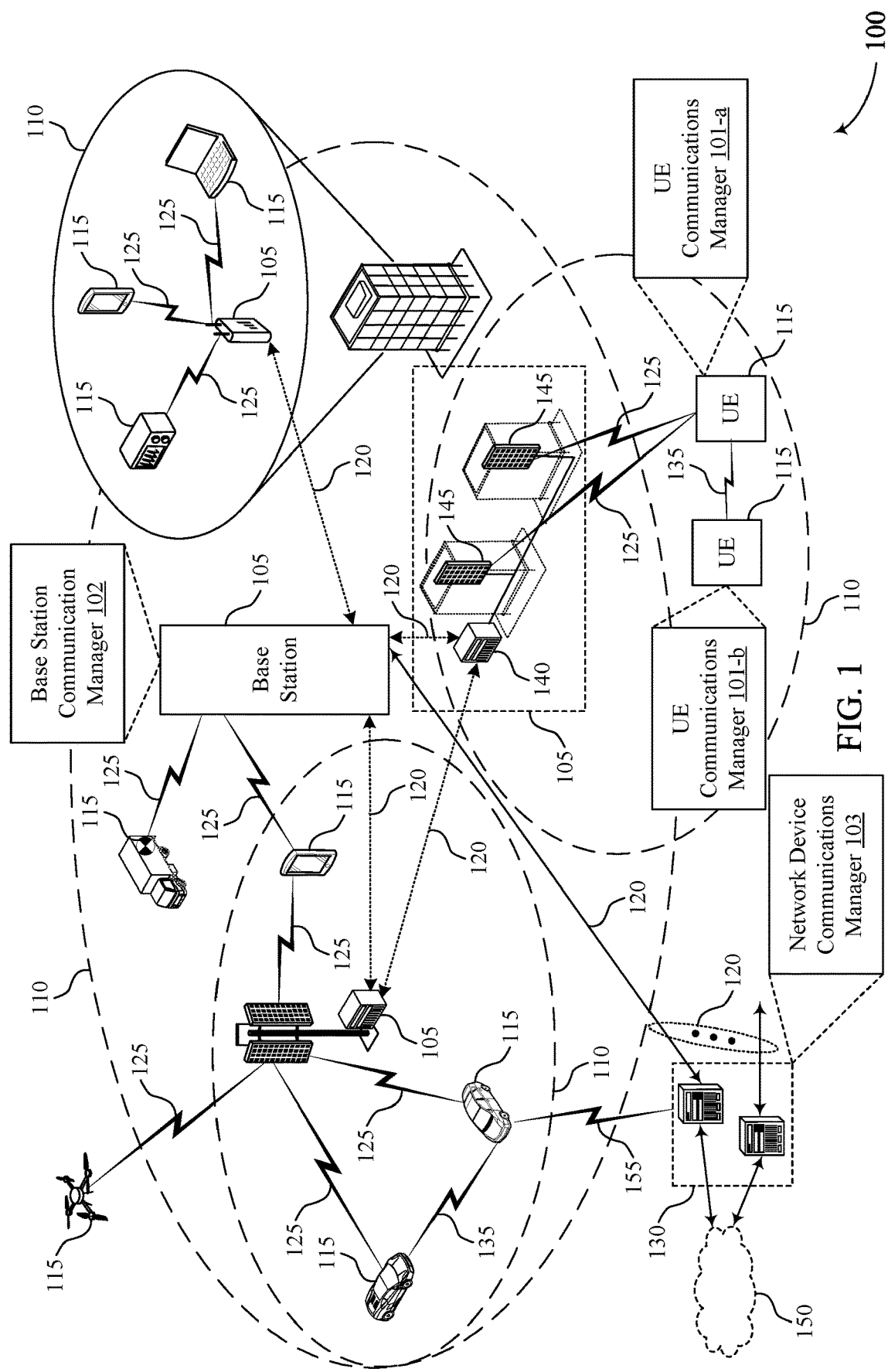
FIG. 1 illustrates an example of a system for wireless communications that supports QoS support for sidelink relay service in accordance with aspects of the present disclosure.

Some wireless communication systems may include one or more UEs and one or more base stations that may support one or more multiple radio access technologies (RATs) including 4G systems, such as LTE systems, and 5G systems, which may be referred to as NR systems. According to one or more of these example RATs, one or more UEs may communicate directly with one another in sidelink communication channels without transmitting through a base station or through a relay point. A sidelink communication may be an example of device-to-device (D2D) communication, vehicle-to-everything (V2X) communication, or another example of sidelink communication in a wireless communications system.

A first UE may communicate with a base station via a second UE. In some examples, the first UE may be referred to as a remote UE, the base station may be referred to as a network entity, and the second UE may be referred to as a relay UE. As used herein, the descriptor "remote UE" relates to a UE that communicates with a base station via another UE, and the descriptor "relay UE" relates to a UE that relays communications between a base station and a remote UE. The remote UE may communicate with the relay UE via a sidelink connection established over a sidelink interface, which, in one example, may be referred to as a PC5 interface. The relay UE may relay transmissions from the remote UE to the base station via an access link connection established over an access link interface, which may be referred to as a Uu interface. The connection between the remote UE and a 5G core network (5GC) (e.g., including the sidelink connection and the access link connection) may be referred to as a relay connection (e.g., an end-to-end connection). In some examples, the relay connection may include a relay PDU session between the relay UE and the 5GC (e.g., via the Uu interface).

When establishing a relay connection, a UE may transmit information requesting a QoS flow for the connection, where the requested QoS flow may be associated with a 5G QoS identifier (5QI). The 5QI may define one or more characteristics of the QoS flow, such as a resource type (e.g., a guaranteed bit rate (GBR), a delay critical GBR, a non-GBR, etc.), a priority level, a packet delay budget, a packet error rate, an averaging window, a maximum data burst volume, or any combination thereof. In some examples, a sidelink connection (e.g., a PC5 unicast link) may be associated with a sidelink QoS identifier, such as a PC5 specific QoS identifier (PQI).

In some examples, in response to a request from a remote UE for a QoS flow for a relay connection, a sidelink QoS flow with a sidelink QoS identifier (e.g., a PQI) may be established for a sidelink connection (e.g., a PC5 QoS flow for a PC5 unicast link) between the relay UE and the remote UE, and a separate access link QoS flow with a 5QI may be established for the Uu interface between the relay UE and the base station. The sidelink QoS identifier and the 5QI may be established independently and may fail to satisfy an end-to-end QoS flow for the relay connection (e.g., from the remote UE to the 5GC). For example, a remote UE may request a total packet delay budget (e.g., 100 milliseconds (ms)) for the relay connection. The sidelink QoS identifier may specify a first packet delay budget, and the 5QI may specify a second packet delay budget. Because the sidelink QoS identifier and the 5QI are established independently, the sum of the first and second packet delay budgets may be greater than the requested total packet delay budget, which may impact communications reliability and efficiency over the relay connection.

As described herein, a network entity (e.g., a base station) may determine an end-to-end QoS configuration when establishing a relay connection between a remote UE and the 5GC. In some examples, the QoS configuration may be associated with a 5QI. The QoS configuration may define a QoS flow for a sidelink connection (e.g., via a PC5 interface) between the remote UE and a relay UE, as well as a QoS flow for an additional interface (e.g., a Uu interface) between the relay UE and the network entity. In some cases, a mapping may be determined between the sidelink QoS identifier and the 5QI to indicate on which radio bearers at the relay UE to relay traffic between the remote UE and the 5GC (e.g., through the network entity). The network entity may indicate this mapping to the relay UE in a registration policy when the relay UE registers with the network (e.g., a message indicating policies, configurations, communication parameters, etc., that the network entity transmits to the relay UE as part of a registration procedure), or the mapping may be preconfigured in the relay UE. Additionally, different sidelink QoS identifiers and 5QIs may be defined and used to satisfy the end-to-end QoS configuration.

The remote UE may establish a sidelink connection with the relay UE using a sidelink discovery procedure. The sidelink connection may be associated with a relay service code (e.g., an identification for a connectivity service the relay UE provides), which may specify one or more characteristics of the sidelink connection provided by the relay UE. Additionally, the remote UE may also indicate a Layer 3 (L3) relaying request to the relay UE when establishing the sidelink connection. In some cases, an L3 relay connection (e.g., as indicated by the L3 relaying request) may include the remote UE communicating user data via the relay UE to the base station and 5GC, where the remote UE is not known to the base station at a control plane level. Based on the L3 connection, the base station may be unable to communicate directly with the remote UE, and the relay UE may use the mapping described above to forward messages between the remote UE and the base station on the sidelink interface (e.g., the sidelink connection between the remote UE and the relay UE) and the Uu interface (e.g., the connection between the relay UE and the base station).

In some cases, the relay UE may transmit a request to the base station based on the L3 relaying request received from the remote UE, where the request at least includes the relay service code indicated by the remote UE. The base station may then forward this request to a network device (e.g., a 5GC or an additional network device that includes an AMF, an SMF, a user plane function (UPF), etc.), where the network device determines whether the relay UE is authorized to support the relay service code and the L3 relay connection. Subsequently, if the relay UE is authorized, the network device may then establish and indicate a PDU session to the base station for the L3 relay connection and may also indicate end-to-end QoS needs for the L3 relay connection (e.g., PQI and 5QI needs).

Accordingly, the base station may then determine the end-to-end QoS configuration (e.g., a QoS to allocate for the Uu interface QoS flows and whether to modify a QoS for the PC5 interface QoS flows) based on the indicated PDU session for the L3 relay connection and the indicated end-to-end QoS for the L3 relay connection. After determining the end-to-end QoS configuration, the base station may transmit an indication of the end-to-end QoS configuration to the relay UE, and the relay UE may modify a QoS flow of a sidelink connection (e.g., a PC5 QoS flow corresponding to a PC5 unicast link) with the remote UE based on the indication of the end-to-end QoS configuration. Subsequently, the relay UE may create a mapping between a sidelink QoS flow identifier (e.g., a PC5 QoS flow identifier (PFI)) and a Uu Qos flow identifier (QFI) based on the end-to-end QoS configuration and may route traffic between the remote UE and the base station based on the created mapping. In some cases, the base station (e.g., a next-generation radio access network (NG-RAN) device) may determine the end-to-end QoS configuration without communicating with the network device (e.g., a radio access network (RAN) centric determination).

Particular aspects of the subject matter described in this disclosure may be implemented to realize lower end-to-end delays, higher reliability, power savings, and increased battery life. In some examples, a first device (e.g., a relay UE) may communicate with a network entity (e.g., a base station) to relay data for an additional device (e.g., a remote UE), and the first device may determine an end-to-end QoS configuration (e.g., based on signaling from the network entity) for a relay connection to improve reliability of transmissions based on the end-to-end QoS configuration.

Aspects of the disclosure are initially described in the context of wireless communications systems. Additionally, aspects of the disclosure are illustrated through an additional wireless communications system, a QoS configuration, relay configurations, a QoS flow, QoS negotiations, and process flows. Aspects of the disclosure are further illustrated by and described with reference to apparatus diagrams, system diagrams, and flowcharts that relate to QoS support for sidelink relay service.

FIG. 1 illustrates an example of a wireless communications system 100 that supports QoS support for sidelink relay service in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others).

In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a D2D or sidelink communication link 135 (e.g., using a peer-to-peer (P2P) or D2D protocol). In some cases, a D2D or sidelink communication link 135 may be referred to as a sidelink communication link and may be used for sidelink communications between UEs 115. One or more UEs 115 utilizing D2D or sidelink communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D or sidelink communications may utilize a one-to-many (1:M) system in which each UE 115 transmits to every other UE 115 in the group. In some examples, a base station 105 facilitates the scheduling of resources for D2D or sidelink communications. In other cases, D2D or sidelink communications are carried out between the UEs 115 without the involvement of a base station 105.

In some systems, the D2D or sidelink communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both. In some cases, sidelink communications may implement or use a PC5 interface. Additionally or alternatively, the D2D or sidelink communication link 135 may be used for additional services, such as interactive gaming or data sharing between variable kinds of terminals (e.g., mobile phones, robots, augmented reality (AR)/virtual reality (VR) devices like headsets/glasses or smart tablets, etc.).

The core network 130 may provide user authentication, access authorization, tracking, Internet Protocol (IP) connectivity, and other access, routing, or mobility functions. The core network 130 may be an evolved packet core (EPC) or 5GC, which may include at least one control plane entity that manages access and mobility (e.g., a mobility management entity (MME), an AMF) and at least one user plane entity that routes packets or interconnects to external networks (e.g., a serving gateway (S-GW), a Packet Data Network (PDN) gateway (P-GW), or a UPF). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6

GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In various examples, a communication manager may be included in a device to support techniques for QoS support in sidelink relay service. For example, a UE 115 may include a UE communications manager 101, a base station 105 (e.g., a network entity) may include a base station communications manager 102, and a network device (e.g., as part of the core network) may include a network device communications manager 103.

For example, a relay UE 115 (e.g., a first UE 115) may include a UE communications manager 101-a, which can be used to establish a connection with a remote UE 115 (e.g., a second UE 115) via a D2D or sidelink communication link 135. When establishing the connection, the remote UE 115 may transmit a relaying request to the relay UE 115 that includes a relay service code indicating a type of relaying needed for the remote UE (e.g., to set up an L3 relay connection via the relay UE 115 to a base station 105). Subsequently, the UE communications manager 101-a may transmit the relaying request to the base station 105 and may receive a configuration message from the base station 105 indicating an end-to-end QoS configuration. The end-to-end QoS configuration may include configuration information (e.g., PQI and 5QI) for a PC5 interface between the relay UE 115 and the remote UE 115 (e.g., for the D2D or sidelink communication link 135) and for a Uu interface between the relay UE 115 and the base station 105 (e.g., for a communication link 125). Accordingly, the UE communications manager 101-*a* of the relay UE 115 may then use the end-to-end QoS configuration to route traffic between the remote UE 115 and the base station 105. In some cases, the UE communications manager 101-*a* may also determine a mapping from the PC5 interface to the Uu interface (e.g., PQI to 5QI) and vice versa (e.g., from 5QI to PQI) to route the traffic between the remote UE 115 and the base station 105.

Additionally or alternatively, a remote UE 115 (e.g., a second UE 115) may include a UE communications manager 101-*b*, which can be used to establish a connection with a relay UE 115 (e.g., a first UE 115) via a D2D or sidelink communication link 135 for forwarding communications from the remote UE 115 to a network entity (e.g., a base station 105). For example, the UE communications manager 101-*b* may receive a QoS mapping configuration mapping message that includes a mapping between a first interface of a first connection between the remote UE 115 and the relay UE 115 (e.g., the D2D or sidelink communication link 135) and a second interface of a second connection between the relay UE 115 and the network entity (e.g., a communication link 125). Subsequently, the UE communications manager 101-*b* may configure a QoS of the first connection based on the QoS mapping configuration message and may communicate with the network entity via the relay UE 115 based on the configured QoS.

Additionally, a base station 105 (e.g., the network entity) may use the base station communications manager 102 to determine the end-to-end QoS configuration based on receiving the relaying request from the relay UE 115. In some cases, the base station communications manager 102 may transmit the relaying request to a network device (e.g., an AMF of a 5GC) and may receive end-to-end QoS needs for the relaying request from the network device, where the end-to-end QoS configuration is determined based on the end-to-end QoS needs. For example, determining the end-to-end QoS configuration may include determining a PQI associated with the PC5 interface and a 5QI associated with the Uu interface. After informing the relay UE 115 of the end-to-end QoS configuration, the base station communications manager 102 may communicate with the remote UE 115 via the relay UE 115 according to the end-to-end QoS configuration.

A network device may also be included in wireless communications system 100 to support the techniques as described herein. For example, the network device may include a core network device (e.g., 5GC device) that includes an AMF, an SMF, and a UPF. Additionally, the network device may include the network device communications manager 103 that receives the relaying request from the base station 105 (e.g., at the AMF) and determines an end-to-end QoS configuration (e.g., end-to-end QoS needs for an L3 relaying connection) based on the relaying request. Subsequently, the network device communications manager 103 may transmit an indication of the end-to-end QoS configuration to the base station 105. In some cases, the network device communications manager 103 may determine whether the relay UE 115 is authorized to handle relaying between the remote UE 115 and the base station 105 based on the relaying request (e.g., including the relay service code) and a set of policy and charging control (PCC) rules.

Figure 2:
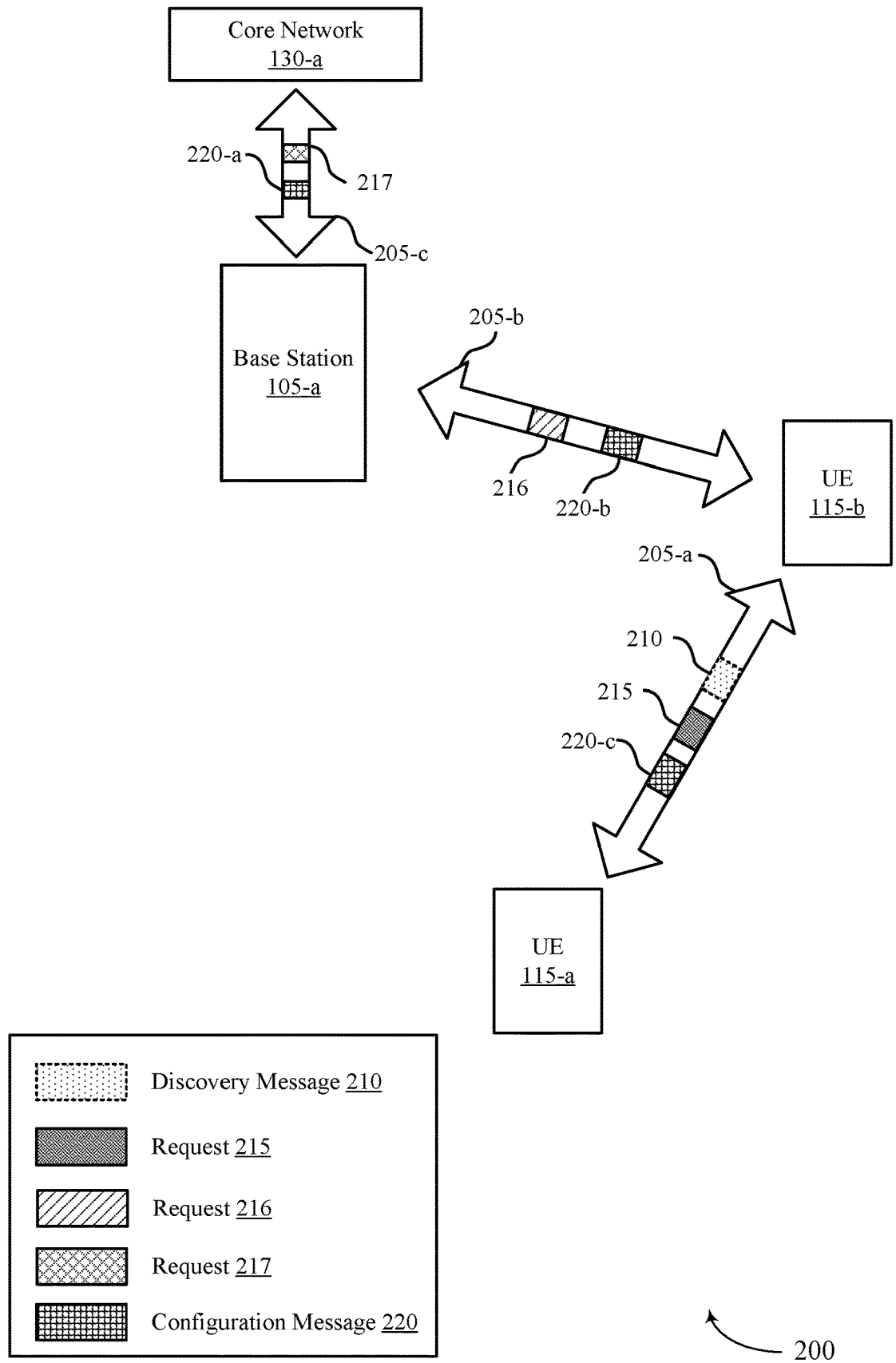
FIG. 2 illustrates an example of a wireless communications system that supports QoS support for sidelink relay service in accordance with aspects of the present disclosure.

FIG. 2 illustrates an example of a wireless communications system 200 that supports QoS support for sidelink relay service in accordance with aspects of the present disclosure. In some examples, wireless communications system 200 may implement aspects of or may be implemented by aspects of wireless communications system 100. For example, wireless communications system 200 may include a base station 105-*a*, a UE 115-*a*, a UE 115-*b*, and a core network 130-*a* (e.g., a 5GC), which may be examples of corresponding base stations 105, UEs 115, and the core network 130, respectively, as described with reference to FIG. 1.

The UE 115-*a* and the UE 115-*b* may establish a connection 205-*a* for sidelink communications. In some examples, the UE 115-*a* may be referred to as a remote UE, and the UE 115-*b* may be referred to as a relay UE (e.g., a UE-to-network relay UE, a proximity services (ProSe) UE-to-network relay UE, etc.). In some examples, the UE 115-*a* may discover the UE 115-*b* using a sidelink discovery procedure, which may be based on a use of relay service codes, and may establish the connection 205-*a* using sidelink unicast link setup procedures. For example, the UE 115-*b* may first broadcast a message indicating one or more relay service codes identifying connectivity services that the UE 115-*b* provides. In some cases, the UEs 115 in wireless communications system 200 (e.g., including the UE 115-*a* and the UE 115-*b*, as well as additional UEs 115 not depicted in FIG. 2) may be provisioned with authorized relay service codes when registering with the network (e.g., as part of a ProSe policy during 5G authorization and provisioning by a policy charging function (PCF)).

In some example, the UE 115-*a* may transmit a discovery message 210 based on receiving the broadcast message from UE 115-*b* indicating the relay service code(s) provided by the UE 115-*b*. Additionally or alternatively, the UE 115-*b* may provide the relay service code(s) in response to receiving the discovery message 210, where the relay service code(s) identify the connectivity service(s) the UE 115-*b* is enabled to provide (e.g., relay connectivity). Based on the relay service code of the UE 115-*b* and the discovery message 210, the UE 115-*a* and the UE 115-*b* may establish the connection 205-*a* using sidelink unicast link setup procedures. Additionally, the UE 115-*b* may establish a connection 205-*b* with the base station 105-*a* (e.g., a network entity). In some cases, the connection 205-*b* may be an existing connection previously established between the UE 115-*b* and the base station 105-*a* (e.g., based on a random access procedure, as an example). Additionally, the base station 105-*a* may establish a connection 205-*c* with the core network 130-*a*, where the connection 205-*c* may be an existing connection between the base station 105-*a* and the core network 130-*a* (e.g., a backhaul link, such as using an S1, N2, N3, or other interface During establishment of the connection 205-*a* or after establishing the connection 205-*a*, the UE 115-*a* may transmit a request 215 to the UE 115-*b* to request for relaying support between the UE 115-*a* and the base station 105-*a* via the UE 115-*b* (e.g., a PC5 relay path, where the UE 115-*a* is connected to the base station 105-*a* via a UE-to-network relay UE over a PC5 path). Accordingly, the relay connection may include the connection 205-*a* and the connection 205-*b*. The connection 205-*a* may include a sidelink (e.g., PC5 path) and sidelink interface (e.g., and a Uu interface, such as a virtual Uu interface) for communications via the relay connection, and the connection 205-*b* may include a Uu path and interface for communication via the relay connection. Additionally or alternatively, although not shown, the UE 115-*a* may include a direct connection to an additional base station 105 over the Uu path and interface (e.g., and the additional base station 105 may communicate with the base station 105-*a* via a backhaul connection, such as a Xn interface).

In some cases, the request 215 may include an indication of a relay service code that the UE 115-*a* needs for communicating via the relay connection (e.g., an indication of what services the UE 115-*a* needs for the relay connection) as well as a request for QoS support for the relay connection. For example, the request 215 may include a request to establish an L3 relay connection between the UE 115-*a* and the base station 105-*a* via the UE 115-*b*. In some examples, the L3 relay connection may include the connection 205-*a* (e.g., between the UE 115-*a* and the UE 115-*b*) and the connection 205-*b* (e.g., between the UE 115-*b* and the base station 105-*a*). The L3 relay connection may include the UE 115-*a* being unknown to the base station 105-*a*, and the base station 105-*a* may communicate with the UE 115-*b* knowing that the communications are being relayed to some additional wireless device but not knowing any specific information about the UE 115-*a* (e.g., apart from the relay services requested by the request 215 and corresponding relay service code). In some examples, the request 215 may be a sidelink direct communication request message (e.g., PC5 sidelink (PC5-S) direct communication request message) or a sidelink security mode command (e.g., a PC5-S security mode command) or a sidelink modification request message (e.g., a PC5-S link modification request message).

In some cases, in response to the request 215 from the UE 115-*a* for a QoS flow for the relay connection, a sidelink QoS identifier (e.g., a PQI) may be established for the sidelink interface (e.g., PC5 interface) QoS flow on the connection 205-*a* between the UE 115-*a* and the UE 115-*b*, and a separate 5QI may be established for the Uu interface QoS flow on the connection 205-*b* between the UE 115-*b* and the base station 105-*a*. However, the sidelink QoS identifier and the 5QI may be established independently of each other and may fail to satisfy an end-to-end QoS flow for the relay connection. For example, the request 215 may include a total packet delay budget (e.g., 100 ms) for the relay connection (e.g., based on the indicated relay service code). The sidelink QoS identifier may specify a first packet delay budget, and the 5QI may specify a second packet delay budget. Because the sidelink QoS identifier and the 5QI are established independently, the sum of the first and second packet delay budgets may be greater than the requested total packet delay budget, which may impact communications reliability and efficiency over the relay connection.

Additionally, after receiving the request 215 from the UE 115-*a*, the UE 115-*b* may determine to set up one or more PDU sessions on a Uu connection (e.g., the Uu interface of the connection 205-*b*) with the base station 105-*a*. For example, the connection 205-*b* may be referred to as a PDU connection between the UE 115-*b* and the base station 105-*a*. Accordingly, the UE 115-*b* may transmit a request 216 to the base station 105-*a* to establish the Uu connection with the base station 105-*a*. For example, the UE 115-*a* may transmit the request 215 to establish a sidelink connection with the UE 115-*b* (e.g., a link on the sidelink or PC5 interface of the connection 205-*a*) as part of the L3 relay connection, and the UE 115-*b* may then transmit the request 216 to the base station 105-*a* to establish the Uu connection as part of the L3 relay connection. In some examples, the request 216 may be a sidelink direct communication request message or a sidelink security mode command or a sidelink modification request message.

Accordingly, as described herein, based on the request 216, the base station 105-*a* may determine a QoS configuration for the relay connection (e.g., an end-to-end QoS configuration) instead of determining separate QoS indicators for each connection 205. For example, the QoS configuration may define QoS characteristics for the connections 205-*a* and 205-*b*. Additionally, the QoS configuration may include a sidelink QoS identifier (e.g., a PQI) for the sidelink interface (e.g., PC5 interface) QoS flow on the connection 205-*a* (e.g., a first configuration for a first interface of a first connection) and a 5QI for the Uu interface QoS flow on the connection 205-*b* (e.g., a second configuration for a second interface of a second connection), where the sidelink QoS identifier and the 5QI are determined to satisfy the overall QoS configuration for the relay connection.

In some cases, the base station 105-*a* may determine the QoS configuration based on communicating with a network device (e.g., including an AMF, an SMF, a UPF, etc.), where the network device determines whether the UE 115-*b* is authorized to handle the relay connection based on the relay service code and determines the QoS needs for the relay connection (e.g., based on the relay service code and the indication of the L3 relay connection). For example, the base station 105-*a* may forward a request 217 to the core network 130-*a* (e.g., via the connection 205-*c*) corresponding to the request 215 and the request 216. Based on the request 217, the core network 130-*a* may then determine the QoS needs for the relay connection and may transmit a configuration message 220-*a* to the base station 105-*a* indicating the QoS configuration based on the QoS needs. In some examples, the configuration message 220-*a* may include a mapping between the sidelink QoS identifier and the 5QI that satisfy the overall QoS configuration for the relay connection (e.g., an end-to-end QoS configuration). In some examples, this configuration message 220-*a* may include a mapping list with each entry indicating different mapping values. For example, the relay connection can have multiple QoS flows, and the mapping list in the configuration message 220-*a* may be used to determine the QoS mapping for each QoS flow based on a corresponding end-to-end QoS for relay services provided on the relay connection.

Subsequently, the base station 105-*a* (e.g., a network entity) may transmit a configuration message 220-*b* (e.g., corresponding to the configuration message 220-*a*) to the UE 115-*b* indicating the QoS configuration and the QoS characteristics for the connections 205 (e.g., the PQI, the 5QI, etc.). In some examples, the configuration message 220-*b* may be included in an RRC reconfiguration message. The UE 115-*b* may forward a configuration message 220-*c* to the UE 115-*a* based on the configuration message 220-*b*. Based on the configuration messages 220, the UEs 115 may adjust parameters of the connections 205 to meet the specifications of the QoS configuration. For example, the UE 115-*b* may configure one or more data radio bearers (DRBs) for the sidelink interface and the Uu interface based on the QoS configuration. Additionally, the UE 115-*b* may determine a mapping of DRBs to use between the sidelink interface of the connection 205-*a* and the Uu interface of the connection 205-*b* (e.g., mapping between logical channel identifiers (LCIDs) of the different interfaces) based on the QoS configuration to relay (e.g., route) traffic between the UE 115-*a* and the base station 105-*a*. Based on the QoS configuration, the UE 115-*a* may communicate with the base station 105-*a* over the relay connection via the UE 115-*b*.

In some examples, the UE 115-*b* may detect a change in channel conditions for the connection 205-*a* which may impact the QoS configuration. For example, based on a mobility of the UE 115-*a* and/or the UE 115-*b*, the UE 115-*a* may determine that the QoS (e.g., the packet delay budget, the packet error rate, etc.) that can be supported on the connection 205-*a* has changed. In some cases, the UE 115-*b* may determine the change in channel conditions based on the UE 115-*a* generating and transmitting a link quality report identifying the change in channel conditions. In some examples, the UE 115-*a* may be configured to transmit the link quality report periodically. Additionally or alternatively, the UE 115-*a* may be configured to transmit the link quality report based on a triggering event, such as a QoS parameter changing such that the QoS parameter is above or below a threshold.

The UE 115-*a* may transmit the link quality report to the UE 115-*b*, and the UE 115-*b* may transmit the link quality report to the base station 105-*a*. In some examples, the base station 105-*a* may receive the link quality report via the relay connection in an assistance information message from the UE 115-*b* indicating information about the connection 205-*a* (e.g., a sidelink connection) between the UE 115-*a* and the UE 115-*b* (e.g., a SidelinkUEAssistanceInformation message). Based on the link quality report and the assistance information message, the base station 105-*a* may update the QoS configuration, which may include determining an updated set of QoS characteristics for the connection 205-*a*, the connection 205-*b*, or both. The base station 105-*a* may transmit a second configuration message 220-*b* indicating the updated QoS configuration to the UE 115-*b*, and the UE 115-*b* may apply the updated QoS configuration for communicating over the relay connection.

To enable the techniques as described herein, relay service QoS information may be provisioned to the UE 115-*a* (e.g., the remote UE) and the UE 115-*b* (e.g., the relay UE). For example, during a provisioning step of the sidelink establishment for the connection 205-*a* (e.g., ProSe provisioning), a PCF transmitted or preconfigured in the UEs 115 may include QoS needs of each relay service code in a policy (e.g., a ProSe policy) sent to the UE 115-*a* and the UE 115-*b*. That is, the UEs 115 may be provisioned one or more authorized relay service code(s) supported by the policy (e.g., predefined codes assigned to the UEs 115 to indicate types of relaying the UE 115-*b* is capable of handling, such as data communications, voice communications, gaming, etc.) and end-to-end QoS requirements of the relay service code(s) mapped to a sidelink QoS (e.g., PC5 QoS) and a Uu QoS (e.g., PQI to 5QI mapping information). In some cases, an application function (AF) (e.g., of a network device) may provide the PCF with the end-to-end QoS needs for a relay service via a network exposure function (NEF).

The end-to-end QoS requirements of the relay service code(s) may be mapped to the sidelink and Uu QoS based on different types of information. For example, the mapping may be based on sidelink QoS information, such as sidelink QoS parameters (e.g., PC5 QoS parameters, such as a PQI and other QoS parameters) and a sidelink radio bearer (SLRB) configuration (e.g., a static configuration for out-of-coverage (OOC) operation)), where the sidelink QoS parameters and the SLRB configuration are provisioned by the relay service code(s). Additionally, the mapping may be based on relay PDU session information sent to the UE 115-*b* (e.g., or additional L3 Relay UEs), where the relay PDU session information includes an access point name (APN)/data network name (DNN) for the wireless communications system 200 (e.g., 5G communications) and QoS parameters for the wireless communications system 200 (e.g., 5QI and other QoS parameters). Additionally, the UE 115-*b* may be provisioned with sidelink QoS identifier to 5QI mapping information (e.g., PQI to 5QI mapping information) that indicates which DRBs to relay the traffic on. For example, the sidelink QoS identifier to 5QI mapping may assist the UE 115-*b* with which 5QI to use when requesting to modify a relay PDU session to support a specific relaying service. This sidelink QoS identifier to 5QI mapping information may be preconfigured in the UE 115-*b* (e.g., a relay device) for OOC operations or may be indicated to the UE 115-*b* in a registration policy when registering with the network.

In some cases, the base station 105-*a* may transmit this sidelink QoS identifier to 5QI mapping information to the UE 115-*a* and the UE 115-*b* in a container included in messages (e.g., N1 messages) sent to the UE 115-*a* and the UE 115-*b* during a PDU session setup or modification. For example, the base station 105-*a* may transmit the container with the sidelink QoS identifier to 5QI mapping information via a PDU session establishment accept message, a PDU session modification command message or a combination thereof. In some cases, the UE 115-*a* (e.g., the remote UE) may receive this container and message during a PDU session establishment or modification over a Uu path. Subsequently, the UE 115-*a* (e.g., the remote UE) may use the mapping to determine sidelink QoS identifiers (e.g., PQIs) to use for services switched with a specific 5QI over a Uu path to a sidelink relay path (e.g., PC5 relay path). Additionally, the UE 115-*b* (e.g., the relay UE) may receive this container and message during a relay PDU session establishment or modification for relaying traffic from the UE 115-*a* to the base station 105-*a* (e.g., in a PDU session response message, such as a PDU establishment accept/modification command message sent to the UE 115-*b* by the base station 105-*a*). In some cases, the sidelink QoS identifier to 5QI mapping may also be used to switch from a sidelink path to a Uu path, where the UE 115-*a* and the UE 115-*b* may use the mapping configuration to determine a 5QI corresponding to a sidelink QoS identifier of the service being switched. For example, the UE 115-*a* may switch services from the relay connection that is using the sidelink path to a Uu path to communicate directly with the base station 105-*a* or an additional base station 105, where the sidelink QoS identifier to 5QI mapping information is used to determine a 5QI for the Uu path that corresponds to a sidelink QoS identifier that was used for the service on the sidelink path.

Additionally, to further enable the techniques as described herein, sidelink QoS identifiers and/or 5QIs may be defined to satisfy end-to-end QoS over the relay connection. In some cases, sidelink QoS identifier and 5QI QoS characteristics and other QoS parameters may be defined to cover end-to-end QoS on a single link (e.g., for a single connection 205 and not for the relay connection that includes both connections 205). For example, Table 1 below may represent different 5QI values defined with corresponding QoS parameters.

TABLE 1

5QI Values with Corresponding QoS Parameters

| 5QI Value | Resource Type | Default Priority Level | Packet Delay Budget | Packet Error Rate | Default Maximum Data Burst Volume | Default Averaging Window |
|---|---|---|---|---|---|---|
| 1 | GBR | 20 | 100 ms | $10^{-2}$ | N/A | 2000 ms |
| 2 |  | 40 | 150 ms | $10^{-3}$ | N/A | 2000 ms |
| 3 |  | 30 | 50 ms | $10^{-3}$ | N/A | 2000 ms |
| 4 |  | 50 | 300 ms | $10^{-6}$ | N/A | 2000 ms |
| 65 |  | 7 | 75 ms | $10^{-2}$ | N/A | 2000 ms |
| 66 |  | 20 | 100 ms | $10^{-2}$ | N/A | 2000 ms |
| 67 |  | 15 | 100 ms | $10^{-3}$ | N/A | 2000 ms |

In some cases, each 5QI value defined in Table 1 may be used for different types of corresponding example services. For example, the 5QI value of one (1) may be used for conversational voice; the 5QI value of two (2) may be used for conversational video (e.g., live streaming); the 5QI value of three (3) may be used for real time gaming, V2X messages, electricity distribution (e.g., medium voltage allocations), process automation (e.g., monitoring), etc.; the 5QI value of four (4) may be used for non-conversational video (e.g., buffered streaming); the 5QI value of 65 may be used for mission critical user plane push-to-talk voice (e.g., MCPTT); the 5QI value of 66 may be used for non-mission-critical user plane push-to-talk voice; and the 5QI value of 67 may be used for mission critical video user plane services. The 5QI values in Table 1 are not meant to be an exhaustive list of all configured 5QI values.

However, the defined 5QI values may be insufficient for end-to-end QoS configurations that include multiple connections (e.g., two (2) links or the two (2) connections 205 as shown in FIG. 2, which may be referred to as a multi-hop connection). For example, the 5QI value of 67 defined for the mission-critical video user plane traffic may include a packet delay budget of 100 ms and a packet error rate of $10^{-3}$. The packet delay budget may define an upper bound between a UE 115 and a UPF (e.g., of a single connection). As such, for traffic of the UE 115-a (e.g., a remote UE) relayed via the UE 115-b (e.g., relay UE) may need to accommodate the 100 ms packet delay budget between the UE 115-a and the UPF. Thus, the end-to-end packet delay budget may be shared between the sidelink (e.g., the connection 205-a) and a relay PDU session (e.g., the Uu link, the connection 205-b, etc.), which may not be possible based on the defined 5QI values. Accordingly, sidelink QoS identifiers and 5QIs may be defined for satisfying end-to-end QoS for relaying (e.g., with packet delay budgets and packet error rates not satisfied by existing sidelink QoS identifiers or 5QIs).

Additionally, the techniques for establishing the end-to-end QoS configuration (e.g., an end-to-end QoS setup for L3 relays) is described in greater detail below in FIG. 9. The techniques described herein may enable improvements for QoS support over the relay connection, among other benefits.

Figure 3:
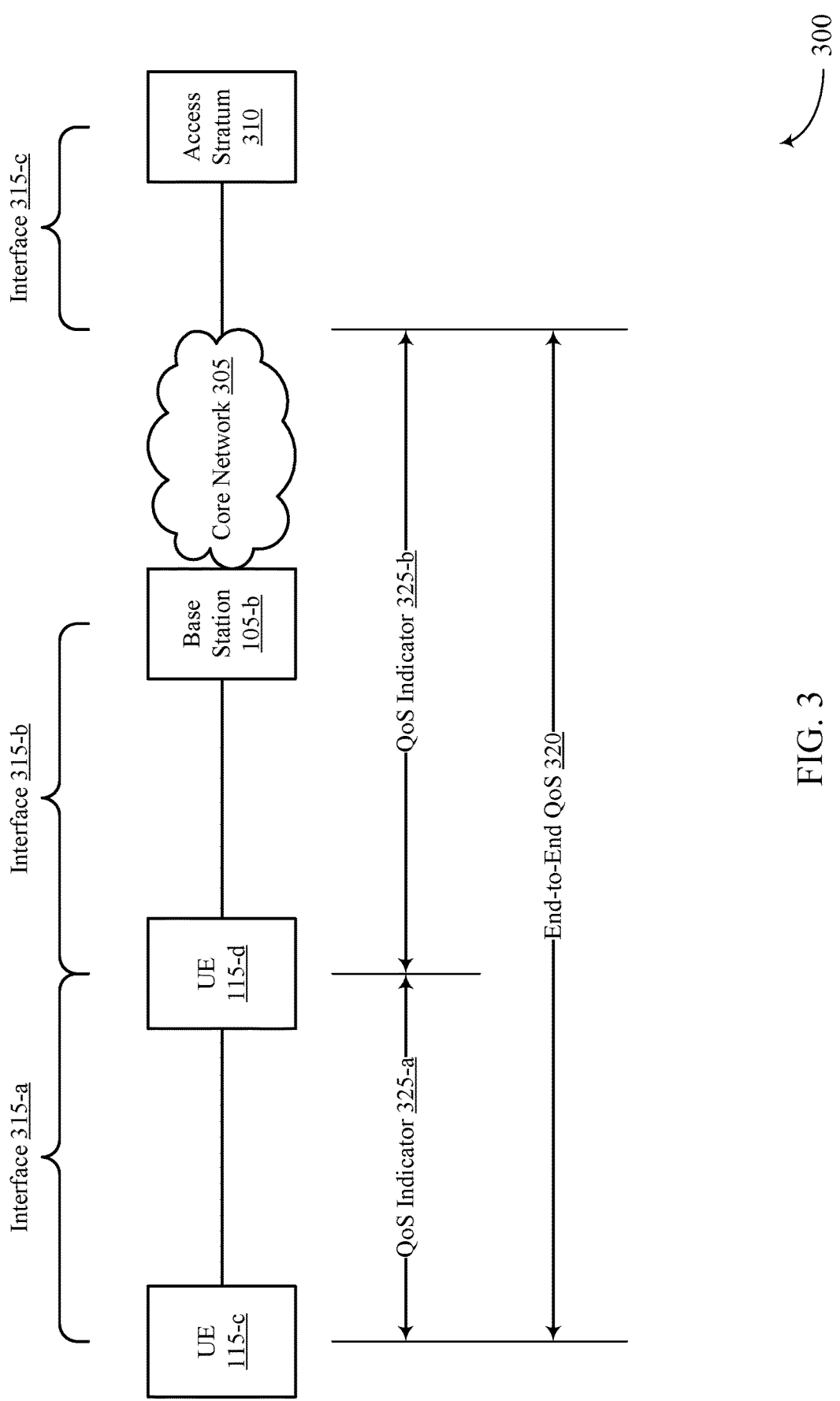
FIG. 3 illustrates an example of a QoS configuration that supports QoS support for sidelink relay service in accordance with aspects of the present disclosure.

FIG. 3 illustrates an example of a QoS configuration 300 that supports QoS support for sidelink relay service in accordance with aspects of the present disclosure. In some examples, QoS configuration 300 may implement aspects of or may be implemented by aspects of wireless communications system 100, wireless communications system 200, or both. For example, QoS configuration 300 may include a UE 115-c, a UE 115-d, and a base station 105-b, which may be examples of corresponding UEs 115 and base stations 105, respectively, as described with reference to FIGS. 1 and 2. Additionally, QoS configuration 300 may include a core network 305 and an access stratum 310, which may be examples of corresponding wireless devices as described with reference to FIGS. 1 and 2 (e.g., 5GC, network devices, etc.).

QoS configuration 300 may be used for a UE-to-network relay path (e.g., an L3 relay connection/path), where the UE 115-c may be referred to as a remote UE 115, the UE 115-d may be referred to as a relay UE 115, and the base station 105-b may be referred to as a network entity. Accordingly, traffic from the UE 115-c may be routed to the base station 105-b and the network (e.g., core network 305, access stratum 310, etc.) via the UE 115-d. Additionally, QoS configuration 300 may include different interfaces 315 for connections between each of the wireless devices. For example, the UE 115-c and the UE 115-d may communicate over a unicast link that includes an interface 315-a, where the interface 315-a may be a sidelink interface, such as a PC5 interface. Additionally, the UE 115-d may communicate with the base station 105-b and the core network 305 (e.g., routing traffic between the UE 115-c and the base station 105-b/core network 305) over an additional link (e.g., according to a relay PDU session) that includes an interface 315-b, where the interface 315-b may include a Uu interface. In some cases, the core network 305 may communicate with the access stratum 310 over an interface 315-c, where interface 315-c may include an N6 interface.

As described herein, an end-to-end QoS 320 for the UE 115-c (e.g., remote UE) communicating with the base station 105-b and the core network 305 (e.g., network entities) via the UE 115-d (e.g., relay UE) may need to be configured for QoS support on both the interface 315-a and the interface 315-b (e.g., two hops, two connections, two links, etc.). For example, the end-to-end QoS 320 may include a QoS indicator 325-a for the interface 315-a, such as a sidelink QoS identifier or a PQI, and a QoS indicator 325-b for the interface 315-b, such as a 5QI. The base station 105-b and/or the core network 305 may determine the end-to-end QoS 320 for a relay service based on accommodating the QoS indicator 325-a and the QoS indicator 325-b as described herein.

Figure 4:
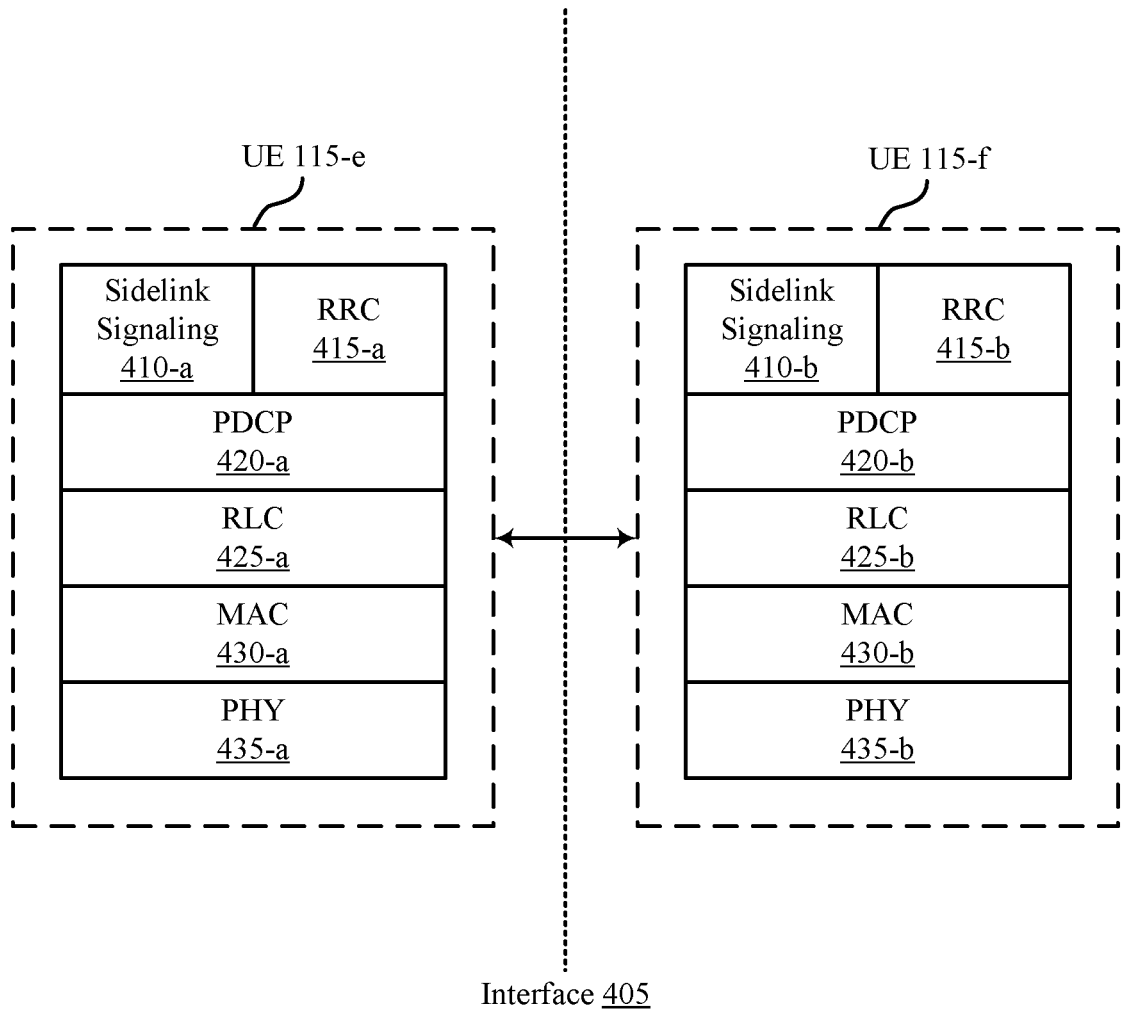
FIGS. 4 and 5 illustrate examples of relay configurations that support QoS support for sidelink relay service in accordance with aspects of the present disclosure.

FIG. 4 illustrates an example of a relay configuration 400 in accordance with aspects of the present disclosure. In some examples, relay configuration 400 may implement aspects of or may be implemented by aspects of wireless communications system 100, wireless communications system 200, or both. For example, relay configuration 400 may include a UE 115-e and a UE 115-f, which may be examples of UEs 115 as described herein with reference to FIGS. 1-3. Additionally, as described herein, the UE 115-e may be referenced as a remote UE, and the UE 115-f may be references as a relay UE 115. Accordingly, the UE 115-e and the UE 115-f may communicate with each other over a unicast link that includes an interface 405 (e.g., a sidelink interface), such as a PC5 interface. In some cases, the UE 115-e and the UE 115-f may communicate based on an L3 relay connection as described with reference to FIGS. 1-3 (e.g., the UE 115-e is unknown to a base station 105 and network devices or network entities).

Relay configuration 400 may include a control plane protocol stack in each of the UEs 115 for the L3 relay configuration. As part of the unicast link between the UEs 115 and to enable the sidelink communications, each UE 115 may use respective control protocols based on the interface 405 (e.g., control protocols for the sidelink communications, such as PC5 control protocols). The unicast link may be setup prior to relaying communications from the UE 115-*e* to a base station 105 (e.g., a network entity) via the UE 115-*f* Based on the L3 relay connection, the UE 115-*e* (e.g., remote UE) may not include an access stratum connection with the network (e.g., RAN) over the relay connection through the UE 115-*f* (e.g., relay UE). In some cases, the UE 115-*e* may include a non-access stratum connection with a core network (e.g., 5GC) using a non-standardized interworking function (e.g., an N3IWF).

In some cases, each control plane protocol stack in each UE 115 may include a function for sidelink connection management control signaling in a sidelink signaling 410 function, a function for RRC layer messaging in an RRC 415 function, a function for PDCP layer messaging in a PDCP 420 function, a function for RLC layer messaging in a RLC 425 function, a function for MAC layer messaging in a MAC 430 function, and a function for physical layer (PHY) messaging in a PHY 435 function. For the unicast link between the UEs 115, a direct mapping may be used for communicating messages on the respective layers between the two UEs 115. For example, messaging on the PDCP layer may be communicated between a PDCP 420-*a* function of the UE 115-*e* and a PDCP 420-*b* function of the UE 115-*f*, messaging on the MAC layer may be communicated between a MAC 425-*a* function of the UE 115-*e* and a MAC 425-*b* function of the UE 115-*f*, etc. In some cases, each of the functions in the control plane protocol stacks in each UE 115 may be PC5 functions for a PC5 interface used for sidelink communications between the UEs 115.

Figure 5:
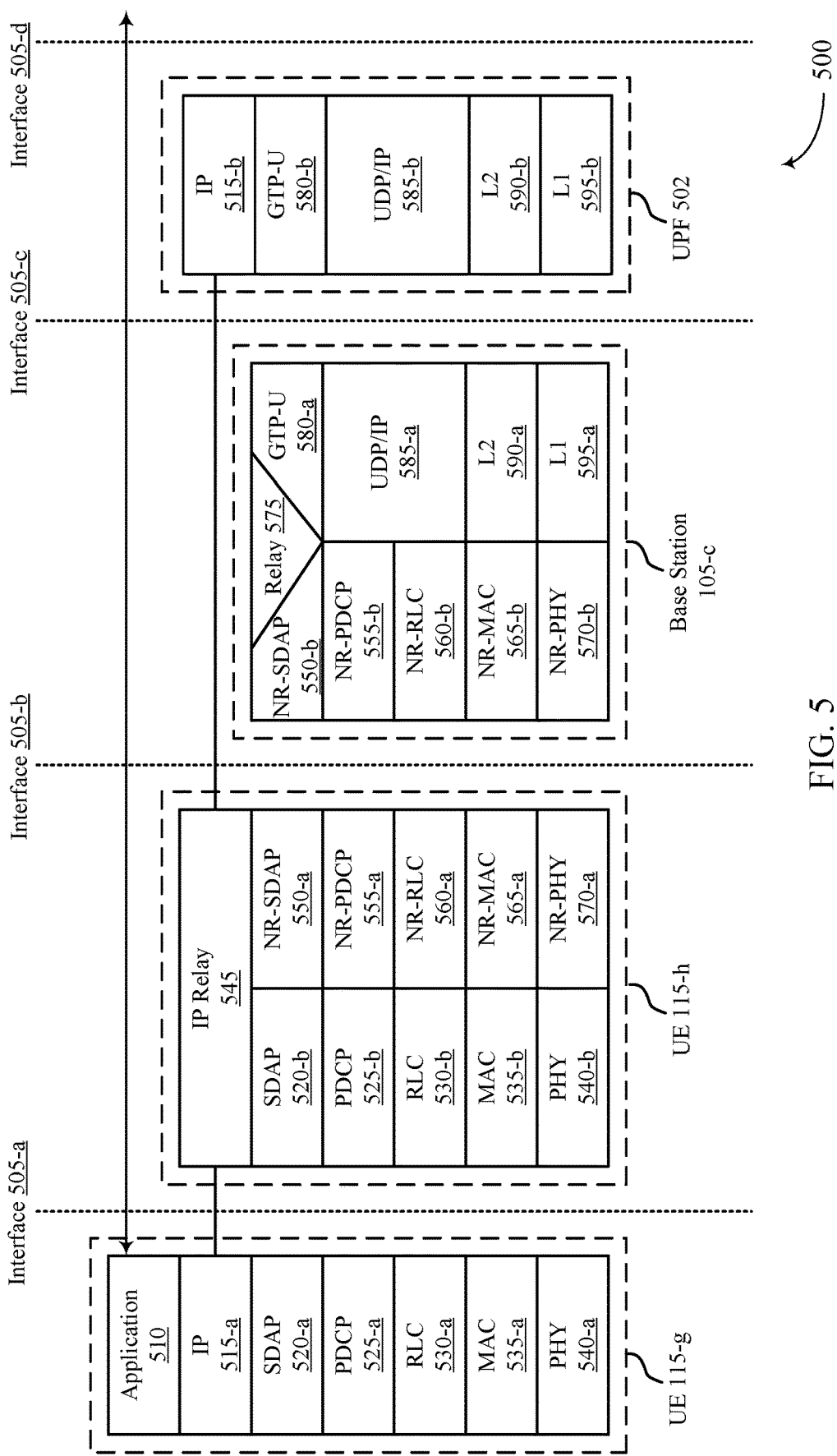

FIG. 5 illustrates an example of a relay configuration 500 in accordance with aspects of the present disclosure. In some examples, relay configuration 500 may implement aspects of or may be implemented by aspects of wireless communications system 100, wireless communications system 200, or both. For example, relay configuration 500 may include a UE 115-*g*, a UE 115-*h*, and a base station 105-*c*, which may be examples of UEs 115 and base stations 105, respectively, as described herein with reference to FIGS. 1-4. Additionally, relay configuration 500 may include a UPF 502 (e.g., as part of a network device or network entity).

As described herein, the UE 115-*g* may be referred to as a remote UE, the UE 115-*h* may be referred to as a relay UE 115, and the base station 105-*c* may be referred to as a network entity. Accordingly, the UE 115-*g* and the UE 115-*h* may communicate with each other over a unicast link that includes an interface 505-*a* (e.g., a sidelink interface), such as a PC5 interface. In some cases, the UE 115-*g* and the UE 115-*h* may communicate based on an L3 relay connection as described with reference to FIGS. 1-4, where the UE 115-*h* relays communications between the UE 115-*g* and the base station 105-*c* (e.g., the UE 115-*e* is unknown to the base station 105-*c* and network devices/entities, such as the UPF 502). The UE 115-*h* may communicate with the base station 105-*c* over an interface 505-*b*, such as a Uu interface. Additionally, the base station 105-*c* may communicate with the UPF 502 over an interface 505-*c*, such as an N3 interface, and the UPF 502 may communicate with other network functions, devices, and entities over an interface 505-*d*, such as an N6 interface.

Relay configuration 500 may include user plane protocol stacks in each of the wireless devices (e.g., the UEs 115, the base station 105-*c*, and the UPF 502) for the L3 relay configuration. In some cases, the UE 115-*g* may include an application layer 510 that communicates with the network. Additionally, the UE 115-*g* may include an IP layer 515-*a* that communicates with an IP layer 515-*b* of the UPF 502 via an IP relay 545 of the UE 115-*h*.

As described with reference to FIG. 4, the UE 115-*g* and the UE 115-*h* may communicate over the unicast link on a sidelink interface (e.g., the interface 505-*a*), such that respective layers of each UE 115 are directly mapped to the other UE 115. For example, each sidelink user plane protocol stack in each UE 115 may include a function for a service data adaptation protocol (SDAP) in an SDAP 520 function (e.g., for mapping a QoS flow within a PDU session to a corresponding DRB), a function for PDCP layer messaging in a PDCP 525 function, a function for RLC layer messaging in a RLC 530 function, a function for MAC layer messaging in a MAC 535 function, and a function for PHY messaging in a PHY 540 function, where the messaging on the respective layers/protocols are directly communicated on the corresponding layers/protocols of each UE 115.

Additionally, the UE 115-*h* (e.g., relay UE) may then map any communications from or to the sidelink user plane protocol stack to an NR user plane protocol stack for the Uu interface (e.g., the interface 505-*b*) with the base station 105-*c*. For example, communications from the base station 105-*c* intended for the UE 115-*g* over the relay connection may be mapped from the NR user plane protocol stack to the sidelink user plane protocol stack, and communications from the UE 115-*g* intended for the base station 105-*c* over the relay connection may be mapped from the sidelink user plane protocol stack to the NR user plane protocol stack. Accordingly, the NR user plane protocol stack of the UE 115-*h* may include corresponding protocols/layers that map to the sidelink user plane protocol stack. For example, the NR user plane protocol stack may include an NR-SDAP 550 function, an NR-PDCP 555 function, an NR-RLC 560 function, an NR-MAC 565 function, and an NR-PHY 570 function that correspond to the respective functions of the sidelink user plane protocol stack.

In some cases, the base station 105-*c* may also include an NR user plane protocol stack to communicate with the UE 115-*h* with corresponding NR functions (e.g., across the interface 505-*b*, such as the Uu interface). Accordingly, the UE 115-*h* and the base station 105-*c* may communicate by mapping messages on each layer/protocol to the corresponding layer/protocol of the other wireless device. Additionally, the base station 105-*c* may include a relay 575 component that maps messages received from the UE 115-*h* across the interface to 505-*b* to different protocols/layers for communicating with the UPF 502. For example, the base station 105-*c* may map messaging for the NR-SDAP 550 function to a general packet radio service (GPRS) tunneling protocol (GTP) for user data (GTP-U) 580, for the NR-PDCP 555 and NR-RLC 560 functions to a user datagram protocol (UDP)/ IP 585, for the NR-MAC 565 function to a Layer 2 (L2) protocol 590, and for the NR-PHY 570 function to a Layer 1 (L1) protocol 595. Subsequently, the base station 105-*c* may then communicate with the UPF 502 by transmitting/ receiving messages on each of the functions/protocols to respective functions/protocols of the UPF 502.

As described herein, the UPF 502, the base station 105-*c*, and/or the UE 115-*h* may determine how to map the communications between each wireless device based on an end-to-end QoS configuration (e.g., from the UE 115-*g* to the core network). For example, different sidelink QoS identifier values may be determined for the interface 505-*a* (e.g., the sidelink interface, such as a PC5 interface), and different 5QI values may be determined for the interface 505-*b* (e.g., the Uu interface) to map communications for the relay connection to meet the end-to-end QoS configuration.

Figure 6:
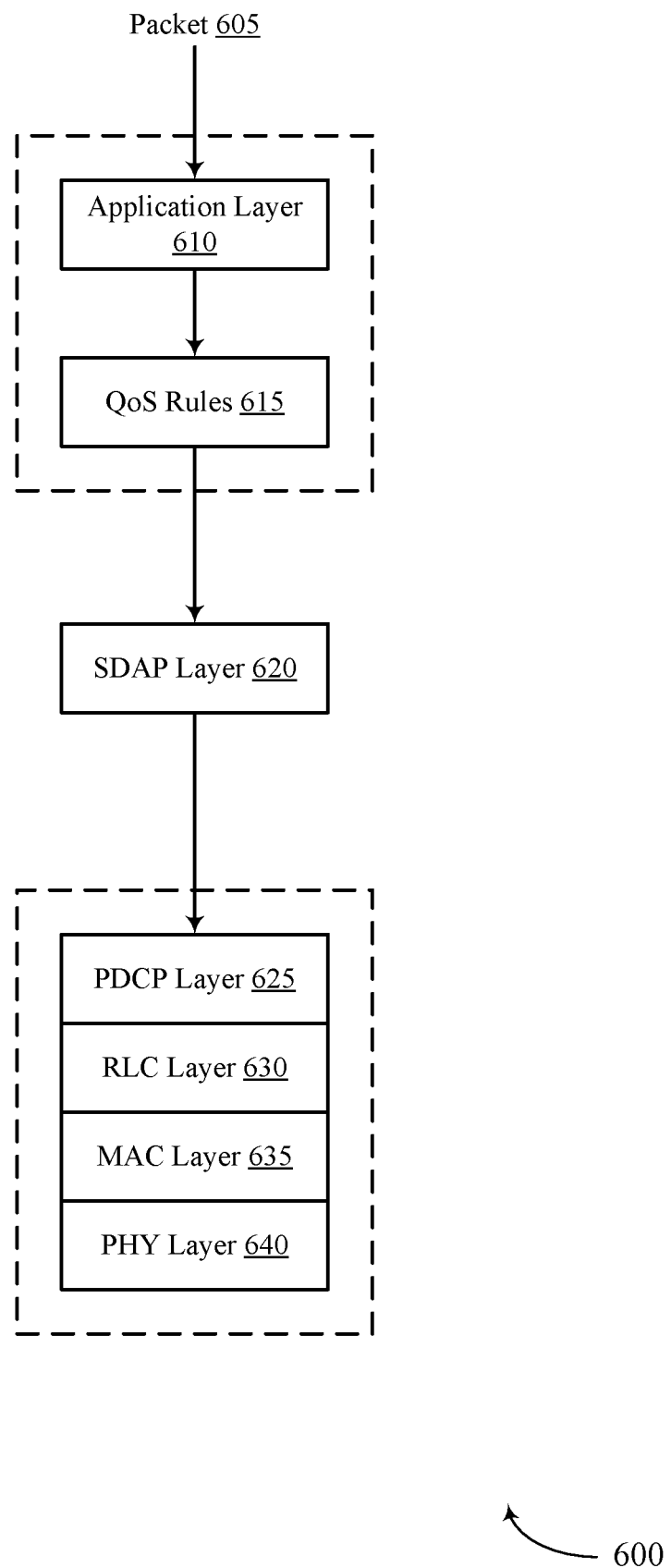
FIG. 6 illustrates an example of a QoS flow that supports QoS support for sidelink relay service in accordance with aspects of the present disclosure.

FIG. 6 illustrates an example of a QoS flow 600 in accordance with aspects of the present disclosure. In some examples, QoS flow 600 may implement aspects of or may be implemented by aspects of wireless communications system 100, wireless communications system 200, or both. QoS flow 600 may include techniques for a UE 115 to transmit a packet 605 based on a QoS configuration. For example, the UE 115 may transmit the packet 605 on a unicast sidelink (e.g., a PC5 unicast sidelink), where the QoS configuration includes a sidelink QoS flow, such as a PC5 QoS flow. In some cases, the sidelink QoS flow may include a finest granularity of QoS differentiation on the unicast sidelink. As an example, the QoS flow 600 may be used for transmitting V2X messaging (e.g., or any sidelink messaging) between two UEs 115.

In some cases, the packet 605 (e.g., V2X packet) may be sent from an application layer 610 (e.g., V2X layer) to an access stratum layer with sidelink QoS flows (e.g., PC5 QoS flows) identified by different sidelink QoS flow identifiers (e.g., PFIs, such as PC5 QoS flow identifiers). For example, the access stratum layer may include QoS rules 615 that enable filtering/mapping of sidelink packets (e.g., packet 605) to appropriate QoS flows. In some cases, the QoS rules 615 may include classification and marking of sidelink user plane traffic (e.g., an association of sidelink traffic to QoS flows, such as PC5 traffic to QoS flows), and the sidelink QoS flow identifiers may be associated with a set of sidelink QoS parameters (e.g., PQIs that indicate preconfigured mapping/parameters, such as a GBR, bearer type, etc.). Additionally, a sidelink QoS flow identifier may be unique within a same destination. In some cases, the QoS rules 615 for the sidelink interface may be located inside the application layer 610.

After using the QoS rules 615 to determine the QoS flows, the packet 605 may be forwarded to an SDAP layer 620 with an indication of the determined QoS flows. Accordingly, the SDAP layer 620 may map the QoS flows to SLRBs according to one or more SLRB configurations. In some cases, the SLRB configurations may be network-configured and/or pre-configured for NR sidelink communications. For example, for the network-configured SLRB configuration, the UE 115 may inform the network on the QoS needs, and the network may assign the SLRB configuration. Based on the SLRB configuration, the UE 115 may map the packet 605 to different layers of an SLRB. For example, the SLRB may include a PDCP layer 625, an RLC layer 630, a MAC layer 635, and a PHY layer 640, where the packet 605 is mapped to each layer based on the SLRB configuration. In some cases, this mapping and QoS flow determination may be applied to NR ProSe services support over the sidelink interface (e.g., a PC5 interface).

The QoS flow determination may include determining different QoS parameters based on the type of interface being used (e.g., for Uu, V2X sidelink, non-V2x sidelink, etc.). For example, the QoS flows may include QoS identifier values for different interfaces (e.g., 5QI for Uu services, PQIs for V2X services, and additional PQIs for non-V2X sidelink). In some cases, the sidelink QoS identifiers (e.g., QoS identifier values, such as PQIs) may include sidelink QoS characteristics associated with a sidelink QoS identifier (e.g., a PQI), such as a resource type (e.g., GBR, delay critical GBR, non-GBR, etc.), a priority level, a packet delay budget, a packet error rate, an averaging window (e.g., for GBR and delay-critical GBR resource types), a maximum data burst volume (e.g., for delay-critical GBR resource types), etc.

Additionally, the QoS parameters may include an allocation and retention policy (ARP) (e.g., supported in Uu), a reflective QoS attribute (RQA) (e.g., supported in Uu, but V2X may not include reflective QoS support), a notification control (e.g., supported in Uu), flow bit rates (e.g., guaranteed flow bit rate (GFBR), maximum flow bit rate (MFBR), etc.), aggregated bit rates (e.g., per-session aggregate maximum bit rate (AMBR), per-UE AMBR for Uu, per-link AMBR such as a PC5 LINK-AMBR for V2X and non-V2X, etc.), a range (e.g., for groupcast communication in V2X and non-V2X), a maximum packet loss rate (e.g., supported in Uu), or a combination thereof.

Figure 7:
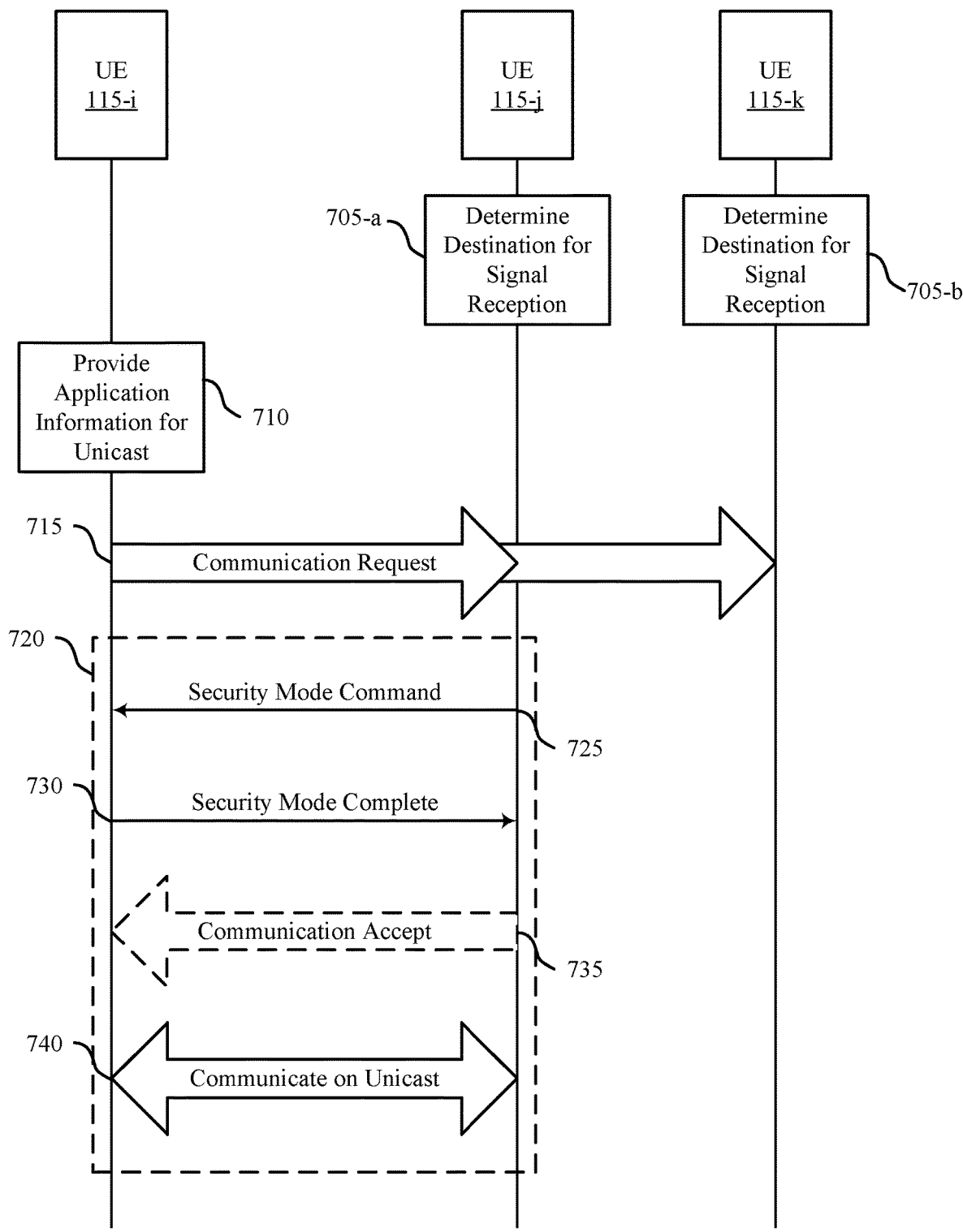
FIGS. 7 and 8 illustrate examples of QoS negotiations that support QoS support for sidelink relay service in accordance with aspects of the present disclosure.

FIG. 7 illustrates an example of QoS negotiations 700 in accordance with aspects of the present disclosure. In some examples, QoS negotiations 700 may implement aspects of or may be implemented by aspects of wireless communications system 100, wireless communications system 200, or both. QoS negotiations 700 may include a UE 115-*i*, a UE 115-*j*, and a UE 115-*k*, which may be examples of corresponding UEs 115 as described with reference to FIGS. 1-6. In some cases, QoS negotiations 700 may be used for negotiating a QoS between UEs 115 for a unicast link. For example, based on the QoS negotiations 700, during a unicast link establishment, the UEs 115 may negotiate the QoS they can support. In some cases, QoS negotiations 700 may include techniques for a non-access stratum procedure.

At 705, the UEs 115-*j* and 115-*k* may determine a destination Layer 2 identifier for signaling reception. At 710, an application layer of the UE 115-*i* may provide application information for sidelink unicast communications (e.g., a PC5 unicast communication). Subsequently, at 715, the UE 115-*i* may transmit a direct communication request to one or more UEs 115 (e.g., in a broadcast or unicast) based on the application information (e.g., target user information).

At 720, the UE 115-*i* and the UE 115-*j* may perform a UE oriented Layer 2 link establishment. For example, at 725, UE 115-*j* may transmit a direct security mode command to UE 115-*i* based on receiving the communications request. In some cases, the UE 115-*k* may refrain from transmitting a direct security mode command based on being unable to provide the requested communications.

At 730, UE 115-*i* may transmit a direct security mode complete message to UE 115-*j* based on receiving the direct security mode command. In some cases, the UE 115-*i* (e.g., a source UE) may include a requested QoS when transmitting the direct security mode command. For example, the direct security mode command may include QoS information, such as a sidelink QOS flow identifier, a QoS flow PFI, PQI, other QoS parameters, etc. (e.g., information about PC5 QoS flow(s)). For each QoS flow, a sidelink QoS flow identifier (e.g., a PFI) and corresponding sidelink QoS parameters may be configured and/or indicated (e.g., PQI and conditionally other parameters such as MFBR/GFBR, etc.).

At 735, UE 115-*j* may transmit a direct communication accept message (e.g., in a unicast transmission to UE 115-*i*). In some cases, UE 115-*j* may include accepted QoS information (e.g., QoS flow PFI, PQI, other QoS parameters) when transmitting the direct communication accept message. Subsequently, at 740, after the direct communications have been established and accepted (e.g., for a unicast link or sidelink between UE 115-*i* and UE 115-*j*), the UE 115-*i* and UE 115-*j* may communicate data (e.g., V2X service data as an example) over the unicast link.

Figure 8:
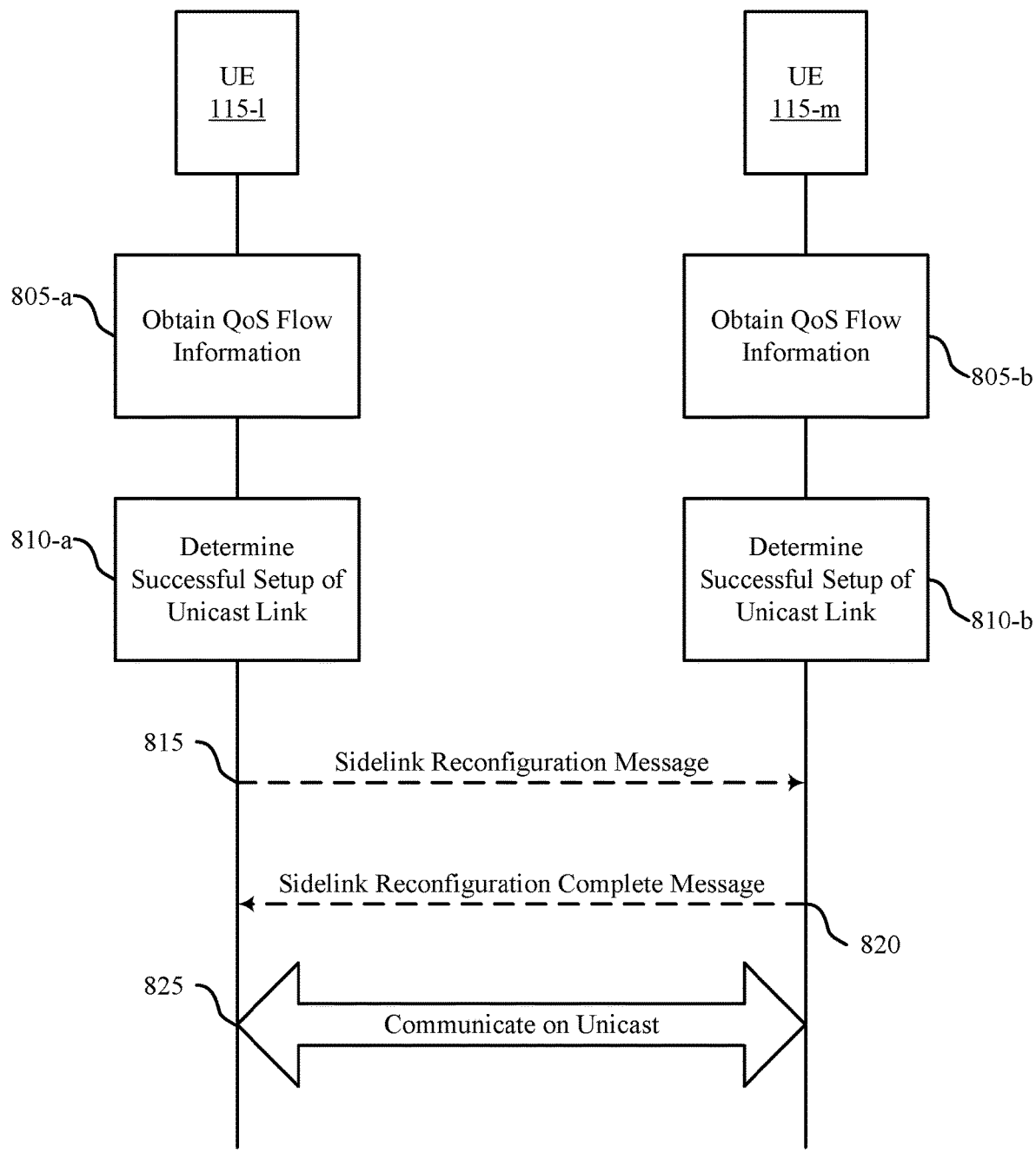

FIG. 8 illustrates an example of QoS negotiations 800 in accordance with aspects of the present disclosure. In some examples, QoS negotiations 800 may implement aspects of or may be implemented by aspects of wireless communications system 100, wireless communications system 200, or both. QoS negotiations 800 may include a UE 115-1 and a UE 115-*m*, which may be examples of corresponding UEs 115 as described with reference to FIGS. 1-7. In some cases, QoS negotiations 800 may be used for negotiating a QoS between the UEs 115 for a unicast link. For example, based on the QoS negotiations 800, during a unicast link establishment, the UEs 115 may negotiate the QoS they can support. In some cases, QoS negotiations 800 may include techniques for an access stratum procedure.

At 805, the UEs 115 may obtain QoS flow information and corresponding sidelink access stratum configurations (e.g., QoS flow to DRB mapping). In some cases, the UEs 115 may obtain this QoS flow information from either a base station 105 or network entity (e.g., via a system information block (SIB), an RRC Reconfiguration message, etc.) or through a pre-configuration.

At 810, the UEs 115 may use sidelink signaling layers (e.g., PC5-S layers) to indicate a successful setup of a unicast link (e.g., sidelink) with the other UE 115 and an accepted QoS configuration to an RRC layer of each UE 115. Once the sidelink setup is successful, the RRC of each UE 115 may use a DRB configuration to initiate an RRC reconfiguration procedure for sidelink communications with the other UE 115.

For example, at 815, the UE 115-1 may transmit an RRC reconfiguration sidelink message for the sidelink communications to the UE 115-*m*. In some cases, the RRC reconfiguration sidelink message may include a radio bearer configuration, such as a QoS flow to DRB mapping, a QoS profile of the DRB (e.g., including PQI, QoS parameters, etc.). Additionally, the PQI and other QoS parameters that are relevant for each DRB may be negotiated between the UEs 115.

At 820, UE 115-*m* may transmit an RRC reconfiguration complete sidelink message for the sidelink communications. In some cases, the RRC reconfiguration complete sidelink message may include an indication of accepted radio bearers. At 825, the UE 115-1 and the UE 115-*m* may communicate data (e.g., V2X service data as an example) over the established unicast link.

Figure 9:
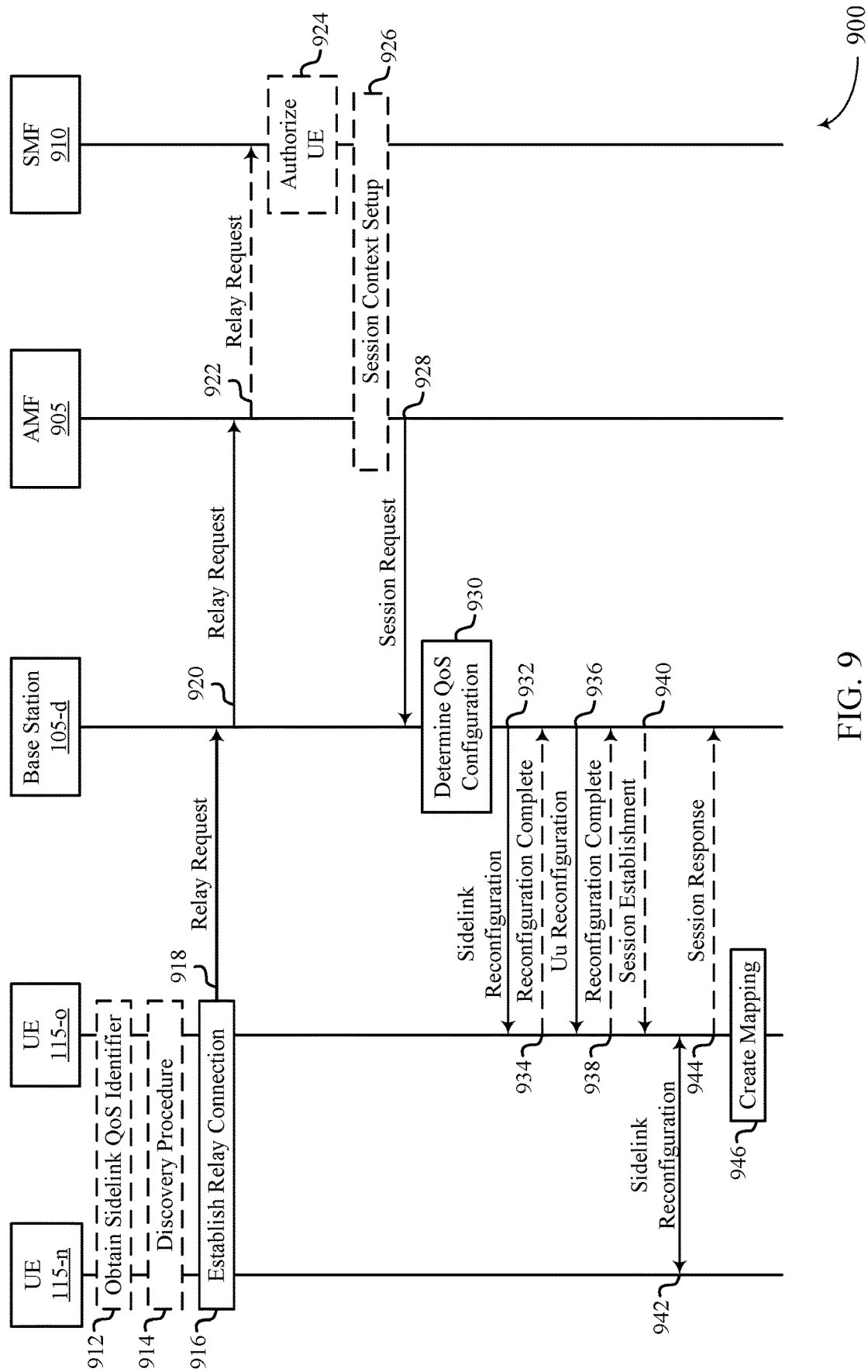
FIGS. 9 through 12 illustrate examples of process flows that supports QoS support for sidelink relay service in accordance with aspects of the present disclosure.

FIG. 9 illustrates an example of a process flow 900 that supports QoS support for sidelink relay service in accordance with aspects of the present disclosure. In some examples, the process flow 900 may implement aspects of or may be implemented by aspects of wireless communications system 100, wireless communications system 200, or both. For example, the process flow 900 may include a base station 105-*d* (e.g., a network entity, such as an NG-RAN device), a UE 115-*n*, a UE 115-*o*, an AMF 905, and an SMF 910, which may be examples of corresponding devices as described with reference to FIGS. 1-8. Additionally, the UE 115-*n* (e.g., a second UE) may be referred to as a remote UE 115, and the UE 115-*0* (e.g., a first UE) may be referred to as a relay UE 115 for routing communications from the UE 115-*n* to the base station 105-*d*, where the base station 105-*d* may be referred to as a network entity.

In the following description of the process flow 900, the operations between the base station 105-*d*, the UE 115-*n*, the UE 115-*o*, the AMF 905, and the SMF 910 may be performed in a different order than the example order shown, or the operations performed by the base station 105-*d*, the UE 115-*n*, the UE 115-*o*, the AMF 905, and the SMF 910 may be performed in different orders or at different times. Some operations may also be omitted from the process flow 900, and other operations may be added to the process flow 900.

The operations performed by the base station 105-*d*, the UE 115-*n*, the UE 115-*o*, the AMF 905, and the SMF 910 may support improvement to the QoS operations for the UEs 115 and, in some examples, may promote improvements to QoS support for the base station 105-*d* and the UEs 115, among other benefits.

At 912, the UE 115-*n* and the UE 115-*o* may obtain a sidelink QoS identifier (e.g., a PQI) to use for relay service during a policy provisioning procedure or based on a pre-configured sidelink QoS identifier for the relay service. For example, base station 105-*d* may determine a mapping configuration for mapping a first indicator associated with the first interface (e.g., a sidelink QoS identifier, such as a PQI) to a second indicator associated with the second interface (e.g., a 5QI). Subsequently, the base station 105-*d* may transmit the mapping configuration to the UE 115-*o* (e.g., and the UE 115-*n*) in a registration policy message as part of a registration procedure, a PDU session response message, a PDU session establishment accept message, a PDU session modification command acknowledgment message, or a combination thereof (e.g., at 940 described further in FIG. 9). In some cases, the base station 105-*d* may receive the mapping configuration from a network device or network entity (e.g., the AMF 905, a 5GC, etc.).

At 914, the UE 115-*n* and the UE 115-*o* may perform a UE-to-Network relay discovery procedure. For example, the UE-to-Network Relay discovery approach may be based on the use of relay service codes. In some cases, the relay service code may include an identification for a connectivity service the UE 115-*o* provides (e.g., a ProSe UE-to-Network relay). The UEs 115 may be provisioned with the authorized relay service codes as part of a policy (e.g., ProSe policy) indicated to the UEs 115 during an authorization and provisioning procedure by the PCF. During provisioning, sidelink QoS parameters (e.g., PC5 QoS parameters) may also be provisioned to the UEs 115. For example, a sidelink QoS mapping configuration may include sidelink QoS parameters for different relay service codes (e.g., PQI and other parameters) and SLRB configurations. The SLRB configurations may include a mapping of sidelink QoS profile(s) to SLRB(s) (e.g., when the UE 115 is not served by a RAN, such as E-UTRA or NR).

At 916, the UE 115-*n* and the UE 115-*o* may establish a first connection between the UE 115-*n* and the UE 115-*o*, where the first connection is associated with a relay service code. For example, the UE 115-*n* and the UE 115-*o* may establish a connection for a one-to-one sidelink communication session (e.g., a PC5 communication session over a PC5 interface). Additionally or alternatively, the connection establishment may include a link modification request for L3 relay service support and a relay service type (e.g., where QoS flows and DRBs are set up for a PC5 QoS as described above with reference to FIGS. 2-8). During the unicast link setup/link modification, the UEs 115 may configure a sidelink QoS based on the relay service code to a sidelink QoS identifier mapping received during a policy (e.g., ProSe policy) provisioning (as described with reference to FIG. 2).

In some cases, the UE 115-*o* may either initiate a new relay PDU session establishment procedure or an existing PDU session modification procedure to request the network to setup QoS flows satisfying the QoS needs of the relaying service. Additionally, the UE 115-*n* may indicate an L3 relaying request and the relay service type in the unicast link setup or unicast link modification message to the UE 115-*o*. For example, the UE 115-*o* may receive, from the UE 115-*n*, a relaying request comprising an indication of the relay service code and may establish the unicast sidelink connection with the UE 115-*n* based on receiving the relaying request. In some cases, the UE 115-*o* may reject the unicast link setup with a specific cause value (e.g., such as a specified relaying operation cannot be supported for non-emergency services).

At 918, the UE 115-*o* may transmit a relay PDU session establishment request or modification request (e.g., in a request) to the base station 105-*d* (e.g., a network entity). For example, UE 115-*o* may transmit, to the base station 105-*d*, a request that includes the relay service code and an indication of a relay connection for the UE 115-*n* via the UE 115-*o*, the relay connection composed of the first connection between the UE 115-*n* and the UE 115-*o* and a second connection between the UE 115-*o* and the base station 105-*d*. In some cases, the relay PDU session establishment request or modification request may indicate support for L3 relaying for a specific relay service code. For example, UE 115-*o* may transmit an indication that the established PDU session is for operation over a L3 relay connection and for the specific relay service code in the PDU session establishment request/PDU session modification request.

At 920, the base station 105-*d* may transmit an N2 message to the AMF 905 (e.g., as part of an additional network entity). The N2 message may include an L3 relaying indication, the relay service code, a UE non-access stratum message, or a combination thereof. In some cases, the base station 105-*d* may inform the AMF 905 about the PDU session for the relay connection by forwarding the UE non-access stratum message including the L3 relay request indication and the relay service type field to the AMF 905. Additionally or alternatively, the base station 105-*d* may inform the AMF 905 about the PDU session for the relay connection by including an L3 relay request indication and the relay service type fields in the N2 message.

At 922, the AMF 905 may transmit an Nsmf message to the SMF 910. In some cases, the Nsmf message may indicate support for the L3 relaying for a specific relay service code. For example, the AMF 905 may forward the fields received from the base station 105-*d* in the N2 message to the SMF 910 in the Nsmf message(s).

At 924, the SMF 910 may check PCC rules to verify if the specific relaying service (e.g., indicated by the relay service code) is authorized and which QoS to use for this PDU session. For example, the SMF 910 may check the PCC rules to verify if the UE 115-*o* (e.g., relay UE) is authorized for supporting the specific relay service and may obtain a QoS to use for this relaying PDU session from the PCC rules.

At 926, the AMF 905 and the SMF 910 may set up a UE PDU session context based on the SMF 910 determining that the UE 115-*o* is authorized to handle the relaying service indicated by the relay service code. Additionally, the AMF 905 and the SMF 910 may determine a QoS configuration for the relay connection for the PDU session context, where the QoS configuration includes a first configuration associated with the PC5 interface of the first connection (e.g., PQI) and a second configuration associated with the Uu interface of the second connection (e.g., 5QI).

At 928, the AMF 905 may transmit a PDU session request to the base station 105-*d*. In some cases, the PDU session request may include an indication of the L3 relaying, a 5QI, or additional QoS flows. For example, the AMF 905 may inform the base station 105-*d* that the PDU Session is for L3 relaying and end-to-end QoS needs for the relaying service (e.g., PQI and 5QI needs).

At 930, the base station 105-*d* may determine a QoS configuration for the relaying connection (e.g., over a Uu interface and a sidelink interface for relaying DRBs to meet end-to-end QoS). For example, the base station 105-*d* may determine the QoS configuration based on a QoS that can be allocated for the Uu interface (e.g., connection between the UE 115-*o* and the base station 105-*d*) and may determine whether to modify a sidelink QoS.

In some cases, the base station 105-*d* may determine a QoS configuration for the relay connection, the QoS configuration including a first configuration associated with a first interface (e.g., sidelink interface, such as a PC5 interface) of the first connection and a second configuration associated with a second interface (e.g., Uu interface) of the second connection. For example, the base station 105-*d* may determine a first QoS indicator for the first interface (e.g., a sidelink QoS identifier, such as a PQI), a second QoS indicator for the second interface (e.g., a 5QI), or both. In some cases, the first QoS indicator, the second QoS indicator, or both may be determined based on an end-to-end QoS for the relay connection. Additionally, the first QoS indicator, the second QoS indicator, or both may be indicative of a QoS identifier associated with a resource type, a priority level, a packet delay budget, a packet error rate, an averaging window duration, a maximum data burst volume, or a combination thereof, for different types of services.

At 932, the base station 105-*d* may transmit, to the UE 115-*o*, a configuration message based on determining the QoS configuration, where the configuration message includes the first configuration and the second configuration. For example, the base station 105-*d* may inform the UE 115-*o* regarding the sidelink DRB/access stratum configuration for the end-to-end QoS configuration. In some cases, the configuration message may be an RRC reconfiguration message.

At 934, the UE 115-*o* may transmit an RRC reconfiguration complete message to the base station 105-*d* to indicate the configuration message was successfully received (e.g., for the PC5 information).

At 936, the base station 105-*d* may transmit the configuration message to the UE 115-*o*, including a Uu DRB/access stratum configuration for the end-to-end QoS configuration.

At 938, the UE 115-*o* may transmit an RRC reconfiguration complete message to the base station 105-*d* to indicate the configuration message was successfully received (e.g., for the Uu information).

At 940, the base station 105-*d* may transmit a PDU session establishment accept/modification command message to the UE 115-*o* (e.g., via a Uu path/interface). In some cases, the PDU session establishment accept/modification command message (e.g., a PDU session establishment/modification response message) may include a container indicating sidelink QoS identifier (e.g., PQI) to 5QI mapping information for relaying traffic between the UE 115-*n* and the base station 105-*d* (e.g., a QoS mapping configuration for mapping between the PQI and the 5QI). Additionally or alternatively, the UE 115-*n* may receive a PDU session establishment/modification message from an additional base station 105 (e.g., via a Uu path/interface), where the PDU session establishment/modification message includes the sidelink QoS identifier to 5QI mapping information. Subsequently, the UE 115-*n* may use the sidelink QoS identifier to 5QI mapping information to determine sidelink QoS identifiers to use for services switched with a specific 5QI over a Uu path to a sidelink relay path. For example, the UE 115-*n* may use the sidelink QoS identifier to 5QI mapping information to determine sidelink QoS identifiers for services initially performed on a Uu path between the additional base station 105 and the UE 115-*n* to a sidelink relay path between the UE 115-*n* and the base station 105-*d* via UE 115-*o*.

In some cases, the sidelink QoS identifier to 5QI mapping information may also be used to switch from a sidelink path (e.g., PC5 path) to a Uu path, where the UE 115-*n* and the UE 115-*o* may use the mapping configuration to determine a 5QI corresponding to a sidelink QoS identifier of the service being switched. For example, the UE 115-*n* may switch services from the relay connection that is using the sidelink path to a Uu path to communicate directly with the base station 105-*d* or the additional base station 105, where the sidelink QoS identifier to 5QI mapping information is used to determine a 5QI for the Uu path that corresponds to a sidelink QoS identifier that was used for the service on the sidelink path.

At 942, the UE 115-*n* and the UE 115-*o* may perform a sidelink reconfiguration procedure (e.g., RRCReconfigurationSidelink). For example, the UE 115-*o* may modify the sidelink connection (e.g., PC5 link) with the UE 115-*n* based on the configuration information received at 932 and 936 (e.g., to satisfy the relaying QoS needs). In some cases, the sidelink reconfiguration procedure may include an RRC reconfiguration complete message for the sidelink connection (e.g., unicast link).

At 944, the UE 115-*o* may transmit a PDU session response message to the base station 105-*d*.

At 946, the UE 115-*o* may create a mapping between a sidelink QoS flow identifier (e.g., a PFI) and a QFI, a mapping between LCH identifiers for the sidelink interface and Uu interface, or use a sidelink QoS identifier to 5QI mapping for relaying communications between the UE 115-*n* and the base station 105-*d*. For example, the UE 115-*o* may create a mapping between the sidelink QoS flow identifier to QFI, between the sidelink LCH identifier and Uu LCH identifier, or both based on the RRC Reconfiguration messages over the sidelink interface and the Uu interface. Additionally or alternatively, the UE 115-*o* may use the sidelink QoS identifier to 5QI mapping information to create the mapping between the sidelink QoS flow identifier and the QFI.

Figure 10:
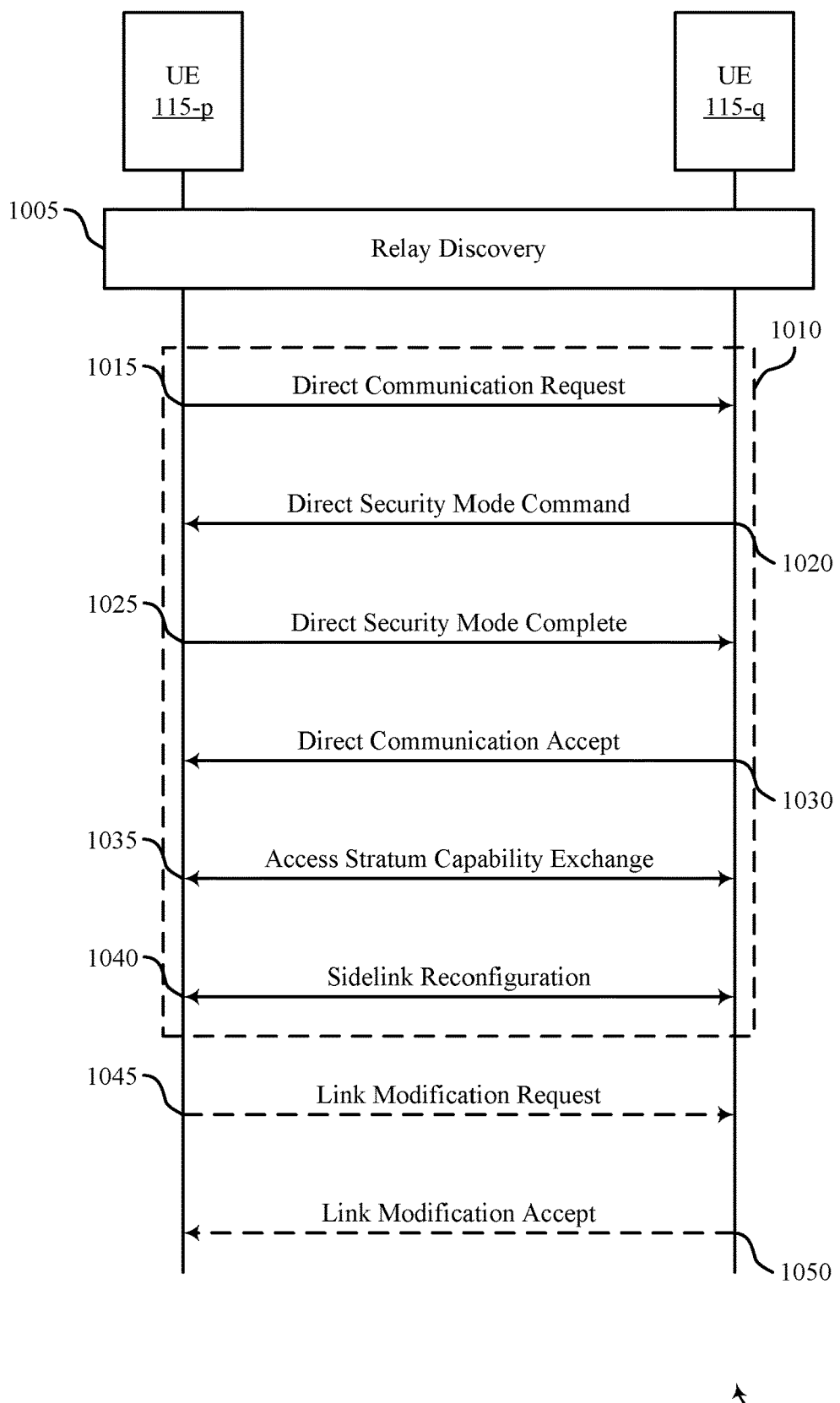

FIG. 10 illustrates an example of a process flow 1000 that supports QoS support for sidelink relay service in accordance with aspects of the present disclosure. In some examples, process flow 1000 may implement aspects of or may be implemented by aspects of wireless communications system 100, wireless communications system 200, or both. For example, the process flow 1000 may include a UE 115-*p* and a UE 115-*q*, which may be examples of corresponding UEs 115 as described with reference to FIGS. 1-9. Additionally, the UE 115-*p* (e.g., a second UE) may be referred to as a remote UE 115, and the UE 115-*q* (e.g., a first UE) may be referred to as a relay UE 115 for routing communications from the UE 115-*p* to a base station 105, where the base station 105 may be referred to as a network entity.

In the following description of the process flow 1000, the operations between the UE 115-*p* and the UE 115-*q* may be performed in a different order than the example order shown, or the operations performed by the UE 115-*p* and the UE 115-*q* may be performed in different orders or at different times. Some operations may also be omitted from the process flow 1000, and other operations may be added to the process flow 1000. The operations performed by UE 115-*p* and the UE 115-*q* may support improvement to the UE QoS operations and, in some examples, may promote improvements to QoS support for the base station 105 and the UEs 115, among other benefits.

At 1005, the UE 115-*p* and the UE 115-*q* may perform a relay discovery procedure. In some cases, the relay discovery procedure may be similar to the procedure described with reference to FIG. 9.

At 1010, the UE 115-*p* and the UE 115-*q* may perform a unicast establishment procedure for establishing a link for sidelink communications. For example, the UE 115-*p* and the UE 115-*q* may establish a first connection between each other, where the first connection is associated with a relay service code.

At 1015, the UE 115-*p* may transmit a direct communication request to the UE 115-*q*. In some cases, the direct communication request may include an L3 relaying request, a relay service code, etc.

At 1020, the UE 115-*q* may transmit a direct security mode command to the UE 115-*p*. Subsequently, at 1025, the UE 115-*p* may transmit a direct security mode complete message.

At 1030, the UE 115-*q* may transmit a direct communication accept message to the UE 115-*p*. In some cases, the direct communication accept message may establish the unicast link between the two UEs 115.

At 1035, the UE 115-*p* and the UE 115-*q* may exchange UE access stratum capabilities. Additionally, at 1040, the UE 115-*p* and the UE 115-*q* may perform an RRC reconfiguration procedure for the sidelink communications (e.g., a RRCReconfigurationSidelink procedure, RRCReconfigurationCompleteSidelink, etc.). In some cases, the RRC reconfiguration procedure for the sidelink communications may include a unicast sidelink configuration determination (e.g., a PC5 unicast link configuration determination).

In some cases, at 1045, the UE 115-*p* may transmit a link modification request to the UE 115-*q*. For example, the link modification request may include an L3 Relaying service request, a relay service code, etc. Subsequently, at 1050, the UE 115-*q* may transmit a link modification accept message to the UE 115-*p* based on receiving the link modification request message.

Figure 11:
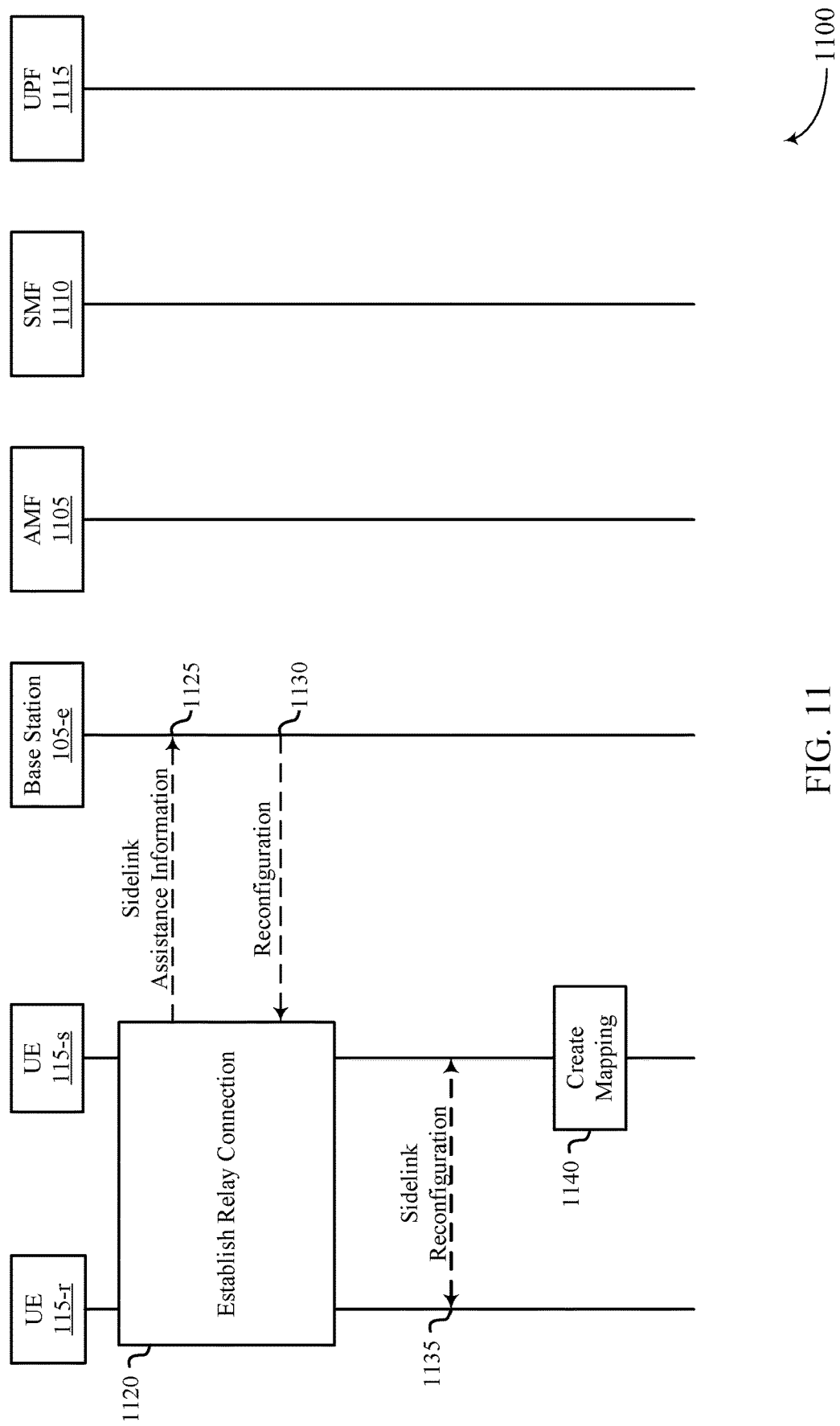

FIG. 11 illustrates an example of a process flow 1100 that supports QoS support for sidelink relay service in accordance with aspects of the present disclosure. In some examples, the process flow 1100 may implement aspects of or may be implemented by aspects of wireless communications system 100, wireless communications system 200, or both. For example, the process flow 1100 may include a base station 105-*e* (e.g., a network entity, such as an NG-RAN device), a UE 115-*r*, a UE 115-*s*, an AMF 1105, an SMF 1110, and a UPF 1115 which may be examples of corresponding devices as described with reference to FIGS. 1-10. Additionally, the UE 115-*r* (e.g., a second UE) may be referred to as a remote UE 115, and the UE 115-*s* (e.g., a first UE) may be referred to as a relay UE 115 for routing communications from the UE 115-*r* to the base station 105-*e*, where the base station 105-*e* may be referred to as a network entity. In some cases, the process flow 1100 may be used for a QoS setup/modification during a unicast link setup or modification as part of a RAN-centric solution.

In the following description of the process flow 1100, the operations between the base station 105-*e*, the UE 115-*r*, the UE 115-*s*, the AMF 1105, the SMF 1110, and the UPF 1115 may be performed in a different order than the example order shown, or the operations performed by the base station 105-*e*, the UE 115-*r*, the UE 115-*s*, the AMF 1105, the SMF 1110, and the UPF 1115 may be performed in different orders or at different times. Some operations may also be omitted from the process flow 1100, and other operations may be added to the process flow 1100. The operations performed by the base station 105-*e*, the UE 115-*r*, the UE 115-*s*, the AMF 1105, the SMF 1110, and the UPF 1115 may support improvement to the UE QoS operations and, in some examples, may promote improvements to QoS support for the wireless devices, among other benefits.

At 1120, the UE 115-*r* and the UE 115-*s* may establish a connection for a one-to-one sidelink communication session (e.g., PC5 communication session). Additionally or alternatively, the connection between the UE 115-*r* and the UE 115-*s* may be established based on a link modification request for L3 relay service support for a relay service type. In some cases, the UE 115-*r* and the UE 115-*s* may determine or receive QoS flows and DRBs with a sidelink QoS setup (e.g., PC5 QoS setup) as described above with reference to FIGS. 2 and 9. In some cases, the UE 115-*r* may indicate the L3 relaying request in a unicast sidelink setup message (e.g., PC5 unicast link setup message) or a unicast sidelink modification message (e.g., PC5 unicast link modification message) to the UE 115-*s*.

At 1125, the UE 115-*s* may transmit assistance information to the base station 105-*e*. For example, the assistance information may include a SidelinkUEAssistanceInformation message that includes L3 relaying support, a sidelink QoS identifier (e.g., a PQI) needed for the sidelink interface (e.g., PC5 interface) and the L3 relaying request, etc.

At 1130, the base station 105-*e* may transmit a reconfiguration message to the UE 115-*s*. For example, the reconfiguration message may be an RRC reconfiguration message. In some cases, the reconfiguration message may include a sidelink relaying QoS configuration (e.g., a PC5 relaying QoS configuration, such as a PFI to SLRB mapping), a sidelink interface access stratum configuration, etc. Additionally, the base station 105-*e* may transmit the reconfiguration message considering a 5QI to sidelink QoS identifier mapping for the indicated relay service.

At 1135, the UE 115-*r* and the UE 115-*s* may perform a sidelink reconfiguration procedure based on the reconfiguration message received from the base station 105-*e*. For example, the sidelink reconfiguration procedure may include a sidelink RRCReconfigurationSidelink message and RRCReconfigurationSidelink complete message. The sidelink reconfiguration procedure may be used to modify a sidelink (e.g., PC5 link) to satisfy the relaying QoS needs.

At 1140, the UE 115-*s* may create a mapping between a sidelink QoS flow identifier (e.g., PFI) and QFI or LCH identifiers for the different interfaces for relaying messages between the UE 115-*r* and the UE 115-*s*.

Figure 12:
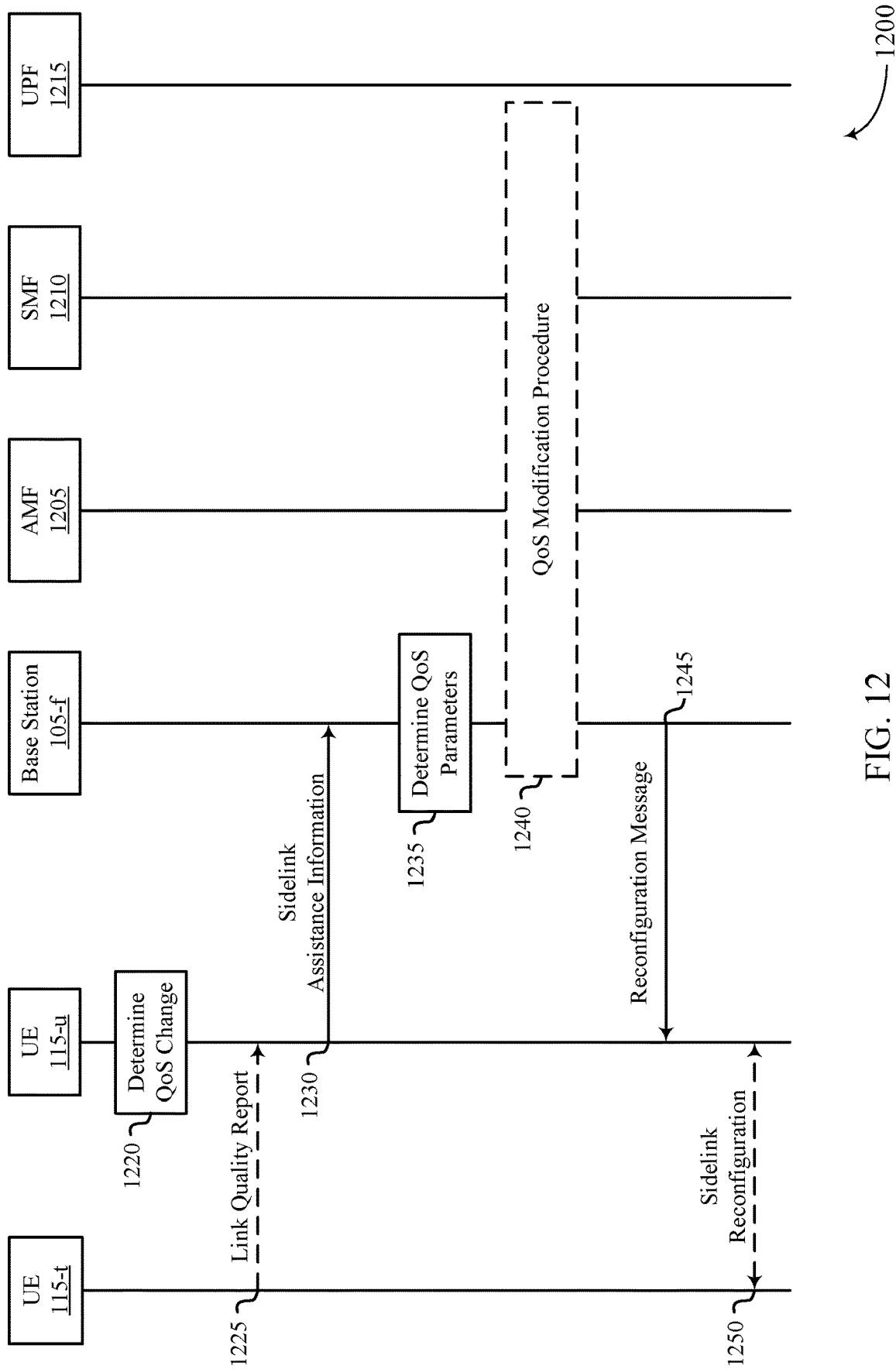

FIG. 12 illustrates an example of a process flow 1200 that supports QoS support for sidelink relay service in accordance with aspects of the present disclosure. In some examples, the process flow 1200 may implement aspects of or may be implemented by aspects of wireless communications system 100, wireless communications system 200, or both. For example, the process flow 1200 may include a base station 105-*f* (e.g., a network entity, such as an NG-RAN device), a UE 115-*t*, a UE 115-*u*, an AMF 1205, an SMF 1210, and a UPF 1215 which may be examples of corresponding devices as described with reference to FIGS. 1-11. Additionally, the UE 115-*t* (e.g., a second UE) may be referred to as a remote UE 115, and the UE 115-*u* (e.g., a first UE) may be referred to as a relay UE 115 for routing communications from the UE 115-*t* to the base station 105-*f*, where the base station 105-*f* may be referred to as a network entity. In some cases, the process flow 1100 may be used for a QoS modification based on a change in channel conditions of a PC5 link as part of a RAN-centric solution.

In the following description of the process flow 1200, the operations between the base station 105-*f*, the UE 115-*t*, the UE 115-*u*, the AMF 1205, the SMF 1210, and the UPF 1215 may be performed in a different order than the example order shown, or the operations performed by the base station 105-*f*, the UE 115-*t*, the UE 115-*u*, the AMF 1205, the SMF 1210, and the UPF 1215 may be performed in different orders or at different times. Some operations may also be omitted from the process flow 1200, and other operations may be added to the process flow 1200. The operations performed the base station 105-*f*, the UE 115-*t*, the UE 115-*u*, the AMF 1205, the SMF 1210, and the UPF 1215 may support improvement to the UE QoS operations and, in some examples, may promote improvements to QoS support for the wireless devices, among other benefits.

At 1220, the UE 115-*u* may determine that a packet delay budget for a sidelink (e.g., PC5 link) between the UE 115-*u* and the UE 115-*t* and/or other QoS parameters that can be met have changed. For example, the UE 115-*u* may identify that the QoS (e.g., packet delay budget, packet error rate, etc. for the sidelink interface or PC5 interface) that can be supported on the sidelink have changed (e.g., due to mobility of the UE 115-*u*, the UE 115-*t*, etc.). In some cases, the UE 115-*u* may determine this change autonomously or based on information from the UE 115-*t* (e.g., for reception link performance).

For example, at 1225, the UE 115-*t* may transmit a link quality report to the UE 115-*u* (e.g., a PC5 RRC message, such as a LinkqualityReport). In some cases, the link quality report may include a DRB identifier, a sidelink (e.g., PC5) packet delay budget, sidelink (e.g., PC5) packet error rate, other QoS metrics. Additionally, the link quality may be reported periodically or may be reported based on an event triggered basis by the UE 115-*t* and the UE 115-*u*. For example, the event trigger may be based on a criteria being above or below a threshold.

At 1230, UE 115-*u* may transmit assistance information to the base station 105-*f* (e.g., such as SidelinkUEAssistanceInformation) based on determining the QoS change. For example, the assistance information may include L3 relaying information, such as a sidelink/PC5 DRB identifier, a sidelink/PC5 packet delay budget, a sidelink/PC5 packet error rate, or other QoS parameters. In some cases, the UE 115-*u* may transmit the assistance information indicating the changed QoS needs (e.g., as indicated based on the L3 relaying information).

At 1235, the base station 105-*f* may determine a QoS configuration based on the assistance information. For example, the base station 105-*f* may determine a Uu packet delay budget and QoS parameters to be supported to satisfy the end-to-end QoS for relaying. In some cases, the base station 105-*f* may determine the impact on the Uu QoS to meet the end-to-end QoS for relaying when determining the QoS configuration.

At 1240, the base station 105-*f*, the AMF 1205, and the SMF 1210 may perform an access node-initiated QoS modification. For example, the base station 105-*f* and the AMF 1205 may forward the modified Uu QoS needs to the SMF 1210 for relaying. In some cases, the base station 105-*f*, the AMF 1205, and the SMF 1210 may performs the access node-initiated QoS modification procedure with a core network (e.g., 5GC).

Subsequently, at 1245, the base station 105-*f* may inform the UE 115-*u* of the modified QoS for the Uu interface and the sidelink interface. For example, the base station 105-*f* may transmit a reconfiguration message (e.g., NR RRC Reconfiguration message) indicating a sidelink relaying QoS configuration (e.g., a PC5 relaying QoS configuration, such as a PFI to SLRB mapping), a sidelink access stratum configuration (e.g., a PC5 access stratum configuration), or a combination thereof.

At 1250, the UE **115-*t* and the UE 115-*u* may perform a sidelink reconfiguration procedure based on the reconfiguration message received from the base station 105-*f***. For example, the sidelink reconfiguration procedure may include a sidelink RRCReconfigurationSidelink message and RRCReconfigurationSidelink complete message. The sidelink reconfiguration procedure may be used to modify a sidelink (e.g., PC5 link) to satisfy the relaying QoS needs.

Figure 13:
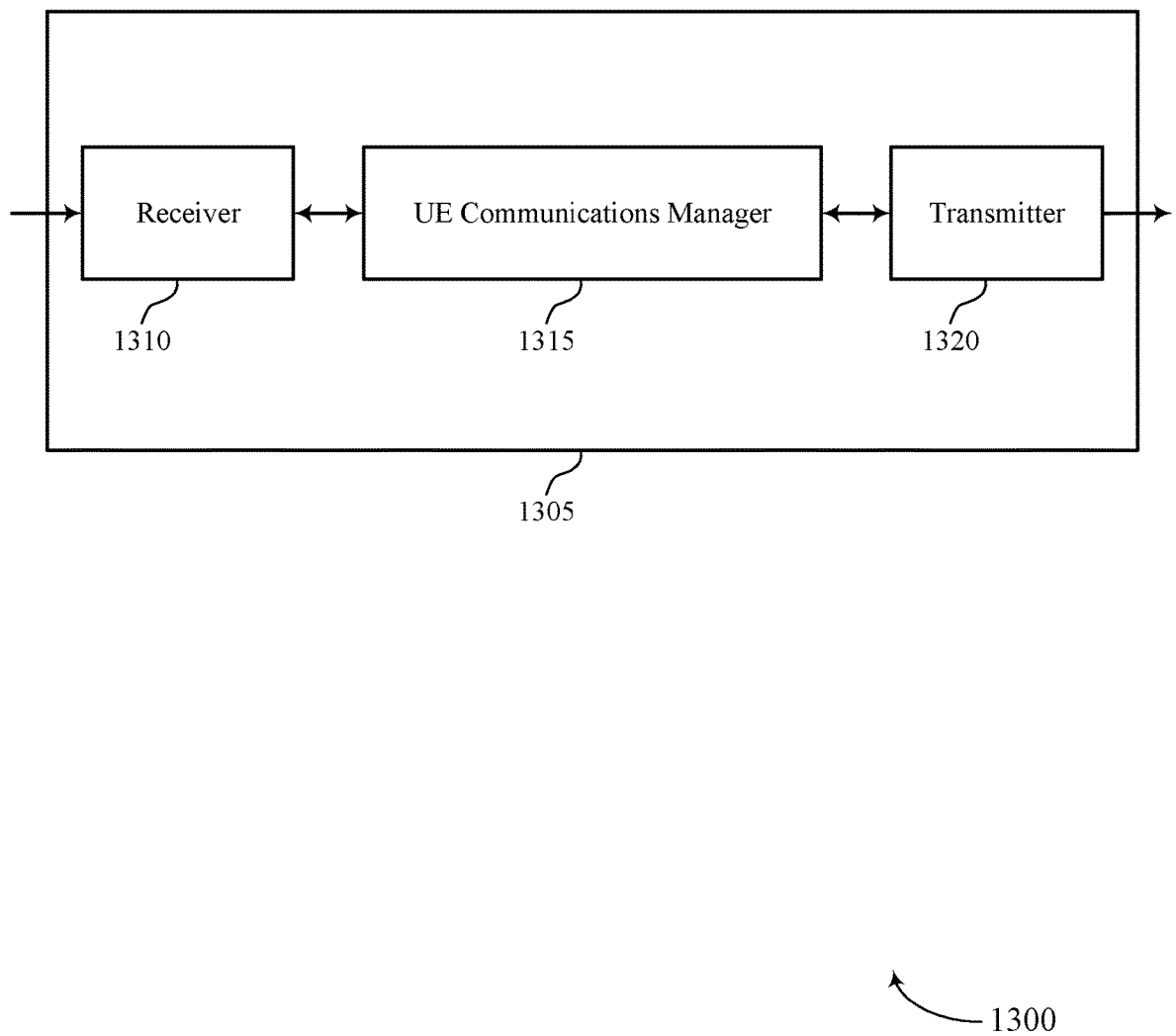
FIGS. 13 and 14 show block diagrams of devices that support QoS support for sidelink relay service in accordance with aspects of the present disclosure.

FIG. 13 shows a block diagram 1300 of a device 1305 that supports QoS support for sidelink relay service in accordance with aspects of the present disclosure. The device 1305 may be an example of aspects of a UE 115 as described herein. The device 1305 may include a receiver 1310, a UE communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to QoS support for sidelink relay service, etc.). Information may be passed on to other components of the device 1305. The receiver 1310 may be an example of aspects of the transceiver 1620 described with reference to FIG. 16. The receiver 1310 may utilize a single antenna or a set of antennas.

The UE communications manager 1315 may support wireless communications at a first UE (e.g., relay UE) in accordance with examples as disclosed herein. For example, the UE communications manager 1315 may transmit, to a network entity, an indication for a relay connection for a second UE via the first UE, the relay connection including a first connection between the first UE and the second UE and a second connection between the first UE and the network entity. In some cases, the UE communications manager 1315 may receive, from the network entity, a QoS mapping configuration for mapping a first QoS configuration associated with a first interface to a second QoS configuration associated with a second interface, or for mapping the second QoS configuration associated with the second interface to the first QoS configuration associated with the first interface, or a combination thereof. Additionally, the UE communications manager 1315 may configure a first QoS of the first connection and a second QoS of the second connection based on the QoS mapping configuration. Accordingly, the UE communications manager 1315 may route traffic from the second UE to the network entity via the relay connection based on the first QoS and the second QoS.

Additionally or alternatively, the UE communications manager 1315 may support wireless communications at a second UE (e.g., remote UE) in accordance with examples as disclosed herein. For example, the UE communications manager 1315 may receive, from a first network entity, a QoS mapping configuration message, the QoS mapping configuration message including a mapping between a first interface of a first connection between a first UE and the second UE and a second interface of a second connection between the first UE and a second network entity, the first connection associated with a relay service code. In some cases, the UE communications manager 1315 may configure a QoS of the first connection based on the QoS mapping configuration message. The UE communications manager 1315 may communicate with the second network entity via the first UE using the first connection based on the configured QoS.

Additionally or alternatively, the UE communications manager 1315 may support wireless communications at a first UE (e.g., relay UE) in accordance with examples as disclosed herein. For example, the UE communications manager 1315 may establish a first connection between the first UE and a second UE, the first connection associated with a relay service code. In some cases, the UE communications manager 1315 may transmit, to a base station, a request including the relay service code and an indication of a relay connection for the second UE via the first UE, the relay connection including the first connection between the first UE and the second UE and a second connection between the first UE and the base station. Additionally, the UE communications manager 1315 may receive, from the base station, a configuration message in response to transmitting the request, the configuration message including a first configuration associated with a first interface of the first connection and a second configuration associated with a second interface of the second connection. Subsequently, the UE communications manager 1315 may determine a QoS configuration based on the first configuration and the second configuration. Accordingly, the UE communications manager 1315 may route traffic from the second UE to the base station via the relay connection based on the QoS configuration.

Additionally or alternatively, the UE communications manager 1315 may support wireless communications at a second UE (e.g., remote UE) in accordance with examples as disclosed herein. For example, the UE communications manager 1315 may establish a first connection between a first UE and the second UE, the first connection associated with a relay service code. In some cases, the UE communications manager 1315 may receive, from a first base station, a mapping configuration message, the mapping configuration message including a mapping between a first interface of the first connection and a second interface of a second connection between the first UE and a second base station. Additionally, the UE communications manager 1315 may determine a QoS configuration based on the mapping configuration message. The UE communications manager 1315 may communicate with the second base station via the first UE using the first connection based on the QoS configuration. The UE communications manager 1315 may be an example of aspects of the UE communications manager 1610 described herein.

The UE communications manager 1315 as described herein may be implemented to realize one or more potential improvements. One implementation may allow the device 1305 to save power and increase battery life by communicating with a network entity (e.g., a base station 105 as shown in FIG. 1) more efficiently. For example, the device 1305 may efficiently communicate with a base station 105 via another UE, as the device 1305 may be able to determine an end-to-end QoS configuration for a relay connection and improve reliability of transmissions based on the QoS configuration.

The UE communications manager 1315, or its sub-components, may be implemented in hardware, code (e.g., software or firmware) executed by a processor, or any combination thereof. If implemented in code executed by a processor, the functions of the UE communications manager 1315, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 1315, or its sub-components, may be physically located at various positions, including being distributed such that portions of functions are implemented at different physical locations by one or more physical components. In some examples, the UE communications manager 1315, or its sub-components, may be a separate and distinct component in accordance with various aspects of the present disclosure. In some examples, the UE communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
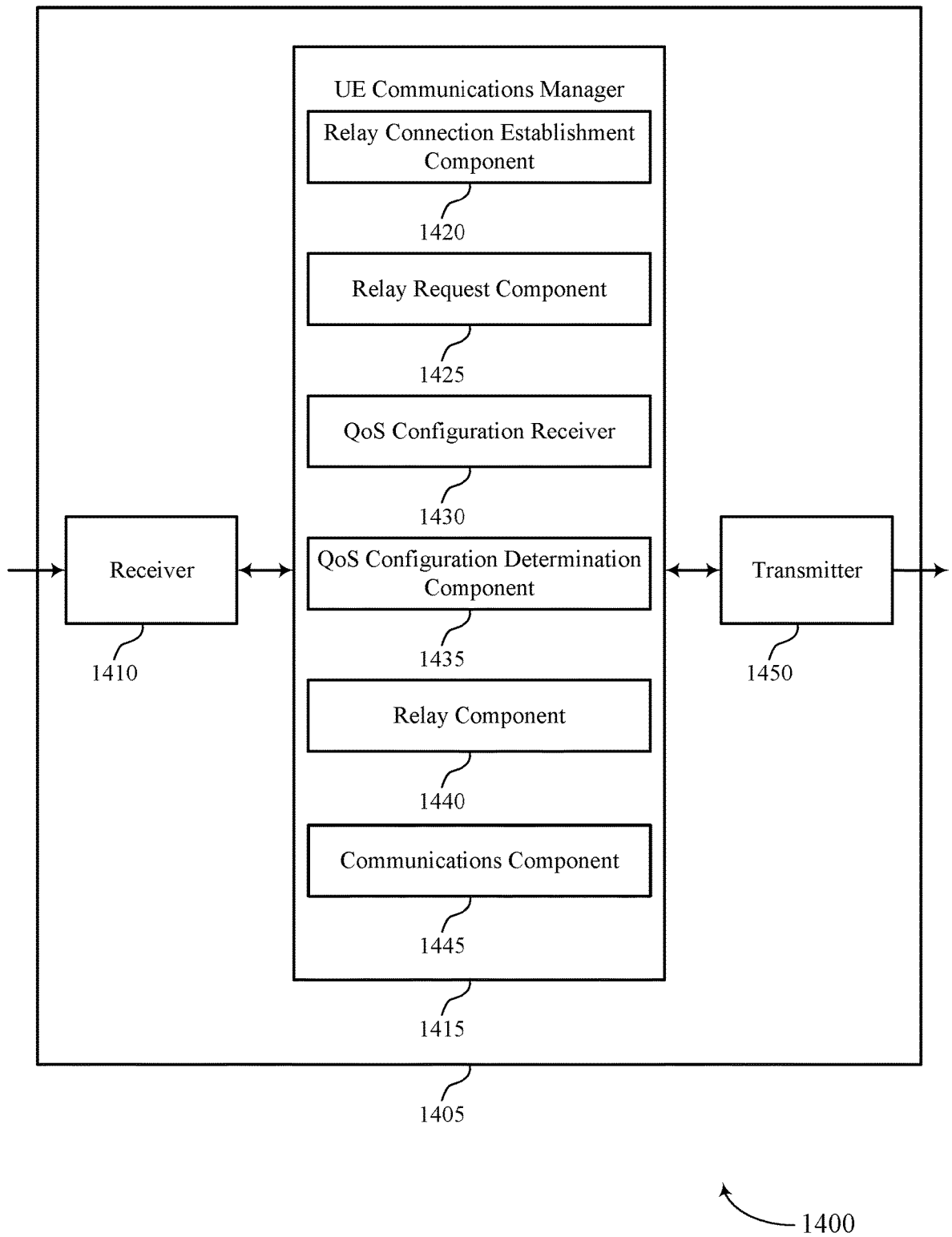

FIG. 14 shows a block diagram 1400 of a device 1405 that supports QoS support for sidelink relay service in accordance with aspects of the present disclosure. The device 1405 may be an example of aspects of a device 1305, or a UE 115 as described herein. The device 1405 may include a receiver 1410, a UE communications manager 1415, and a transmitter 1450. The device 1405 may also include a processor. Each of these components may be in communication with one another (e.g., via one or more buses).

The receiver 1410 may receive information such as packets, user data, or control information associated with various information channels (e.g., control channels, data channels, and information related to QoS support for sidelink relay service, etc.). Information may be passed on to other components of the device 1405. The receiver 1410 may be an example of aspects of the transceiver 1620 described with reference to FIG. 16. The receiver 1410 may utilize a single antenna or a set of antennas.

The UE communications manager 1415 may be an example of aspects of the UE communications manager 1315 as described herein. The UE communications manager 1415 may include a relay connection establishment component 1420, a relay request component 1425, a QoS configuration receiver 1430, a QoS configuration determination component 1435, a relay component 1440, and a communications component 1445. The UE communications manager 1415 may be an example of aspects of the UE communications manager 1610 described herein.

The relay connection establishment component 1420 may establish a first connection between a first UE and a second UE, the first connection associated with a relay service code.

The relay request component 1425 may transmit, to a network entity, an indication for a relay connection for a second UE via the first UE, the relay connection including a first connection between the first UE and the second UE and a second connection between the first UE and the network entity. Additionally or alternatively, the relay request component 1425 may transmit, to a base station, a request including the relay service code and an indication of a relay connection for the second UE via the first UE, the relay connection including the first connection between the first UE and the second UE and a second connection between the first UE and the base station.

The QoS configuration receiver 1430 may receive, from the network entity, a QoS mapping configuration for mapping a first QoS configuration associated with a first interface to a second QoS configuration associated with a second interface, or for mapping the second QoS configuration associated with the second interface to the first QoS configuration associated with the first interface, or a combination thereof. Additionally or alternatively, the QoS configuration receiver 1430 may receive, from the base station, a configuration message in response to transmitting the request, the configuration message including a first configuration associated with a first interface of the first connection and a second configuration associated with a second interface of the second connection.

In some examples, the QoS configuration receiver 1430 may receive, from a first network entity, a QoS mapping configuration message, the QoS mapping configuration message including a mapping between a first interface of a first connection between a first UE and the second UE and a second interface of a second connection between the first UE and a second network entity, the first connection associated with a relay service code. In some cases, the QoS configuration receiver 1430 may receive from a first base station, a mapping configuration message, the mapping configuration message including a mapping between a first interface of the first connection and a second interface of a second connection between the first UE and a second base station.

The QoS configuration determination component 1435 may configure a first QoS of the first connection and a second QoS of the second connection based on the QoS mapping configuration. Additionally or alternatively, the QoS configuration determination component 1435 may determine a QoS configuration based on the first configuration and the second configuration. In some examples, the QoS configuration determination component 1435 may configure a QoS of the first connection based on the QoS mapping configuration message. In some cases, the QoS configuration determination component 1435 may determine a QoS configuration based on the mapping configuration message.

The relay component 1440 may route traffic from the second UE to the network entity via the relay connection based on the first QoS and the second QoS. Additionally or alternatively, the relay component 1440 may route traffic from the second UE to the base station via the relay connection based on the QoS configuration.

The communications component 1445 may communicate with the second network entity via the first UE using the first connection based on the configured QoS. Additionally or alternatively, the communications component 1445 may communicate with the second base station via the first UE using the first connection based on the QoS configuration.

The transmitter 1450 may transmit signals generated by other components of the device 1405. In some examples, the transmitter 1450 may be collocated with a receiver 1410 in a transceiver module. For example, the transmitter 1450 may be an example of aspects of the transceiver 1620 described with reference to FIG. 16. The transmitter 1450 may utilize a single antenna or a set of antennas.

Figure 15:
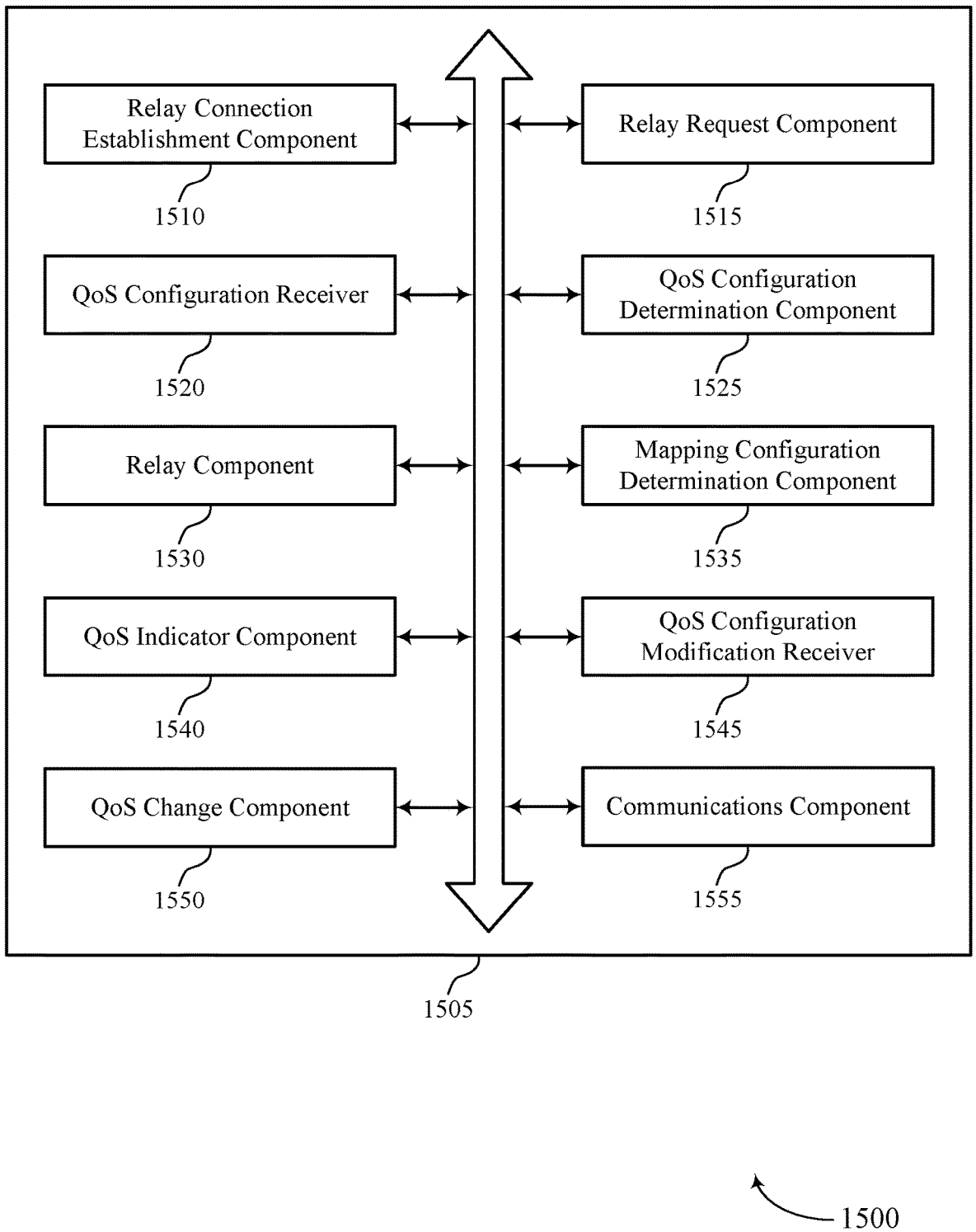
FIG. 15 shows a block diagram of a UE communications manager that supports QoS support for sidelink relay service in accordance with aspects of the present disclosure.

FIG. 15 shows a block diagram 1500 of a UE communications manager 1505 that supports QoS support for sidelink relay service in accordance with aspects of the present disclosure. The UE communications manager 1505 may be an example of aspects of a UE communications manager 1315, a UE communications manager 1415, or a UE communications manager 1610 described herein. The UE communications manager 1505 may include a relay connection establishment component 1510, a relay request component 1515, a QoS configuration receiver 1520, a QoS configuration determination component 1525, a relay component 1530, a mapping configuration determination component 1535, a QoS indicator component 1540, a QoS configuration modification receiver 1545, a QoS change component 1550, and a communications component 1555. Each of these modules may communicate, directly or indirectly, with one another (e.g., via one or more buses).

The relay connection establishment component 1510 may establish a first connection between a first UE and a second UE, the first connection associated with a relay service code. In some examples, the relay connection establishment component 1510 may receive, from the second UE, a first request (e.g., a relaying request) including an indication of the relay service code and may establish a unicast sidelink connection with the second UE based on receiving the first request. Additionally, the relay connection establishment component 1510 may transmit, to a network entity (e.g., the base station), an assistance information including the indication of the relay connection and a second request (e.g., a QoS indicator request) for the first interface of the first connection. In some examples, the relay connection establishment component 1510 may establish a unicast link with the second UE, where the relay connection is established based on establishing the unicast link. In some cases, the first connection may include the unicast sidelink connection.

The relay request component 1515 may transmit, to a network entity, an indication for a relay connection for a second UE via the first UE, the relay connection including a first connection between the first UE and the second UE and a second connection between the first UE and the network entity. Additionally or alternatively, the relay request component 1515 may transmit, to a base station, a request including the relay service code and an indication of a relay connection for the second UE via the first UE, the relay connection including the first connection between the first UE and the second UE and a second connection between the first UE and the base station. In some cases, the request may include a PDU session establishment request or a PDU session modification request.

The QoS configuration receiver 1520 may receive, from the network entity, a QoS mapping configuration for mapping a first QoS configuration associated with a first interface to a second QoS configuration associated with a second interface, or for mapping the second QoS configuration associated with the second interface to the first QoS configuration associated with the first interface, or a combination thereof. In some examples, the first QoS configuration may correspond to a first QoS indicator, and the second QoS configuration may correspond to a second QoS indicator. Additionally or alternatively, the QoS configuration receiver 1520 may receive, from the base station, a configuration message in response to transmitting the request, the configuration message including a first configuration associated with a first interface of the first connection and a second configuration associated with a second interface of the second connection. In some cases, the first interface may be a PC5 interface, and the second interface may be a Uu interface.

In some examples, the QoS configuration receiver 1520 may receive, from a first network entity, a QoS mapping configuration message, the QoS mapping configuration message including a mapping between a first interface of a first connection between a first UE and the second UE and a second interface of a second connection between the first UE and a second network entity, the first connection associated with a relay service code. Additionally or alternatively, the QoS configuration receiver 1520 may receive from a first base station, a mapping configuration message, the mapping configuration message including a mapping between a first interface of the first connection and a second interface of a second connection between the first UE and a second base station. In some cases, the QoS configuration receiver 1520 may receive, from the first base station, a registration policy message as part of a registration procedure, a PDU session establishment response message, a PDU session modification response message, or a combination thereof indicating the QoS mapping configuration message. In some examples, the QoS mapping configuration message may be associated with a relay service or a group of relay services.

The QoS configuration determination component 1525 may configure a first QoS of the first connection and a second QoS of the second connection based on the QoS mapping configuration. Additionally or alternatively, the QoS configuration determination component 1525 may determine a QoS configuration based on the first configuration and the second configuration. In some examples, the QoS configuration determination component 1525 may configure a QoS of the first connection based on the QoS mapping configuration message. Additionally or alternatively, the QoS configuration determination component 1525 may determine a QoS configuration based on the mapping configuration message. In some examples, the QoS configuration determination component 1525 may determine one or more first QoS indicators associated with the first interface for the first connection to use for services that have been switched from a connection between the second UE and the first network entity to the first connection and/or may determine one or more second QoS indicators associated with the second interface for the connection between the second UE and the first network entity to use for services that have been switched from the first connection to the connection between the second UE and the first network entity. In some cases, the one or more first QoS indicators may include one or more PC5 specific QoS indicators, one or more PC5 specific QoS identifiers, or a combination thereof, and the one or more second QoS indicators may include one or more Uu specific QoS indicators, one or more Uu specific QoS identifiers, or a combination thereof.

The relay component 1530 may route traffic from the second UE to the network entity via the relay connection based on the first QoS and the second QoS. Additionally or alternatively, the relay component 1530 may route traffic from the second UE to the base station via the relay connection based on the QoS configuration.

The mapping configuration determination component 1535 may determine a mapping configuration for a first indicator associated with the first interface to a second indicator associated with the second interface, for the second indicator associated with the second interface to the first indicator associated with the first interface, or a combination thereof, where the request transmitted to the base station further includes the mapping configuration. In some examples, the mapping configuration determination component 1535 may generate a mapping between the first interface and the second interface based on the QoS mapping configuration and may determine, based on the generated mapping, a first indicator associated with the first interface, or a second indicator associated with the second interface, or both, where the first indicator is determined for the relay connection for services that have been switched from a connection between the second UE and an additional network entity (e.g., an additional base station) to the relay connection and the second indicator is determined for the connection between the second UE and the additional network entity for services that have been switched from the relay connection to the connection between the second UE and the additional base station. Additionally or alternatively, the mapping configuration determination component 1535 may receive, from the network entity, the QoS mapping configuration in a registration policy message as part of a registration procedure, a PDU session establishment response message, a PDU session modification response message, or a combination thereof. In some cases, the QoS mapping configuration may be preconfigured in the first UE.

The QoS indicator component 1540 may determine a first QoS indicator for the first interface, a second QoS indicator for the second interface, or both. In some cases, the QoS indicator component 1540 may determine the first QoS indicator, the second QoS indicator, or both based on an end-to-end QoS for the relay connection. Additionally, the first QoS indicator, the second QoS indicator, or both are indicative of a QoS identifier associated with a resource type, a priority level, a packet delay budget, a packet error rate, an averaging window duration, a maximum data burst volume, or a combination thereof, for different types of services.

The QoS configuration modification receiver 1545 may receive an RRC reconfiguration message including the QoS mapping configuration message. In some examples, the QoS configuration modification receiver 1545 may modify the first connection based on the RRC reconfiguration message. Additionally, the QoS configuration modification receiver 1545 may generate a mapping configuration between the first interface and the second interface based on the RRC reconfiguration message. In some cases, the mapping configuration may include a mapping between QoS flow identifiers for each interface, logical channel identifiers for each interface, or a combination thereof.

The QoS change component 1550 may determine a change in a QoS for the first interface of the first connection. In some examples, the QoS change component 1550 may transmit, to the base station, assistance information indicating the determined change. Subsequently, the QoS change component 1550 may receive, from the base station, a modified QoS configuration for the first interface, for the second interface, or both, based on the transmitted assistance information. In some examples, the QoS change component 1550 may receive, from the second UE, a reception link performance indication for the first connection, where the change in the QoS is determined based on the reception link performance indication.

The communications component 1555 may communicate with the second network entity via the first UE using the first connection based on the configured QoS. Additionally or alternatively, the communications component 1555 may communicate with the second base station via the first UE using the first connection based on the QoS configuration.

Figure 16:
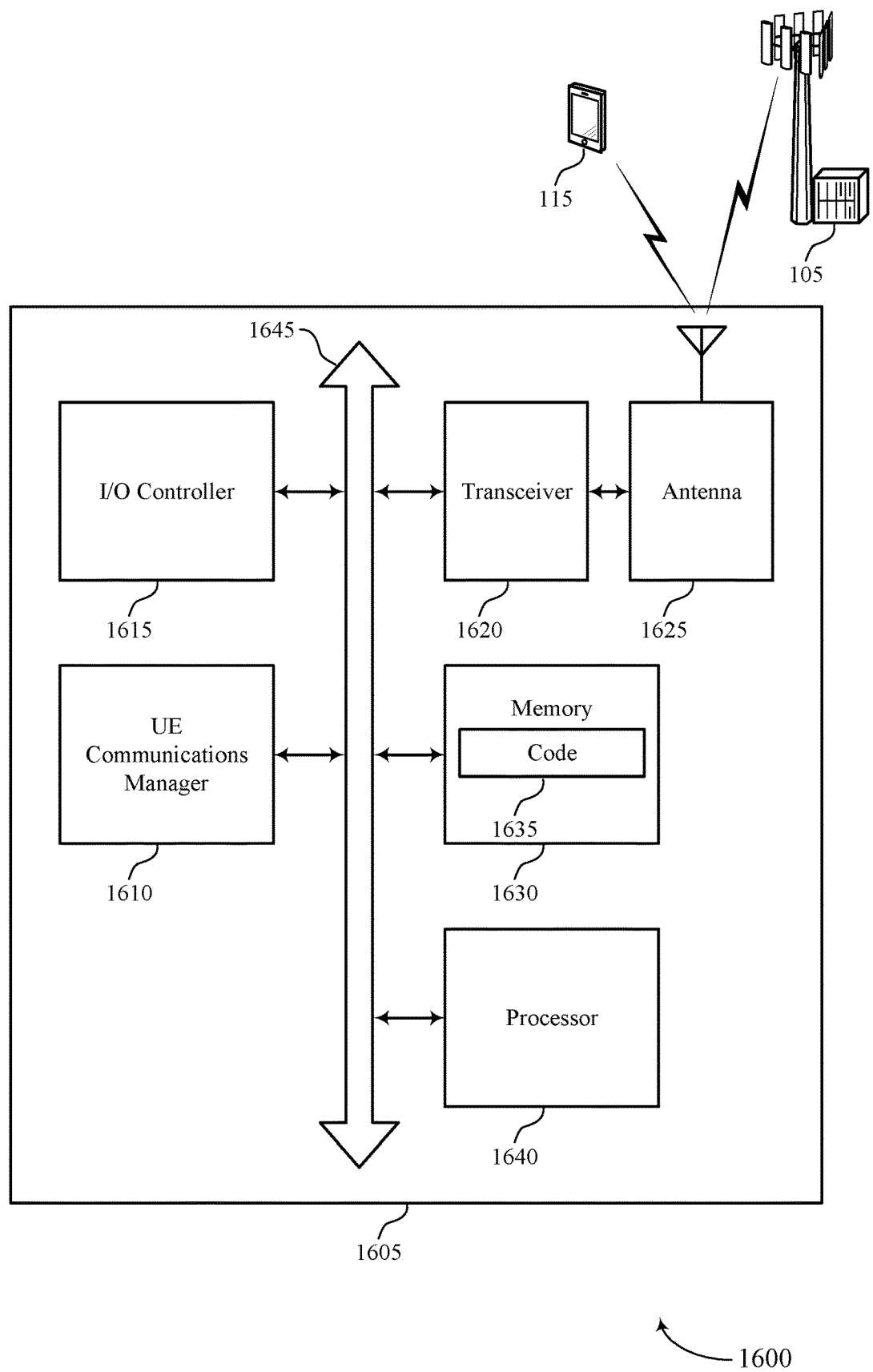
FIG. 16 shows a diagram of a system including a device that supports QoS support for sidelink relay service in accordance with aspects of the present disclosure.

FIG. 16 shows a diagram of a system 1600 including a device 1605 that supports QoS support for sidelink relay service in accordance with aspects of the present disclosure. The device 1605 may be an example of or include the components of device 1305, device 1405, or a UE 115 as described herein. The device 1605 may include components for bi-directional voice and data communications including components for transmitting and receiving communications, including a UE communications manager 1610, an I/O controller 1615, a transceiver 1620, an antenna 1625, memory 1630, and a processor 1640. These components may be in electronic communication via one or more buses (e.g., bus 1645).

The UE communications manager 1610 may support wireless communications at a first UE (e.g., relay UE) in accordance with examples as disclosed herein. For example, the UE communications manager 1610 may transmit, to a network entity, an indication for a relay connection for a second UE via the first UE, the relay connection including a first connection between the first UE and the second UE and a second connection between the first UE and the network entity. In some cases, the UE communications manager 1610 may receive, from the network entity, a QoS mapping configuration for mapping a first QoS configuration associated with a first interface to a second QoS configuration associated with a second interface, or for mapping the second QoS configuration associated with the second interface to the first QoS configuration associated with the first interface, or a combination thereof. Additionally, the UE communications manager 1610 may configure a first QoS of the first connection and a second QoS of the second connection based on the QoS mapping configuration. Accordingly, the UE communications manager 1610 may route traffic from the second UE to the network entity via the relay connection based on the first QoS and the second QoS.

Additionally or alternatively, the UE communications manager 1610 may support wireless communications at a second UE (e.g., remote UE) in accordance with examples as disclosed herein. For example, the UE communications manager 1610 may receive, from a first network entity, a QoS mapping configuration message, the QoS mapping configuration message including a mapping between a first interface of a first connection between a first UE and the second UE and a second interface of a second connection between the first UE and a second network entity, the first connection associated with a relay service code. In some cases, the UE communications manager 1610 may configure a QoS of the first connection based on the QoS mapping configuration message. The UE communications manager 1610 may communicate with the second network entity via the first UE using the first connection based on the configured QoS.

Additionally or alternatively, the UE communications manager 1610 may support wireless communications at a first UE (e.g., relay UE) in accordance with examples as disclosed herein. For example, the UE communications manager 1610 may establish a first connection between the first UE and a second UE, the first connection associated with a relay service code. In some cases, the UE communications manager 1610 may transmit, to a base station, a request including the relay service code and an indication of a relay connection for the second UE via the first UE, the relay connection including the first connection between the first UE and the second UE and a second connection between the first UE and the base station. Additionally, the UE communications manager 1610 may receive, from the base station, a configuration message in response to transmitting the request, the configuration message including a first configuration associated with a first interface of the first connection and a second configuration associated with a second interface of the second connection. Subsequently, the UE communications manager 1610 may determine a QoS configuration based on the first configuration and the second configuration. Accordingly, the UE communications manager 1610 may route traffic from the second UE to the base station via the relay connection based on the QoS configuration.

Additionally or alternatively, the UE communications manager 1610 may support wireless communications at a second UE (e.g., remote UE) in accordance with examples as disclosed herein. For example, the UE communications manager 1610 may establish a first connection between a first UE and the second UE, the first connection associated with a relay service code. In some cases, the UE communications manager 1610 may receive, from a first base station, a mapping configuration message, the mapping configuration message including a mapping between a first interface of the first connection and a second interface of a second connection between the first UE and a second base station. Additionally, the UE communications manager 1610 may determine a QoS configuration based on the mapping configuration message. The communications manager 1610 may communicate with the second base station via the first UE using the first connection based on the QoS configuration.

The I/O controller 1615 may manage input and output signals for the device 1605. The I/O controller 1615 may also manage peripherals not integrated into the device 1605. In some cases, the I/O controller 1615 may represent a physical connection or port to an external peripheral. In some cases, the I/O controller 1615 may utilize an operating system such as iOS®, ANDROID®, MS-DOS®, MS-WINDOWS®, OS/2®, UNIX®, LINUX®, or another known operating system. In other cases, the I/O controller 1615 may represent or interact with a modem, a keyboard, a mouse, a touchscreen, or a similar device. In some cases, the I/O controller 1615 may be implemented as part of a processor. In some cases, a user may interact with the device 1605 via the I/O controller 1615 or via hardware components controlled by the I/O controller 1615.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include random-access memory (RAM) and read-only memory (ROM). The memory 1630 may store computer-readable, computer-executable code 1635 including instructions that, when executed, cause the processor to perform various functions described herein. In some cases, the memory 1630 may contain, among other things, a basic I/O system (BIOS) which may control basic hardware or software operation such as the interaction with peripheral components or devices.

The processor 1640 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1640 may be configured to operate a memory array using a memory controller. In other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting QoS support for sidelink relay service).

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
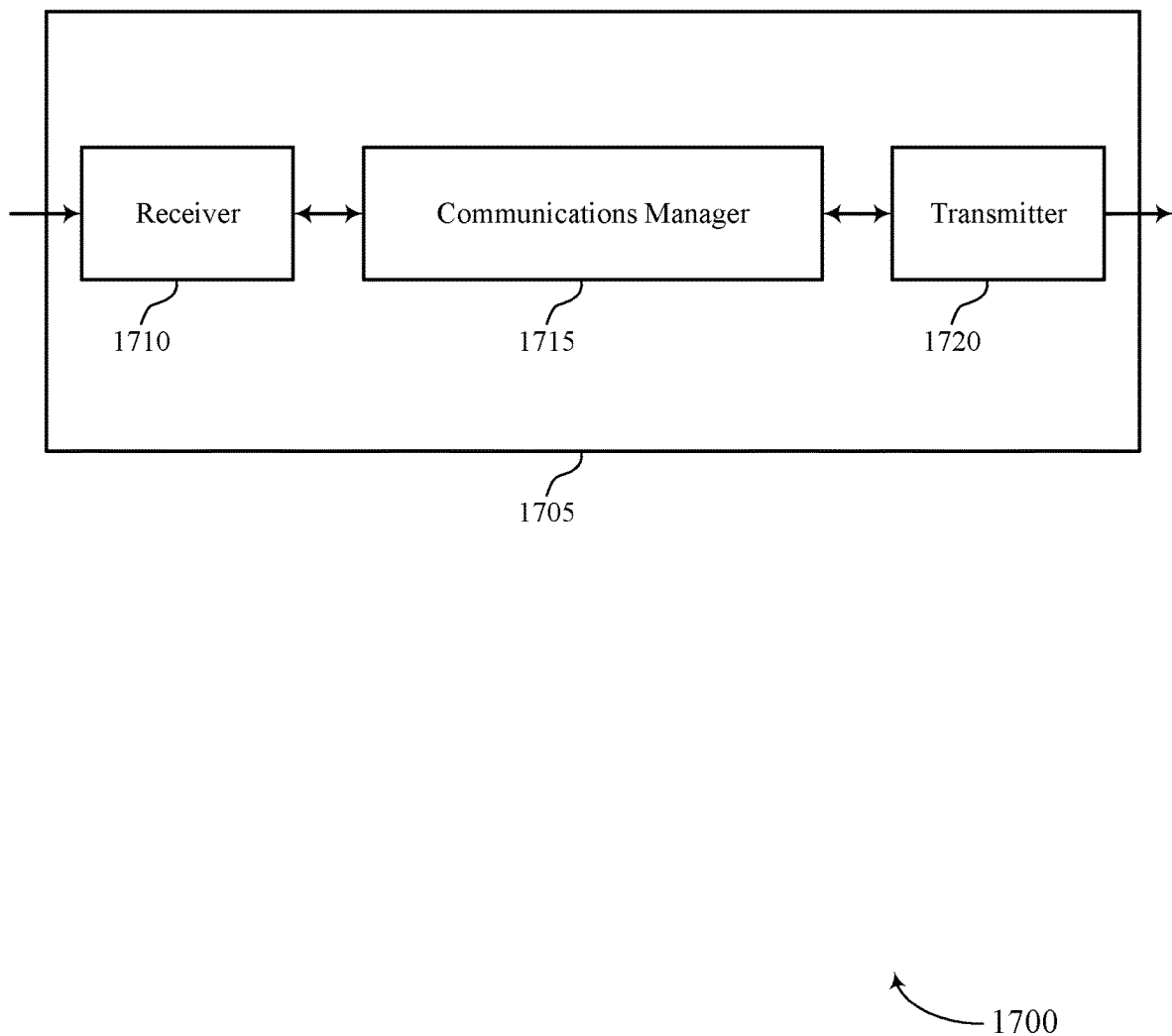
FIGS. 17 and 18 show block diagrams of devices that support QoS support for sidelink relay service in accordance with aspects of the present disclosure.

FIG. 17 shows a block diagram 1700 of a device 1705 that supports QoS support for sidelink relay service in accordance with aspects of the present disclosure. The device 1705 may be an example of aspects of a first network entity (e.g., a base station 105) as described herein. The device 1705 may include a receiver 1710, a communications manager 1715, and a transmitter 1720. The device 1705 may also include a processor. Each of these components may be in communication with one another (e.g., via one or more buses).

The receiver 1710 may receive information such as packets, user data, or control information associated with various information channels (e.g., control channels, data channels, and information related to QoS support for sidelink relay service, etc.). Information may be passed on to other components of the device 1705. The receiver 1710 may be an example of aspects of the transceiver 2020 described with reference to FIG. 20. The receiver 1710 may utilize a single antenna or a set of antennas.

The communications manager 1715 may support wireless communications at a first network entity in accordance with examples as disclosed herein. For example, the communications manager 1715 may receive, from a second network entity, a QoS mapping configuration including a first configuration associated with a first interface of a first connection and a second configuration associated with a second interface of a second connection. Additionally, the communications manager 1715 may receive, from a first UE, a request including a relay service code associated with the first connection between the first UE and a second UE and an indication of a relay connection for the second UE via the first UE, the relay connection including the first connection between the first UE and the second UE and the second connection between the first UE and the first network entity. Subsequently, the communications manager 1715 may transmit, to the first UE, a configuration message based on the QoS mapping configuration, the configuration message including the first configuration and the second configuration. Additionally, the communications manager 1715 may communicate with the second UE via the first UE on the relay connection.

Additionally or alternatively, the communications manager 1715 may support wireless communications at a first network entity in accordance with examples as disclosed herein. For example, the communications manager 1715 may receive, from a first UE, a request including a relay service code associated with a first connection between the first UE and a second UE and an indication of a relay connection for the second UE via the first UE, the relay connection including the first connection between the first UE and the second UE and a second connection between the first UE and the base station. In some cases, the communications manager 1715 may determine a QoS configuration for the relay connection, the QoS configuration including a first configuration associated with a first interface of the first connection and a second configuration associated with a second interface of the second connection. Subsequently, the communications manager 1715 may transmit, to the first UE, a configuration message based on determining the QoS configuration, the configuration message including the first configuration and the second configuration. Additionally, the communications manager 1715 may communicate with the second UE via the first UE on the relay connection based on the determined QoS configuration. The communications manager 1715 may be an example of aspects of the base station communications manager 2010 described herein.

The communications manager 1715, or its sub-components, may be implemented in hardware, code (e.g., software or firmware) executed by a processor, or any combination thereof. If implemented in code executed by a processor, the functions of the communications manager 1715, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1715, or its sub-components, may be physically located at various positions, including being distributed such that portions of functions are implemented at different physical locations by one or more physical components. In some examples, the communications manager 1715, or its sub-components, may be a separate and distinct component in accordance with various aspects of the present disclosure. In some examples, the communications manager 1715, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1720 may transmit signals generated by other components of the device 1705. In some examples, the transmitter 1720 may be collocated with a receiver 1710 in a transceiver module. For example, the transmitter 1720 may be an example of aspects of the transceiver 2020 described with reference to FIG. 20. The transmitter 1720 may utilize a single antenna or a set of antennas.

Figure 18:
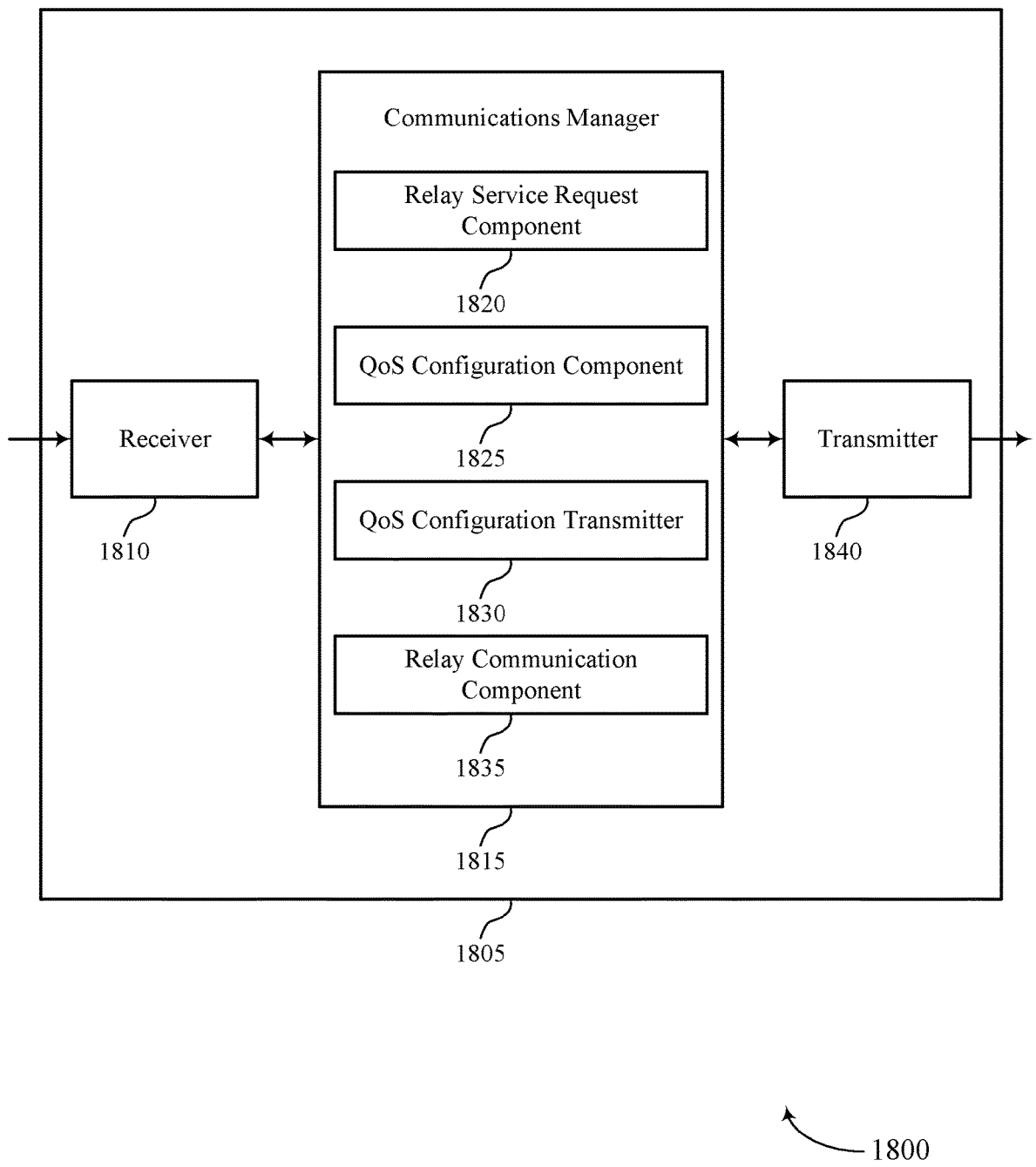

FIG. 18 shows a block diagram 1800 of a device 1805 that supports QoS support for sidelink relay service in accordance with aspects of the present disclosure. The device 1805 may be an example of aspects of a device 1705, or a network entity (e.g., a base station 105 or an additional network entity) as described herein. The device 1805 may include a receiver 1810, a communications manager 1815, and a transmitter 1840. The device 1805 may also include a processor. Each of these components may be in communication with one another (e.g., via one or more buses).

The receiver 1810 may receive information such as packets, user data, or control information associated with various information channels (e.g., control channels, data channels, and information related to QoS support for sidelink relay service, etc.). Information may be passed on to other components of the device 1805. The receiver 1810 may be an example of aspects of the transceiver 2020 described with reference to FIG. 20. The receiver 1810 may utilize a single antenna or a set of antennas.

The communications manager 1815 may be an example of aspects of the communications manager 1715 as described herein. The communications manager 1815 may include a relay service request component 1820, a QoS configuration component 1825, a QoS configuration transmitter 1830, and a relay communication component 1835. The communications manager 1815 may be an example of aspects of the communications manager 2010 described herein.

The QoS configuration component 1825 may receive, from a second network entity, a QoS mapping configuration including a first configuration associated with a first interface of a first connection and a second configuration associated with a second interface of a second connection.

The relay service request component 1820 may receive, from a first UE, a request including a relay service code associated with the first connection between the first UE and a second UE and an indication of a relay connection for the second UE via the first UE, the relay connection including the first connection between the first UE and the second UE and the second connection between the first UE and the first network entity. Additionally or alternatively, the relay service request component 1820 may receive, from a first UE, a request including a relay service code associated with a first connection between the first UE and a second UE and an indication of a relay connection for the second UE via the first UE, the relay connection including the first connection between the first UE and the second UE and a second connection between the first UE and the base station.

Additionally or alternatively, the QoS configuration component 1825 may determine a QoS configuration for the relay connection, the QoS configuration including a first configuration associated with a first interface of the first connection and a second configuration associated with a second interface of the second connection.

The QoS configuration transmitter 1830 may transmit, to the first UE, a configuration message based on the QoS mapping configuration, the configuration message including the first configuration and the second configuration. Additionally or alternatively, the QoS configuration transmitter 1830 may transmit, to the first UE, a configuration message based on determining the QoS configuration, the configuration message including the first configuration and the second configuration.

The relay communication component 1835 may communicate with the second UE via the first UE on the relay connection. Additionally or alternatively, the relay communication component 1835 may communicate with the second UE via the first UE on the relay connection based on the determined QoS configuration.

The transmitter 1840 may transmit signals generated by other components of the device 1805. In some examples, the transmitter 1840 may be collocated with a receiver 1810 in a transceiver module. For example, the transmitter 1840 may be an example of aspects of the transceiver 2020 described with reference to FIG. 20. The transmitter 1840 may utilize a single antenna or a set of antennas.

Figure 19:
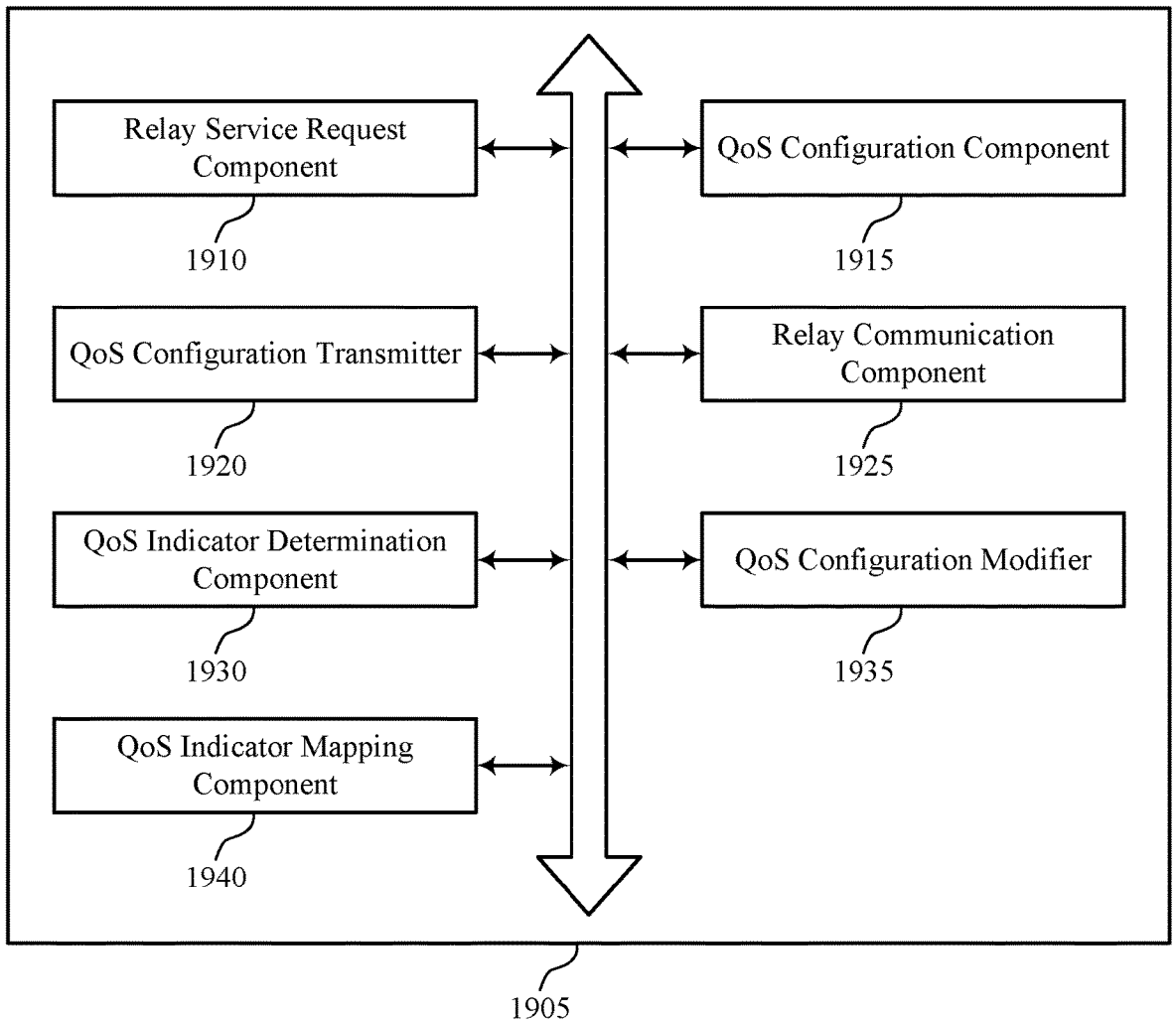
FIG. 19 shows a block diagram of a communications manager that supports QoS support for sidelink relay service in accordance with aspects of the present disclosure.

FIG. 19 shows a block diagram 1900 of a communications manager 1905 that supports QoS support for sidelink relay service in accordance with aspects of the present disclosure. The communications manager 1905 may be an example of aspects of a communications manager 1715, a communications manager 1815, or a communications manager 2010 described herein. The communications manager 1905 may include a relay service request component 1910, a QoS configuration component 1915, a QoS configuration transmitter 1920, a relay communication component 1925, a QoS indicator determination component 1930, a QoS configuration modifier 1935, and a QoS indicator mapping component 1940. Each of these modules may communicate, directly or indirectly, with one another (e.g., via one or more buses).

The QoS configuration component 1915 may receive, from a second network entity, a QoS mapping configuration including a first configuration associated with a first interface of a first connection and a second configuration associated with a second interface of a second connection.

The relay service request component 1910 may receive, from a first UE, a request including a relay service code associated with the first connection between the first UE and a second UE and an indication of a relay connection for the second UE via the first UE, the relay connection including the first connection between the first UE and the second UE and the second connection between the first UE and the first network entity. Additionally or alternatively, the relay service request component 1910 may receive, from a first UE, a request including a relay service code associated with a first connection between the first UE and a second UE and an indication of a relay connection for the second UE via the first UE, the relay connection including the first connection between the first UE and the second UE and a second connection between the first UE and the base station. In some examples, the relay service request component 1910 may transmit, to a network device, the request including the relay service code associated with the first connection. In some cases, the request including the relay service code may be forwarded from the first UE to the network device. Additionally or alternatively, the request including the relay service code may be transmitted to the network device via an N2 reference interface. In some cases, the request may include a PDU session establishment request, or a PDU session modification request, or a sidelink assistance information message from the first UE, the second UE, or both.

Additionally or alternatively, the QoS configuration component 1915 may determine a QoS configuration for the relay connection, the QoS configuration including a first configuration associated with a first interface of the first connection and a second configuration associated with a second interface of the second connection. In some examples, the QoS configuration component 1915 may receive, from a network device, an indication of the QoS configuration. In some cases, the indication of the QoS configuration is received in a PDU session request during PDU session establishment or modification. Additionally, the first interface may include a PC5 interface, and the second interface may include a Uu interface.

The QoS configuration transmitter 1920 may transmit, to the first UE, a configuration message based on the QoS mapping configuration, the configuration message including the first configuration and the second configuration. Additionally or alternatively, the QoS configuration transmitter 1920 may transmit, to the first UE, a configuration message based on determining the QoS configuration, the configuration message including the first configuration and the second configuration. In some cases, the configuration message may include an RRC reconfiguration message.

The relay communication component 1925 may communicate with the second UE via the first UE on the relay connection. Additionally or alternatively, the relay communication component 1925 may communicate with the second UE via the first UE on the relay connection based on the determined QoS configuration.

The QoS indicator determination component 1930 may determine a first QoS indicator for the first interface, a second QoS indicator for the second interface, or both. In some cases, the first QoS indicator, the second QoS indicator, or both may be determined based on an end-to-end QoS for the relay connection. Additionally, the first QoS indicator, the second QoS indicator, or both may be indicative of a QoS identifier associated with a resource type, a priority level, a packet delay budget, a packet error rate, an averaging window duration, a maximum data burst volume, or a combination thereof, for different types of services.

The QoS configuration modifier 1935 may determine to modify a QoS for the first interface of the first connection based on the QoS configuration and may transmit, to the first UE, an indication of the modified QoS. Additionally or alternatively, the QoS configuration modifier 1935 may receive, from the first UE, assistance information indicating a change in a QoS for the first interface of the first connection and may transmit, to the first UE, a modified QoS configuration for the first interface, for the second interface, or both, based on the received assistance information.

The QoS indicator mapping component 1940 may determine a mapping configuration for a first indicator associated with the first interface to a second indicator associated with the second interface, where the request transmitted to the base station further includes the mapping configuration. In some examples, the QoS indicator mapping component 1940 may transmit, to the first UE, the second UE, or both, the mapping configuration in a registration policy message as part of a registration procedure, a PDU session establishment response message, a PDU session modification response message, or a combination thereof. Additionally, the QoS indicator mapping component 1940 may receive the mapping configuration from a network device.

Figure 20:
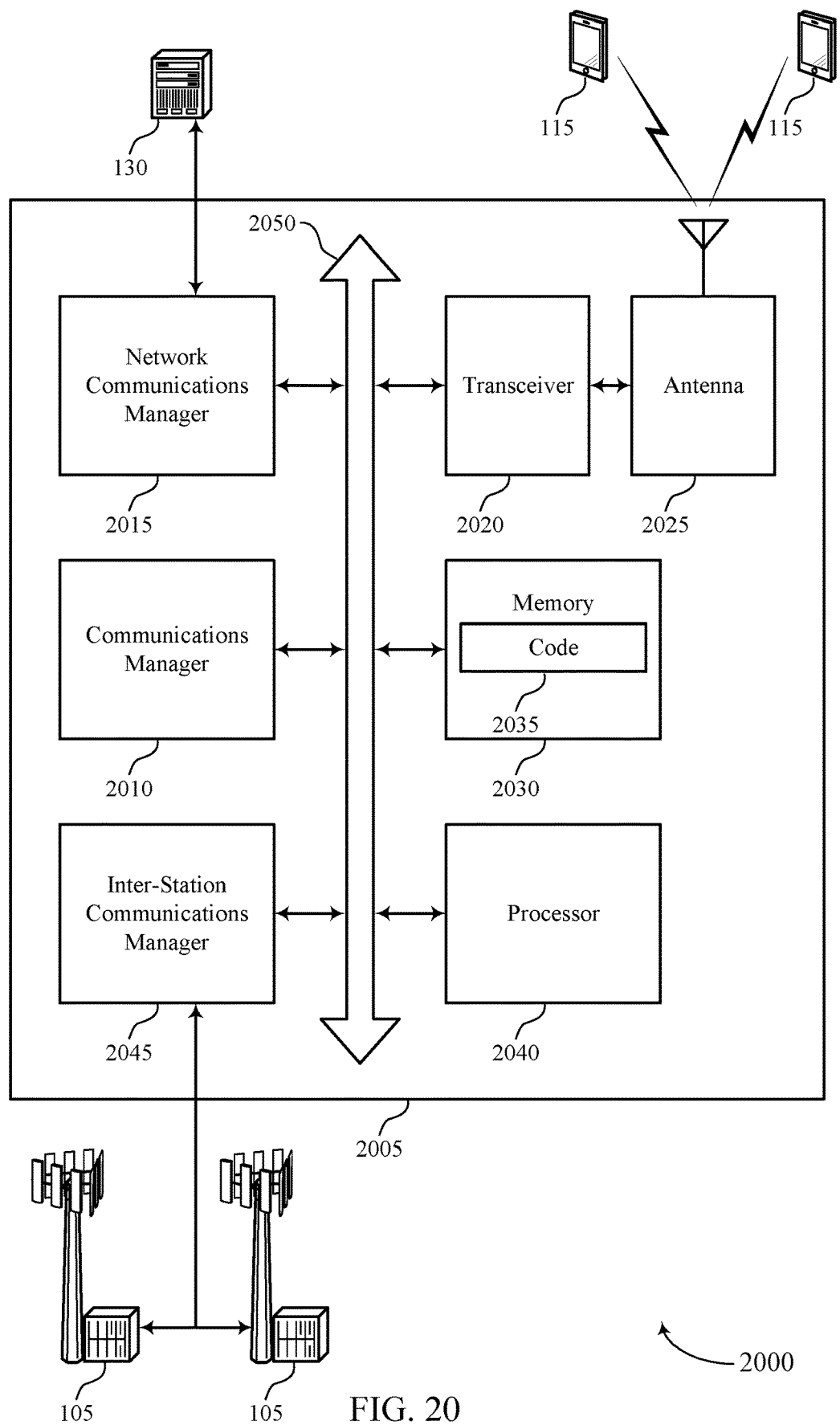
FIG. 20 shows a diagram of a system including a device that supports QoS support for sidelink relay service in accordance with aspects of the present disclosure.

FIG. 20 shows a diagram of a system 2000 including a device 2005 that supports QoS support for sidelink relay service in accordance with aspects of the present disclosure. The device 2005 may be an example of or include the components of device 1705, device 1805, or a base station 105 as described herein. The device 2005 may include components for bi-directional voice and data communications including components for transmitting and receiving communications, including a communications manager 2010, a network communications manager 2015, a transceiver 2020, an antenna 2025, memory 2030, a processor 2040, and an inter-station communications manager 2045. These components may be in electronic communication via one or more buses (e.g., bus 2050).

The communications manager 2010 may support wireless communications at a first network entity in accordance with examples as disclosed herein. For example, the communications manager 2010 may receive, from a second network entity, a QoS mapping configuration including a first configuration associated with a first interface of a first connection and a second configuration associated with a second interface of a second connection. Additionally, the communications manager 2010 may receive, from a first UE, a request including a relay service code associated with the first connection between the first UE and a second UE and an indication of a relay connection for the second UE via the first UE, the relay connection including the first connection between the first UE and the second UE and the second connection between the first UE and the first network entity. Subsequently, the communications manager 2010 may transmit, to the first UE, a configuration message based on the QoS mapping configuration, the configuration message including the first configuration and the second configuration. Additionally, the communications manager 2010 may communicate with the second UE via the first UE on the relay connection.

Additionally or alternatively, the communications manager 2010 may support wireless communications at a first network entity in accordance with examples as disclosed herein. For example, the communications manager 2010 may receive, from a first UE, a request including a relay service code associated with a first connection between the first UE and a second UE and an indication of a relay connection for the second UE via the first UE, the relay connection including the first connection between the first UE and the second UE and a second connection between the first UE and the base station. In some cases, the communications manager 2010 may determine a QoS configuration for the relay connection, the QoS configuration including a first configuration associated with a first interface of the first connection and a second configuration associated with a second interface of the second connection. Subsequently, the communications manager 2010 may transmit, to the first UE, a configuration message based on determining the QoS configuration, the configuration message including the first configuration and the second configuration. Additionally, the communications manager 2010 may communicate with the second UE via the first UE on the relay connection based on the determined QoS configuration.

The network communications manager 2015 may manage communications with the core network (e.g., via one or more wired backhaul links). For example, the network communications manager 2015 may manage the transfer of data communications for client devices, such as one or more UEs 115.

The transceiver 2020 may communicate bi-directionally, via one or more antennas, wired, or wireless links as described above. For example, the transceiver 2020 may represent a wireless transceiver and may communicate bi-directionally with another wireless transceiver. The transceiver 2020 may also include a modem to modulate the packets and provide the modulated packets to the antennas for transmission, and to demodulate packets received from the antennas.

In some cases, the wireless device may include a single antenna 2025. However, in some cases the device may have more than one antenna 2025, which may be capable of concurrently transmitting or receiving multiple wireless transmissions.

The memory 2030 may include RAM, ROM, or a combination thereof. The memory 2030 may store computer-readable code 2035 including instructions that, when executed by a processor (e.g., the processor 2040) cause the device to perform various functions described herein. In some cases, the memory 2030 may contain, among other things, a BIOS which may control basic hardware or software operation such as the interaction with peripheral components or devices.

The processor 2040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2040 may be configured to operate a memory array using a memory controller. In some cases, a memory controller may be integrated into processor 2040. The processor 2040 may be configured to execute computer-readable instructions stored in a memory (e.g., the memory 2030) to cause the device 2005 to perform various functions (e.g., functions or tasks supporting QoS support for sidelink relay service).

The inter-station communications manager 2045 may manage communications with other base station 105 and may include a controller or scheduler for controlling communications with UEs 115 in cooperation with other base stations 105. For example, the inter-station communications manager 2045 may coordinate scheduling for transmissions to UEs 115 for various interference mitigation techniques such as beamforming or joint transmission. In some examples, the inter-station communications manager 2045 may provide an X2 interface within an LTE/LTE-A wireless communication network technology to provide communication between base stations 105.

The code 2035 may include instructions to implement aspects of the present disclosure, including instructions to support wireless communications. The code 2035 may be stored in a non-transitory computer-readable medium such as system memory or other type of memory. In some cases, the code 2035 may not be directly executable by the processor 2040 but may cause a computer (e.g., when compiled and executed) to perform functions described herein.

Figure 21:
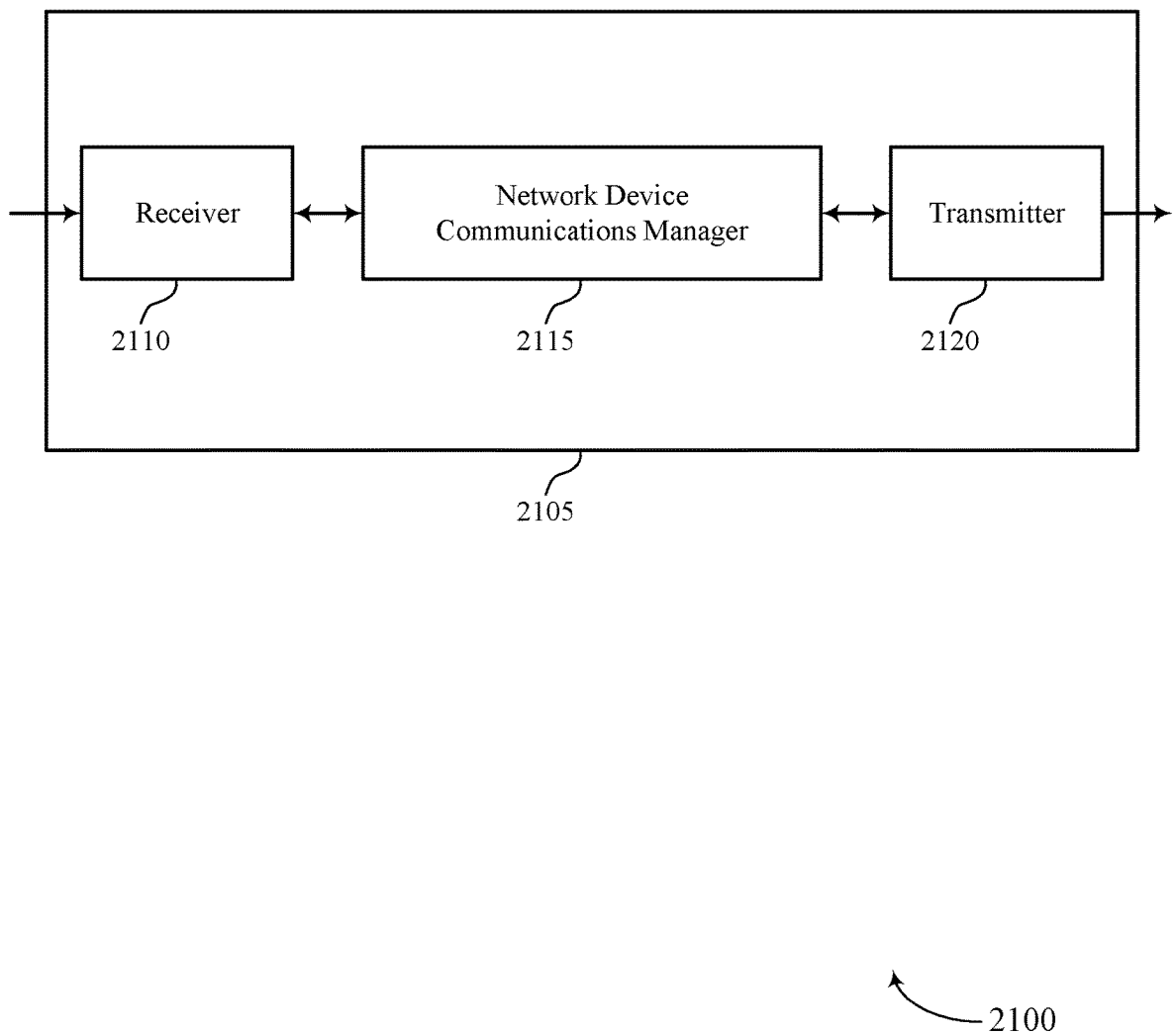
FIGS. 21 and 22 show block diagrams of devices that support QoS support for sidelink relay service in accordance with aspects of the present disclosure.

FIG. 21 shows a block diagram 2100 of a device 2105 that supports QoS support for sidelink relay service in accordance with aspects of the present disclosure. The device 2105 may be an example of aspects of a network entity (e.g., 5GC, core network, etc. that include an AMF, an SMF, a UPF, etc.) as described herein. The device 2105 may include a receiver 2110, a network device communications manager 2115, and a transmitter 2120. The device 2105 may also include a processor. Each of these components may be in communication with one another (e.g., via one or more buses).

The receiver 2110 may receive information such as packets, user data, or control information associated with various information channels (e.g., control channels, data channels, and information related to QoS support for sidelink relay service, etc.). Information may be passed on to other components of the device 2105. The receiver 2110 may be an example of aspects of the transceiver 2420 described with reference to FIG. 24. The receiver 2110 may utilize a single antenna or a set of antennas.

The network device communications manager 2115 may support wireless communications at a first network entity in accordance with examples as disclosed herein. For example, the network device communications manager 2115 may receive, from a second network entity, a request including a relay service code associated with a first connection between a first UE and a second UE and an indication of a relay connection for the second UE via the first UE, the relay connection including the first connection between the first UE and the second UE and a second connection between the first UE and the second network entity. Subsequently, the network device communications manager 2115 may transmit, to an SMF of the first network entity, a message indicating a support for a relay service code for the relay connection. In some cases, the network device communications manager 2115 may receive, from the SMF of the first network entity, a QoS mapping configuration for mapping a first QoS configuration associated with a first interface to a second QoS configuration associated with a second interface, or for mapping the second QoS configuration associated with the second interface to the first QoS configuration associated with the first interface, or a combination thereof. Additionally, the network device communications manager 2115 may transmit, to the second network entity, an indication of a QoS configuration for the relay connection, the QoS configuration including a first configuration associated with the first interface for the first connection and a second configuration associated with the second interface for the second connection.

Additionally or alternatively, the network device communications manager 2115 may support wireless communications at a first network entity in accordance with examples as disclosed herein. For example, the network device communications manager 2115 may receive, from a base station and at an AMF of the network device, a request including a relay service code associated with a first connection between a first UE and a second UE and an indication of a relay connection for the second UE via the first UE, the relay connection including the first connection between the first UE and the second UE and a second connection between the first UE and the base station. Subsequently, the network device communications manager 2115 may transmit, to an SMF of the network device, a message indicating a support for the relay service code. In some cases, the network device communications manager 2115 may determine a QoS configuration for the relay connection, the QoS configuration including a first configuration associated with a first interface of the first connection and a second configuration associated with a second interface of the second connection. Additionally, the network device communications manager 2115 may transmit, to the base station, an indication of the QoS configuration. The network device communications manager 2115 may be an example of aspects of the network device communications manager 2410 described herein.

The network device communications manager 2115, or its sub-components, may be implemented in hardware, code (e.g., software or firmware) executed by a processor, or any combination thereof. If implemented in code executed by a processor, the functions of the network device communications manager 2115, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The network device communications manager 2115, or its sub-components, may be physically located at various positions, including being distributed such that portions of functions are implemented at different physical locations by one or more physical components. In some examples, the network device communications manager 2115, or its sub-components, may be a separate and distinct component in accordance with various aspects of the present disclosure. In some examples, the network device communications manager 2115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 2120 may transmit signals generated by other components of the device 2105. In some examples, the transmitter 2120 may be collocated with a receiver 2110 in a transceiver module. For example, the transmitter 2120 may be an example of aspects of the transceiver 2420 described with reference to FIG. 24. The transmitter 2120 may utilize a single antenna or a set of antennas.

Figure 22:
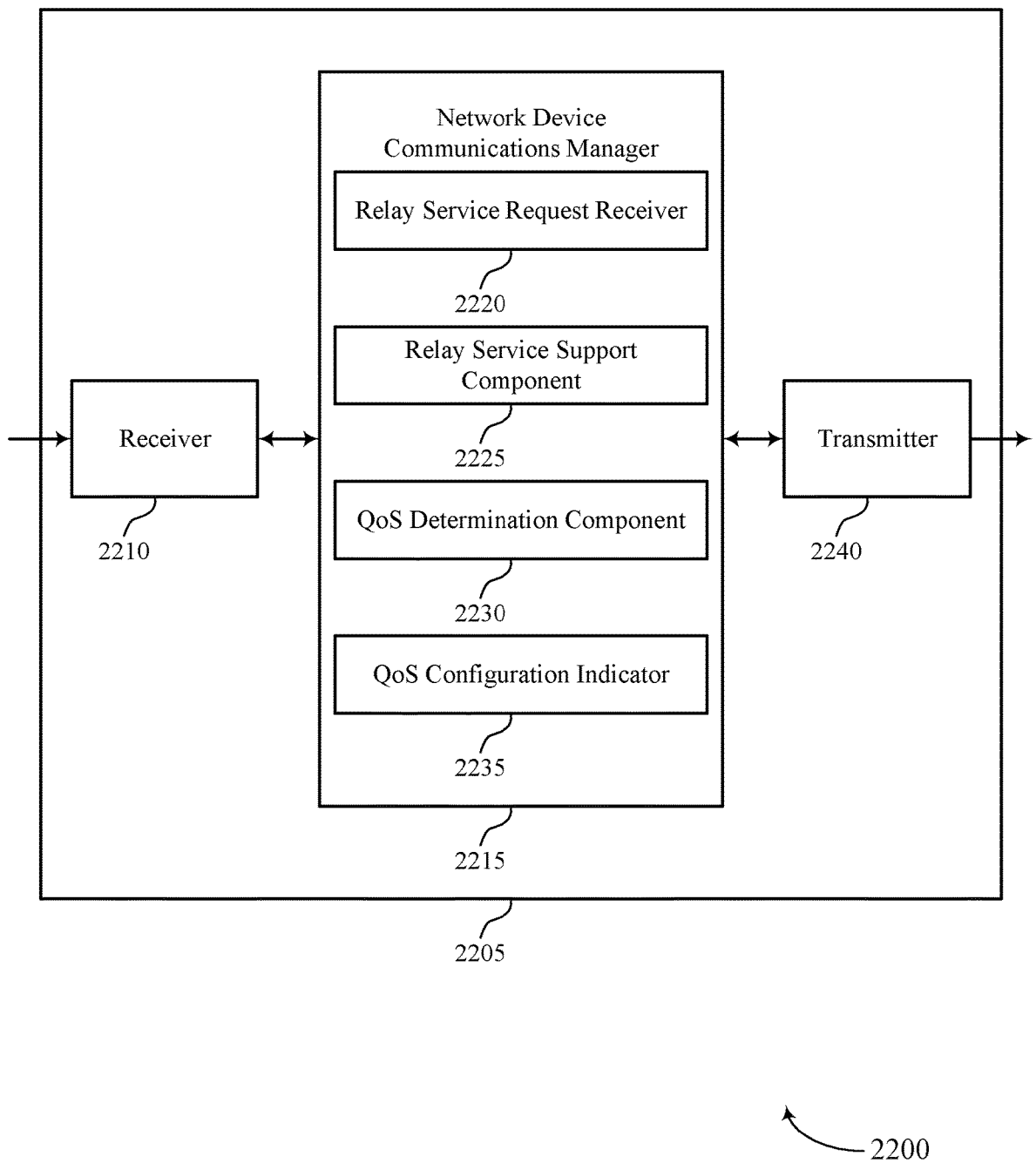

FIG. 22 shows a block diagram 2200 of a device 2205 that supports QoS support for sidelink relay service in accordance with aspects of the present disclosure. The device 2205 may be an example of aspects of a device 2105 or a network entity as described herein. The device 2205 may include a receiver 2210, a network device communications manager 2215, and a transmitter 2240. The device 2205 may also include a processor. Each of these components may be in communication with one another (e.g., via one or more buses).

The receiver 2210 may receive information such as packets, user data, or control information associated with various information channels (e.g., control channels, data channels, and information related to QoS support for sidelink relay service, etc.). Information may be passed on to other components of the device 2205. The receiver 2210 may be an example of aspects of the transceiver 2420 described with reference to FIG. 24. The receiver 2210 may utilize a single antenna or a set of antennas.

The network device communications manager 2215 may be an example of aspects of the network device communications manager 2115 as described herein. The network device communications manager 2215 may include a relay service request receiver 2220, a relay service support component 2225, a QoS determination component 2230, and a QoS configuration indicator 2235. The network device communications manager 2215 may be an example of aspects of the network device communications manager 2410 described herein.

The relay service request receiver 2220 may receive, from a second network entity, a request including a relay service code associated with a first connection between a first UE and a second UE and an indication of a relay connection for the second UE via the first UE, the relay connection including the first connection between the first UE and the second UE and a second connection between the first UE and the second network entity. Additionally or alternatively, the relay service request receiver 2220 may receive, from a base station and at an AMF of the network device, a request including a relay service code associated with a first connection between a first UE and a second UE and an indication of a relay connection for the second UE via the first UE, the relay connection including the first connection between the first UE and the second UE and a second connection between the first UE and the base station.

The relay service support component 2225 may transmit, to an SMF of the first network entity, a message indicating a support for a relay service code for the relay connection. Additionally or alternatively, the relay service support component 2225 may transmit, to an SMF of the network device, a message indicating a support for the relay service code.

The QoS determination component 2230 may receive, from the SMF of the first network entity, a QoS mapping configuration for mapping a first QoS configuration associated with a first interface to a second QoS configuration associated with a second interface, or for mapping the second QoS configuration associated with the second interface to the first QoS configuration associated with the first interface, or a combination thereof. Additionally or alternatively, the QoS determination component 2230 may determine a QoS configuration for the relay connection, the QoS configuration including a first configuration associated with a first interface of the first connection and a second configuration associated with a second interface of the second connection.

The QoS configuration indicator 2235 may transmit, to the second network entity, an indication of a QoS configuration for the relay connection, the QoS configuration including a first configuration associated with the first interface for the first connection and a second configuration associated with the second interface for the second connection. Additionally or alternatively, the QoS configuration indicator 2235 may transmit, to the base station, an indication of the QoS configuration.

The transmitter 2240 may transmit signals generated by other components of the device 2205. In some examples, the transmitter 2240 may be collocated with a receiver 2210 in a transceiver module. For example, the transmitter 2240 may be an example of aspects of the transceiver 2420 described with reference to FIG. 24. The transmitter 2240 may utilize a single antenna or a set of antennas.

Figure 23:
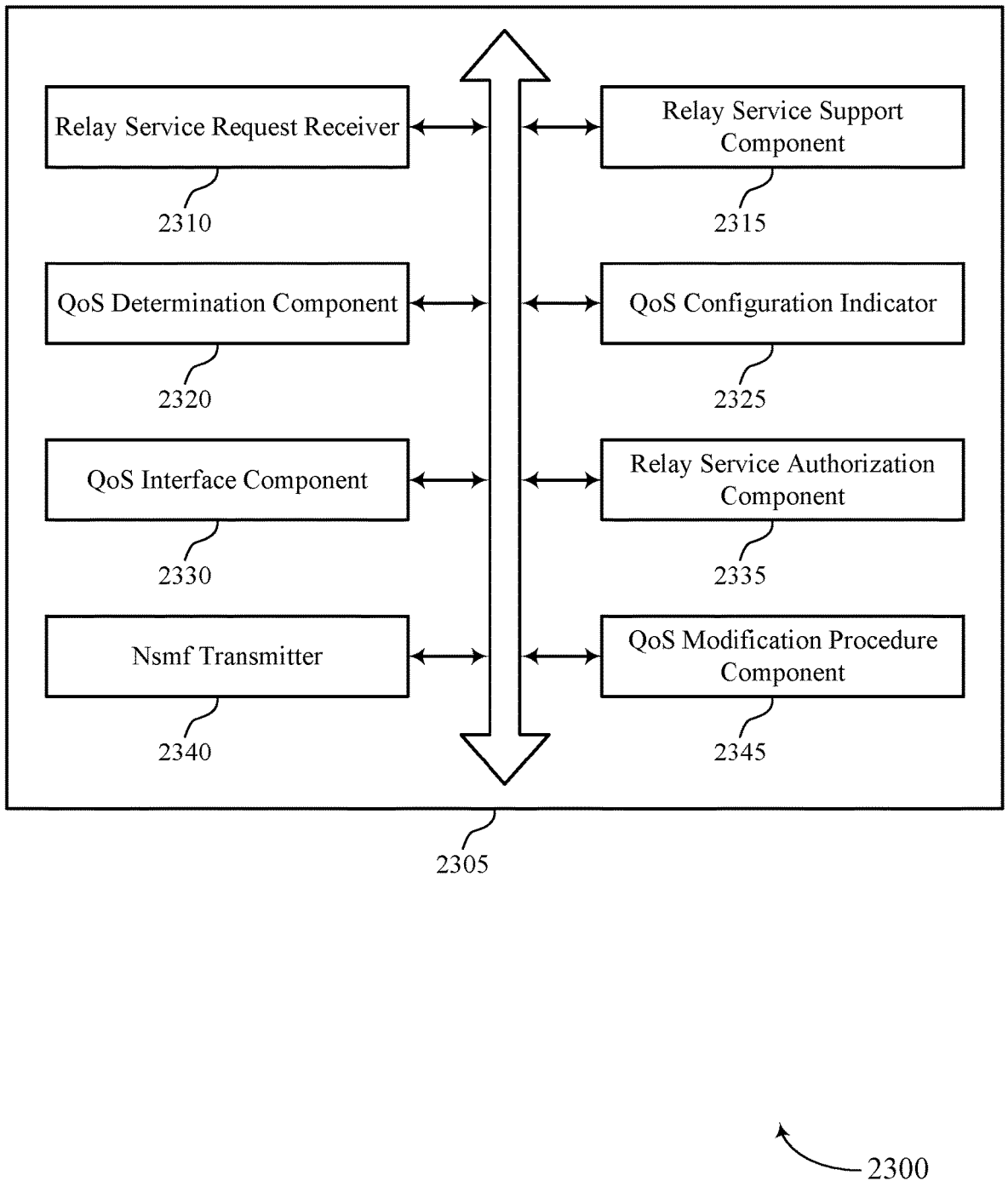
FIG. 23 shows a block diagram of a network device communications manager that supports QoS support for sidelink relay service in accordance with aspects of the present disclosure.

FIG. 23 shows a block diagram 2300 of a network device communications manager 2305 that supports QoS support for sidelink relay service in accordance with aspects of the present disclosure. The network device communications manager 2305 may be an example of aspects of a network device communications manager 2115, a network device communications manager 2215, or a network device communications manager 2410 described herein. The network device communications manager 2305 may include a relay service request receiver 2310, a relay service support component 2315, a QoS determination component 2320, a QoS configuration indicator 2325, a QoS interface component 2330, a relay service authorization component 2335, an Nsmf transmitter 2340, and a QoS modification procedure component 2345. Each of these modules may communicate, directly or indirectly, with one another (e.g., via one or more buses).

The relay service request receiver 2310 may receive, from a second network entity, a request including a relay service code associated with a first connection between a first UE and a second UE and an indication of a relay connection for the second UE via the first UE, the relay connection including the first connection between the first UE and the second UE and a second connection between the first UE and the second network entity. Additionally or alternatively, the relay service request receiver 2310 may receive, from a base station and at an AMF of the network device, a request including a relay service code associated with a first connection between a first UE and a second UE and an indication of a relay connection for the second UE via the first UE, the relay connection including the first connection between the first UE and the second UE and a second connection between the first UE and the base station.

The relay service support component 2315 may transmit, to an SMF of the first network entity, a message indicating a support for a relay service code for the relay connection. Additionally or alternatively, the relay service support component 2315 may transmit, to an SMF of the network device, a message indicating a support for the relay service code.

The QoS determination component 2320 may receive, from the SMF of the first network entity, a QoS mapping configuration for mapping a first QoS configuration associated with a first interface to a second QoS configuration associated with a second interface, or for mapping the second QoS configuration associated with the second interface to the first QoS configuration associated with the first interface, or a combination thereof. Additionally or alternatively, the QoS determination component 2320 may determine a QoS configuration for the relay connection, the QoS configuration including a first configuration associated with a first interface of the first connection and a second configuration associated with a second interface of the second connection.

The QoS configuration indicator 2325 may transmit, to the second network entity, an indication of a QoS configuration for the relay connection, the QoS configuration including a first configuration associated with the first interface for the first connection and a second configuration associated with the second interface for the second connection. Additionally or alternatively, the QoS configuration indicator 2325 may transmit, to the base station, an indication of the QoS configuration. In some cases, the indication of the QoS configuration may include a PDU session establishment request or a PDU session modification request. Additionally, the indication of the QoS configuration includes an end-to-end QoS configuration for the first connection and the second connection.

The QoS interface component 2330 may determine a first QoS indicator for the first interface, a second QoS indicator for the second interface, or both. In some cases, the first QoS indicator, the second QoS indicator, or both may be determined based on an end-to-end QoS for the relay connection. Additionally, the first QoS indicator, the second QoS indicator, or both may be indicative of a QoS identifier associated with a resource type, a priority level, a packet delay budget, a packet error rate, an averaging window duration, a maximum data burst volume, or a combination thereof for different types of services.

The relay service authorization component 2335 may determine the first UE is authorized for supporting the relay service code based on a set of PCC rules, where the QoS configuration is determined based on the first UE being authorized to support the relay service code.

The Nsmf transmitter 2340 may transmit, to the SMF of the network device, an Nsmf message including the support for the relay service code.

The QoS modification procedure component 2345 may perform a QoS modification procedure based on a change in a QoS for the first connection, the second connection, or both.

Figure 24:
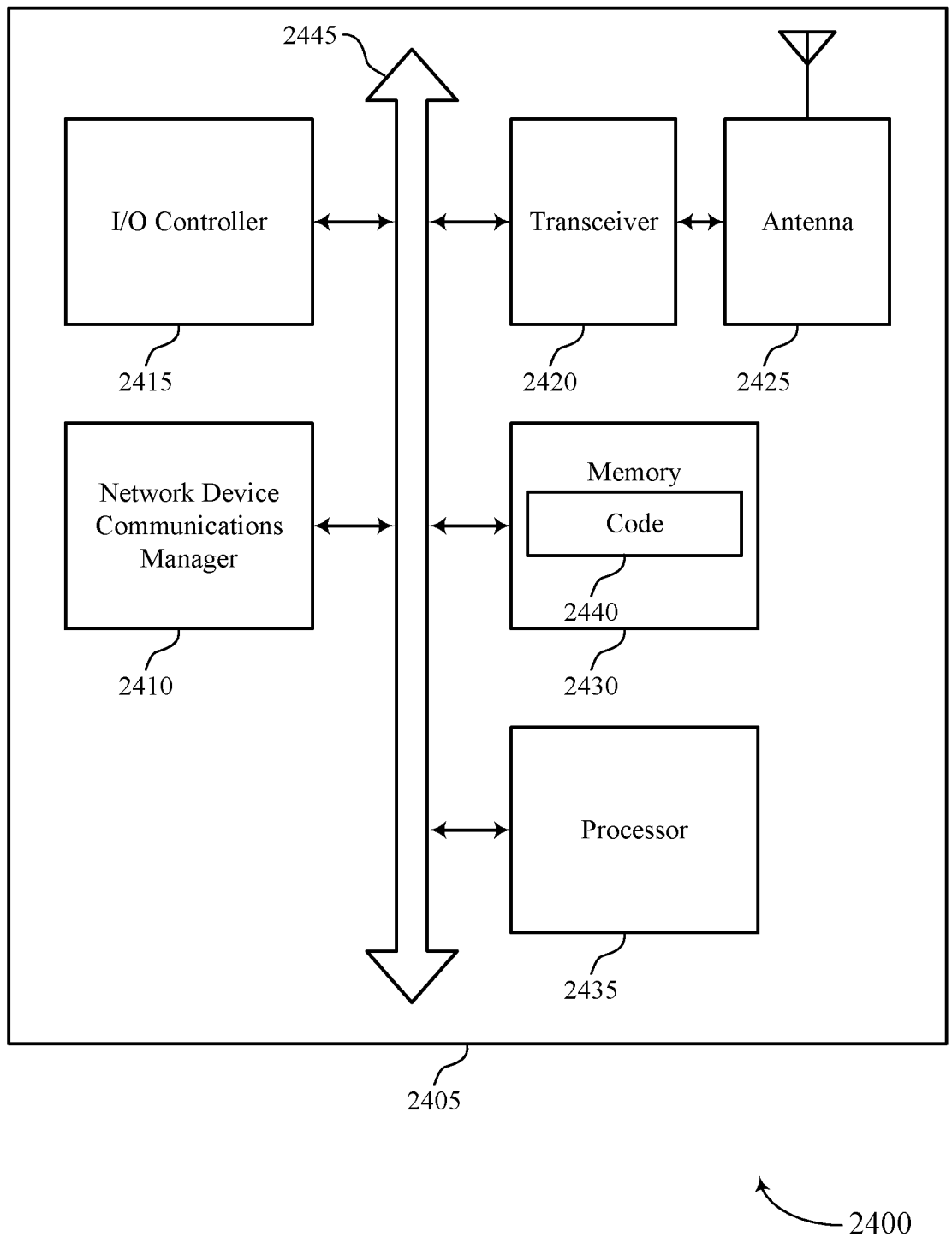
FIG. 24 shows a diagram of a system including a device that supports QoS support for sidelink relay service in accordance with aspects of the present disclosure.

FIG. 24 shows a diagram of a system 2400 including a device 2405 that supports QoS support for sidelink relay service in accordance with aspects of the present disclosure. The device 2405 may be an example of or include the components of device 2105, device 2205, or a network entity as described herein. The device 2405 may include components for bi-directional voice and data communications including components for transmitting and receiving communications, including a network device communications manager 2410, an I/O controller 2415, a transceiver 2420, an antenna 2425, memory 2430, and a processor 2435. These components may be in electronic communication via one or more buses (e.g., bus 2445).

The network device communications manager 2410 may support wireless communications at a first network entity in accordance with examples as disclosed herein. For example, the network device communications manager 2410 may receive, from a second network entity, a request including a relay service code associated with a first connection between a first UE and a second UE and an indication of a relay connection for the second UE via the first UE, the relay connection including the first connection between the first UE and the second UE and a second connection between the first UE and the second network entity. Subsequently, the network device communications manager 2410 may transmit, to an SMF of the first network entity, a message indicating a support for a relay service code for the relay connection. In some cases, the network device communications manager 2410 may receive, from the SMF of the first network entity, a QoS mapping configuration for mapping a first QoS configuration associated with a first interface to a second QoS configuration associated with a second interface, or for mapping the second QoS configuration associated with the second interface to the first QoS configuration associated with the first interface, or a combination thereof. Additionally, the network device communications manager 2410 may transmit, to the second network entity, an indication of a QoS configuration for the relay connection, the QoS configuration including a first configuration associated with the first interface for the first connection and a second configuration associated with the second interface for the second connection.

Additionally or alternatively, the network device communications manager 2410 may support wireless communications at a first network entity in accordance with examples as disclosed herein. For example, the network device communications manager 2410 may receive, from a base station and at an AMF of the network device, a request including a relay service code associated with a first connection between a first UE and a second UE and an indication of a relay connection for the second UE via the first UE, the relay connection including the first connection between the first UE and the second UE and a second connection between the first UE and the base station. Subsequently, the network device communications manager 2410 may transmit, to an SMF of the network device, a message indicating a support for the relay service code. In some cases, the network device communications manager 2410 may determine a QoS configuration for the relay connection, the QoS configuration including a first configuration associated with a first interface of the first connection and a second configuration associated with a second interface of the second connection. Additionally, the network device communications manager 2410 may transmit, to the base station, an indication of the QoS configuration.

The I/O controller 2415 may manage input and output signals for the device 2405. The I/O controller 2415 may also manage peripherals not integrated into the device 2405. In some cases, the I/O controller 2415 may represent a physical connection or port to an external peripheral. In some cases, the I/O controller 2415 may utilize an operating system such as iOS®, ANDROID®, MS-DOS®, MS-WINDOWS®, OS/2®, UNIX®, LINUX®, or another known operating system. In other cases, the I/O controller 2415 may represent or interact with a modem, a keyboard, a mouse, a touchscreen, or a similar device. In some cases, the I/O controller 2415 may be implemented as part of a processor. In some cases, a user may interact with the device 2405 via the I/O controller 2415 or via hardware components controlled by the I/O controller 2415.

The transceiver 2420 may communicate bi-directionally, via one or more antennas, wired, or wireless links as described above. For example, the transceiver 2420 may represent a wireless transceiver and may communicate bi-directionally with another wireless transceiver. The transceiver 2420 may also include a modem to modulate the packets and provide the modulated packets to the antennas for transmission, and to demodulate packets received from the antennas.

In some cases, the wireless device may include a single antenna 2425. However, in some cases the device may have more than one antenna 2425, which may be capable of concurrently transmitting or receiving multiple wireless transmissions.

The memory 2430 may include RAM and ROM. The memory 2430 may store computer-readable, computer-executable code 2440 including instructions that, when executed, cause the processor to perform various functions described herein. In some cases, the memory 2430 may contain, among other things, a BIOS which may control basic hardware or software operation such as the interaction with peripheral components or devices.

The processor 2435 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2435 may be configured to operate a memory array using a memory controller. In other cases, a memory controller may be integrated into the processor 2435. The processor 2435 may be configured to execute computer-readable instructions stored in a memory (e.g., the memory 2430) to cause the device 2405 to perform various functions (e.g., functions or tasks supporting QoS support for sidelink relay service).

The code 2440 may include instructions to implement aspects of the present disclosure, including instructions to support wireless communications. The code 2440 may be stored in a non-transitory computer-readable medium such as system memory or other type of memory. In some cases, the code 2440 may not be directly executable by the processor 2435 but may cause a computer (e.g., when compiled and executed) to perform functions described herein.

Figure 25:
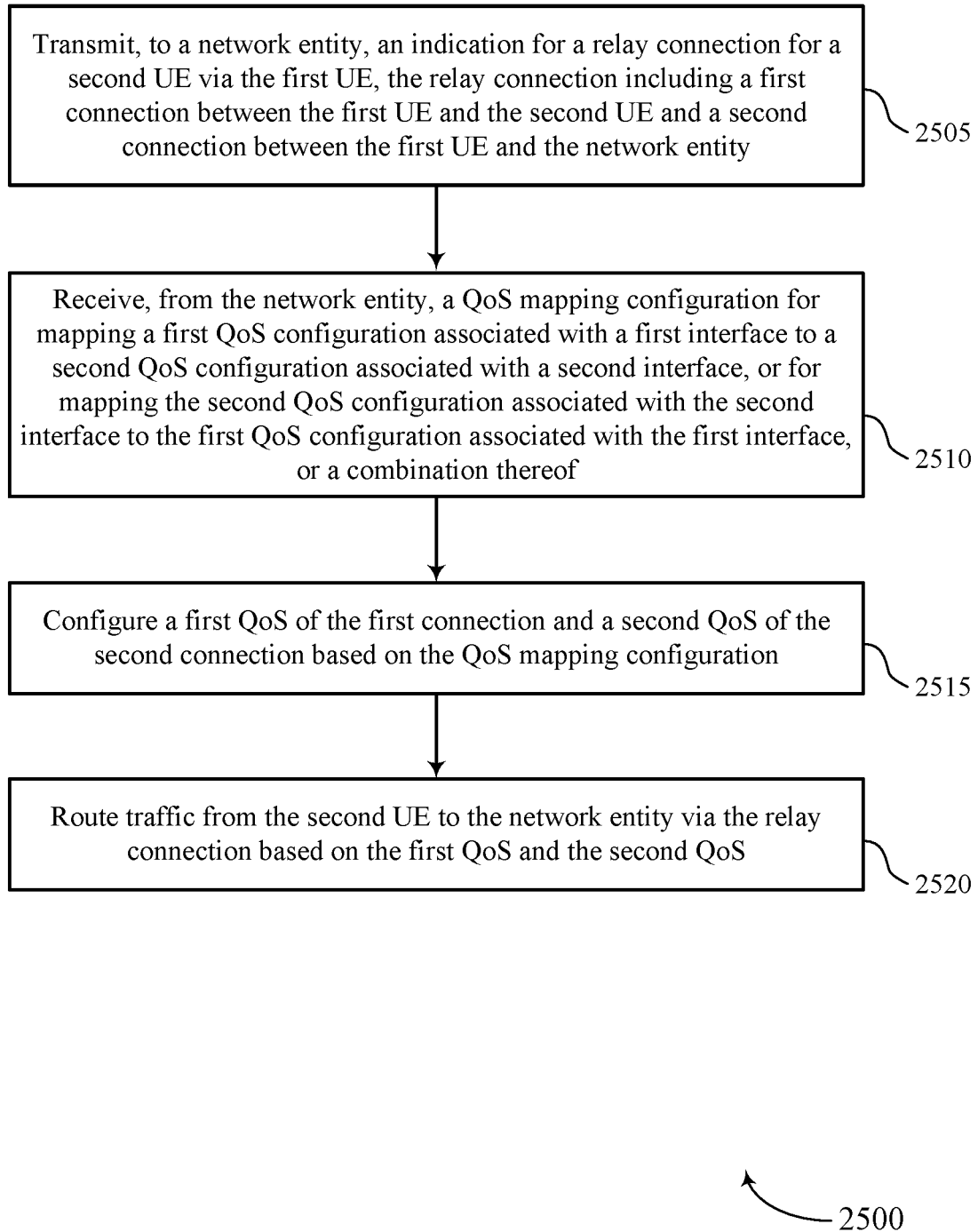
FIGS. 25 through 37 show flowcharts illustrating methods that support QoS support for sidelink relay service in accordance with aspects of the present disclosure.

FIG. 25 shows a flowchart illustrating a method 2500 that supports QoS support for sidelink relay service in accordance with aspects of the present disclosure. The operations of method 2500 may be implemented by a UE 115 (e.g., a relay UE 115) or its components as described herein. For example, the operations of method 2500 may be performed by a UE communications manager as described with reference to FIGS. 13 through 16. In some examples, a UE may execute a set of instructions to control the functional elements of the UE to perform the functions described below. Additionally or alternatively, a UE may perform aspects of the functions described below using special-purpose hardware.

At 2505, the UE may transmit, to a network entity, an indication for a relay connection for a second UE via the first UE, the relay connection including a first connection between the first UE and the second UE and a second connection between the first UE and the network entity. The operations of 2505 may be performed according to the methods described herein. In some examples, aspects of the operations of 2505 may be performed by a relay request component as described with reference to FIGS. 13 through 16.

At 2510, the UE may receive, from the network entity, a QoS mapping configuration for mapping a first QoS configuration associated with a first interface to a second QoS configuration associated with a second interface, or for mapping the second QoS configuration associated with the second interface to the first QoS configuration associated with the first interface, or a combination thereof. The operations of 2510 may be performed according to the methods described herein. In some examples, aspects of the operations of 2510 may be performed by a QoS configuration receiver as described with reference to FIGS. 13 through 16.

At 2515, the UE may configure a first QoS of the first connection and a second QoS of the second connection based on the QoS mapping configuration. The operations of 2515 may be performed according to the methods described herein. In some examples, aspects of the operations of 2515 may be performed by a QoS configuration determination component as described with reference to FIGS. 13 through 16.

At 2520, the UE may route traffic from the second UE to the network entity via the relay connection based on the first QoS and the second QoS. The operations of 2520 may be performed according to the methods described herein. In some examples, aspects of the operations of 2520 may be performed by a relay component as described with reference to FIGS. 13 through 16.

Figure 26:
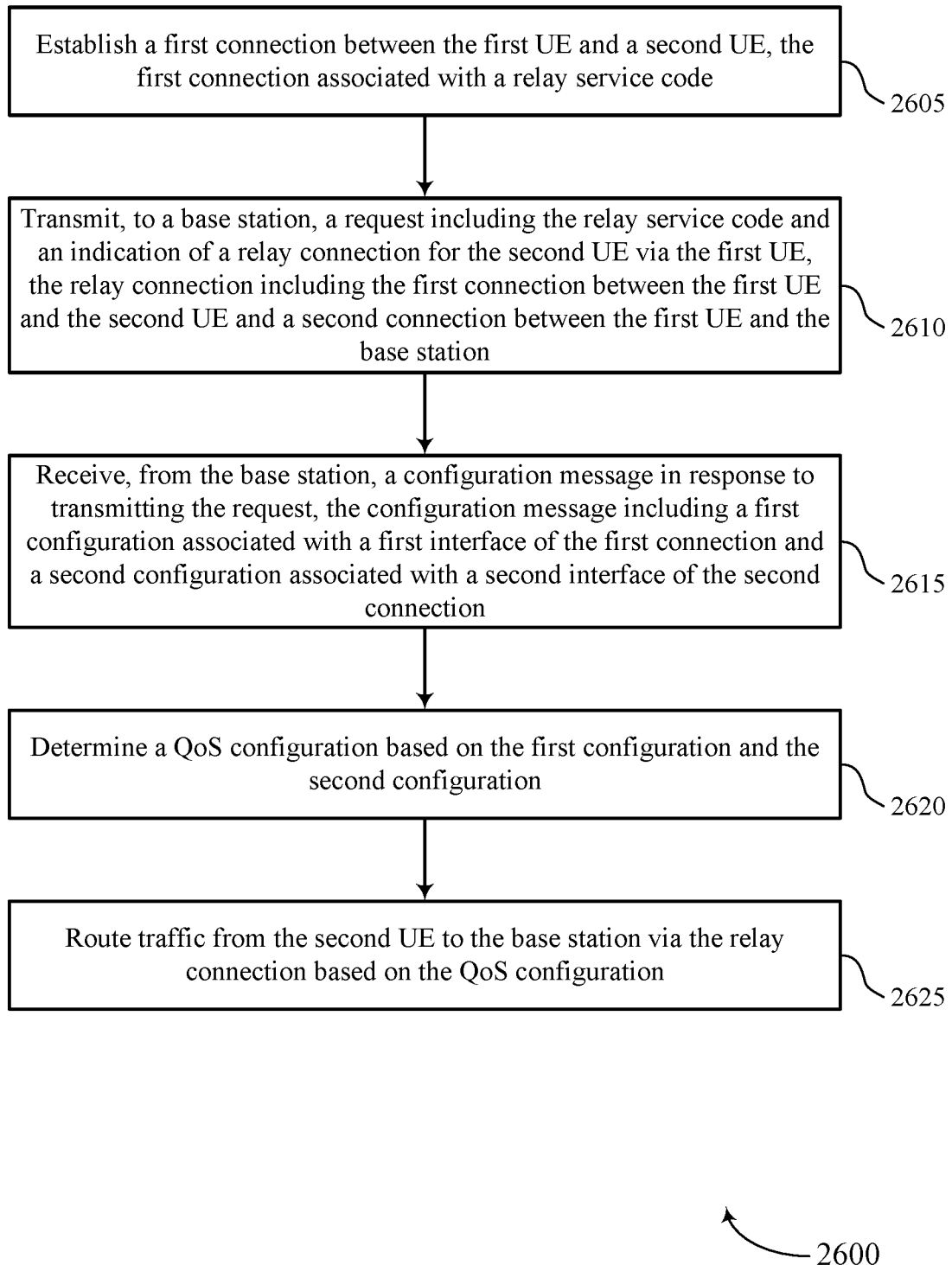

FIG. 26 shows a flowchart illustrating a method 2600 that supports QoS support for sidelink relay service in accordance with aspects of the present disclosure. The operations of method 2600 may be implemented by a UE 115 (e.g., a relay UE 115) or its components as described herein. For example, the operations of method 2600 may be performed by a UE communications manager as described with reference to FIGS. 13 through 16. In some examples, a UE may execute a set of instructions to control the functional elements of the UE to perform the functions described below. Additionally or alternatively, a UE may perform aspects of the functions described below using special-purpose hardware.

At 2605, the UE may establish a first connection between the first UE and a second UE, the first connection associated with a relay service code. The operations of 2605 may be performed according to the methods described herein. In some examples, aspects of the operations of 2605 may be performed by a relay connection establishment component as described with reference to FIGS. 13 through 16.

At 2610, the UE may transmit, to a base station, a request including the relay service code and an indication of a relay connection for the second UE via the first UE, the relay connection including the first connection between the first UE and the second UE and a second connection between the first UE and the base station. The operations of 2610 may be performed according to the methods described herein. In some examples, aspects of the operations of 2610 may be performed by a relay request component as described with reference to FIGS. 13 through 16.

At 2615, the UE may receive, from the base station, a configuration message in response to transmitting the request, the configuration message including a first configuration associated with a first interface of the first connection and a second configuration associated with a second interface of the second connection. The operations of 2615 may be performed according to the methods described herein. In some examples, aspects of the operations of 2615 may be performed by a QoS configuration receiver as described with reference to FIGS. 13 through 16.

At 2620, the UE may determine a QoS configuration based on the first configuration and the second configuration. The operations of 2620 may be performed according to the methods described herein. In some examples, aspects of the operations of 2620 may be performed by a QoS configuration determination component as described with reference to FIGS. 13 through 16.

At 2625, the UE may route traffic from the second UE to the base station via the relay connection based on the QoS configuration. The operations of 2625 may be performed according to the methods described herein. In some examples, aspects of the operations of 2625 may be performed by a relay component as described with reference to FIGS. 13 through 16.

Figure 27:
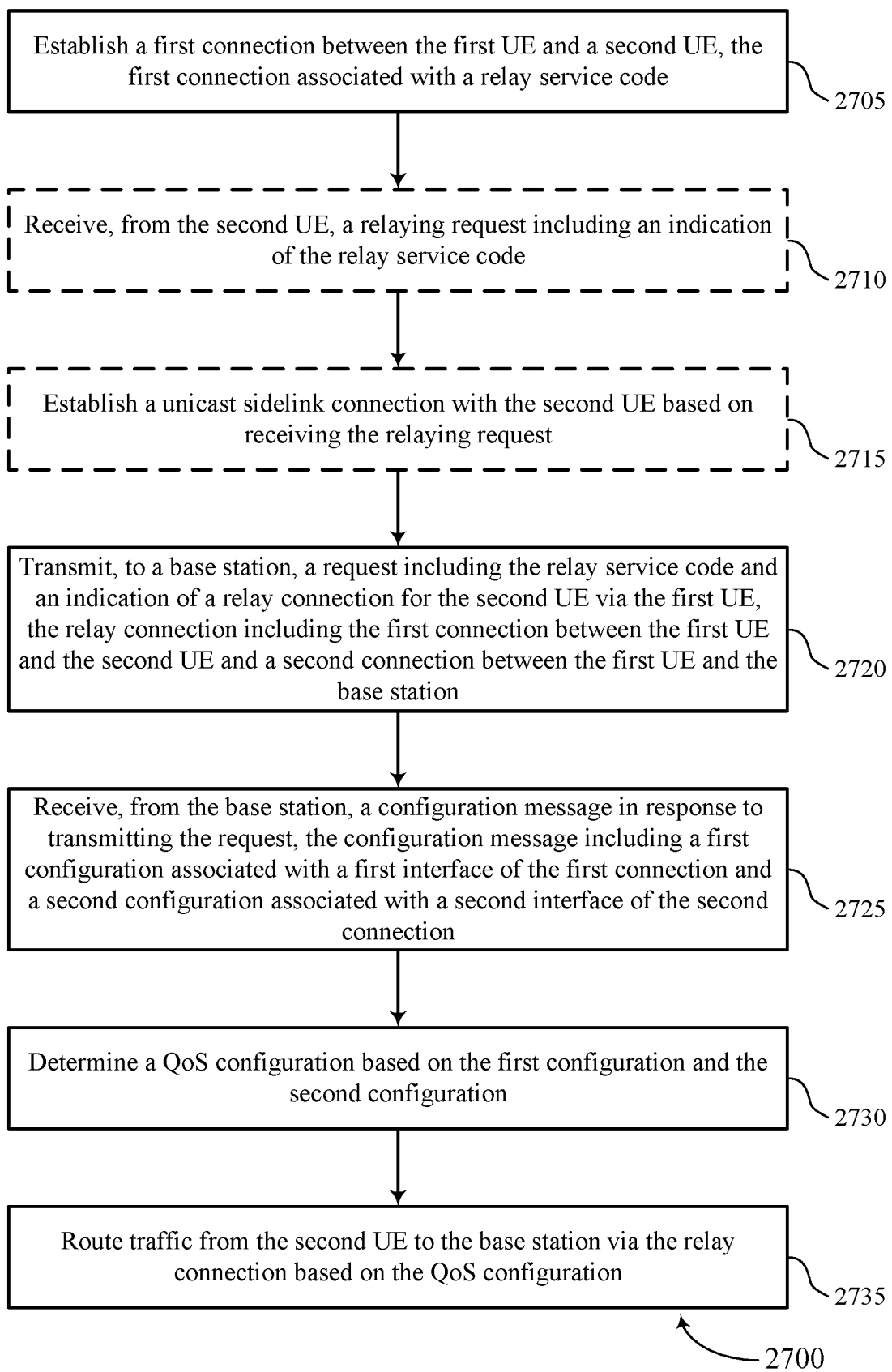

FIG. 27 shows a flowchart illustrating a method 2700 that supports QoS support for sidelink relay service in accordance with aspects of the present disclosure. The operations of method 2700 may be implemented by a UE 115 (e.g., a relay UE 115) or its components as described herein. For example, the operations of method 2700 may be performed by a UE communications manager as described with reference to FIGS. 13 through 16. In some examples, a UE may execute a set of instructions to control the functional elements of the UE to perform the functions described below. Additionally or alternatively, a UE may perform aspects of the functions described below using special-purpose hardware.

At 2705, the UE may establish a first connection between the first UE and a second UE, the first connection associated with a relay service code. The operations of 2705 may be performed according to the methods described herein. In some examples, aspects of the operations of 2705 may be performed by a relay connection establishment component as described with reference to FIGS. 13 through 16.

At 2710, the UE may receive, from the second UE, a relaying request including an indication of the relay service code. The operations of 2710 may be performed according to the methods described herein. In some examples, aspects of the operations of 2710 may be performed by a relay connection establishment component as described with reference to FIGS. 13 through 16.

At 2715, the UE may establish a unicast sidelink connection with the second UE based on receiving the relaying request. The operations of 2715 may be performed according to the methods described herein. In some examples, aspects of the operations of 2715 may be performed by a relay connection establishment component as described with reference to FIGS. 13 through 16.

At 2720, the UE may transmit, to a base station, a request including the relay service code and an indication of a relay connection for the second UE via the first UE, the relay connection including the first connection between the first UE and the second UE and a second connection between the first UE and the base station. The operations of 2720 may be performed according to the methods described herein. In some examples, aspects of the operations of 2720 may be performed by a relay request component as described with reference to FIGS. 13 through 16.

At 2725, the UE may receive, from the base station, a configuration message in response to transmitting the request, the configuration message including a first configuration associated with a first interface of the first connection and a second configuration associated with a second interface of the second connection. The operations of 2725 may be performed according to the methods described herein. In some examples, aspects of the operations of 2725 may be performed by a QoS configuration receiver as described with reference to FIGS. 13 through 16.

At 2730, the UE may determine a QoS configuration based on the first configuration and the second configuration. The operations of 2730 may be performed according to the methods described herein. In some examples, aspects of the operations of 2730 may be performed by a QoS configuration determination component as described with reference to FIGS. 13 through 16.

At 2735, the UE may route traffic from the second UE to the base station via the relay connection based on the QoS configuration. The operations of 2735 may be performed according to the methods described herein. In some examples, aspects of the operations of 2735 may be performed by a relay component as described with reference to FIGS. 13 through 16.

Figure 28:
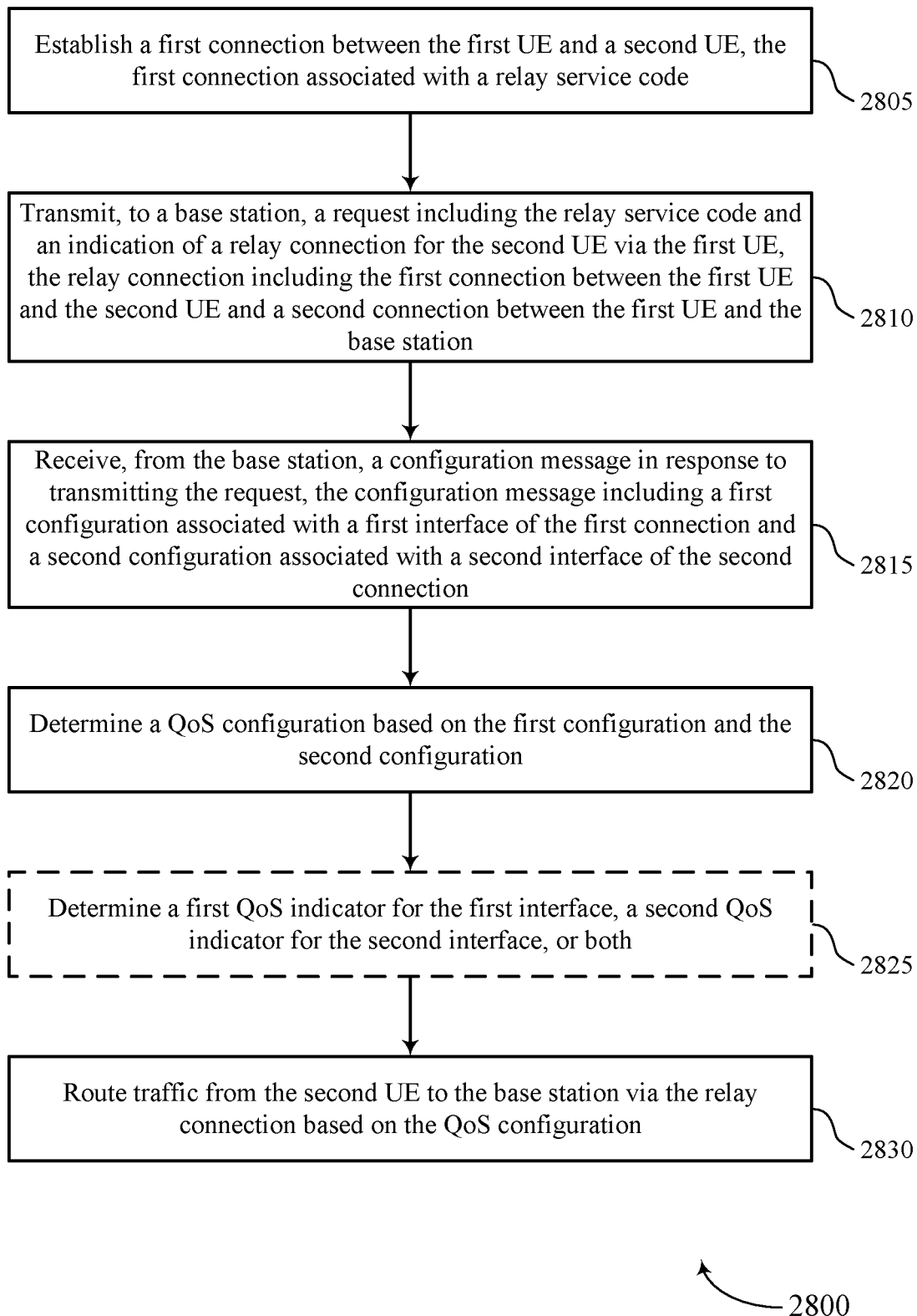

FIG. 28 shows a flowchart illustrating a method 2800 that supports QoS support for sidelink relay service in accordance with aspects of the present disclosure. The operations of method 2800 may be implemented by a UE 115 (e.g., a relay UE 115) or its components as described herein. For example, the operations of method 2800 may be performed by a UE communications manager as described with reference to FIGS. 13 through 16. In some examples, a UE may execute a set of instructions to control the functional elements of the UE to perform the functions described below. Additionally or alternatively, a UE may perform aspects of the functions described below using special-purpose hardware.

At 2805, the UE may establish a first connection between the first UE and a second UE, the first connection associated with a relay service code. The operations of 2805 may be performed according to the methods described herein. In some examples, aspects of the operations of 2805 may be performed by a relay connection establishment component as described with reference to FIGS. 13 through 16.

At 2810, the UE may transmit, to a base station, a request including the relay service code and an indication of a relay connection for the second UE via the first UE, the relay connection including the first connection between the first UE and the second UE and a second connection between the first UE and the base station. The operations of 2810 may be performed according to the methods described herein. In some examples, aspects of the operations of 2810 may be performed by a relay request component as described with reference to FIGS. 13 through 16.

At 2815, the UE may receive, from the base station, a configuration message in response to transmitting the request, the configuration message including a first configuration associated with a first interface of the first connection and a second configuration associated with a second interface of the second connection. The operations of 2815 may be performed according to the methods described herein. In some examples, aspects of the operations of 2815 may be performed by a QoS configuration receiver as described with reference to FIGS. 13 through 16.

At 2820, the UE may determine a QoS configuration based on the first configuration and the second configuration. The operations of 2820 may be performed according to the methods described herein. In some examples, aspects of the operations of 2820 may be performed by a QoS configuration determination component as described with reference to FIGS. 13 through 16.

At 2825, the UE may determine a first QoS indicator for the first interface, a second QoS indicator for the second interface, or both. The operations of 2825 may be performed according to the methods described herein. In some examples, aspects of the operations of 2825 may be performed by a QoS indicator component as described with reference to FIGS. 13 through 16.

At 2830, the UE may route traffic from the second UE to the base station via the relay connection based on the QoS configuration. The operations of 2830 may be performed according to the methods described herein. In some examples, aspects of the operations of 2830 may be performed by a relay component as described with reference to FIGS. 13 through 16.

Figure 29:
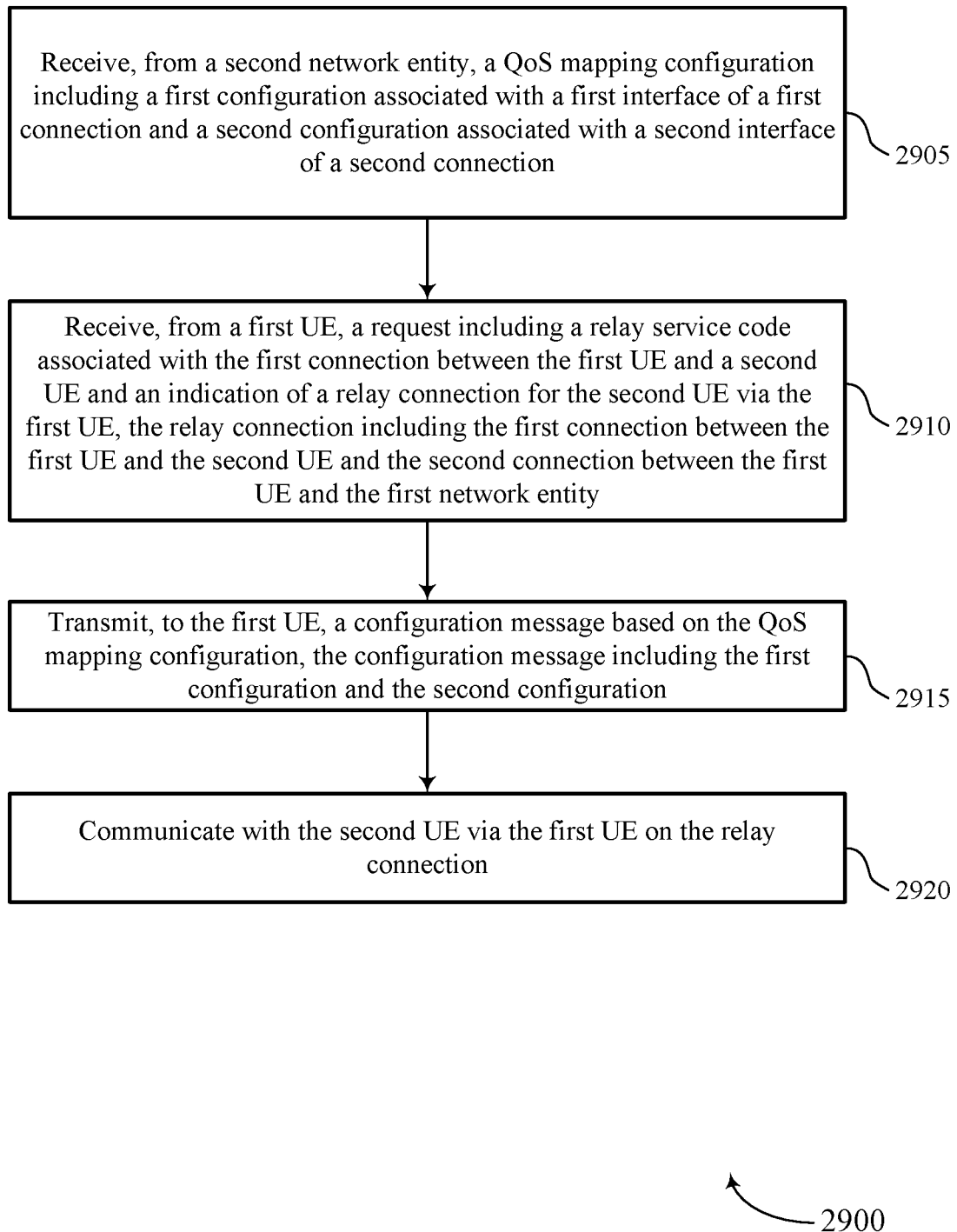

FIG. 29 shows a flowchart illustrating a method 2900 that supports QoS support for sidelink relay service in accordance with aspects of the present disclosure. The operations of method 2900 may be implemented by a network entity (e.g., a base station 105) or its components as described herein. For example, the operations of method 2900 may be performed by a communications manager as described with reference to FIGS. 17 through 20. In some examples, a base station may execute a set of instructions to control the functional elements of the base station to perform the functions described below. Additionally or alternatively, a base station may perform aspects of the functions described below using special-purpose hardware.

At 2905, the network entity may receive, from a second network entity, a QoS mapping configuration including a first configuration associated with a first interface of a first connection and a second configuration associated with a second interface of a second connection. The operations of 2905 may be performed according to the methods described herein. In some examples, aspects of the operations of 2905 may be performed by a QoS configuration component as described with reference to FIGS. 17 through 20.

At 2910, the base station may receive, from a first UE, a request including a relay service code associated with the first connection between the first UE and a second UE and an indication of a relay connection for the second UE via the first UE, the relay connection including the first connection between the first UE and the second UE and the second connection between the first UE and the first network entity. The operations of 2910 may be performed according to the methods described herein. In some examples, aspects of the operations of 2910 may be performed by a relay service request component as described with reference to FIGS. 17 through 20.

At 2915, the base station may transmit, to the first UE, a configuration message based on the QoS mapping configuration, the configuration message including the first configuration and the second configuration. The operations of 2915 may be performed according to the methods described herein. In some examples, aspects of the operations of 2915 may be performed by a QoS configuration transmitter as described with reference to FIGS. 17 through 20.

At 2920, the base station may communicate with the second UE via the first UE on the relay connection. The operations of 2920 may be performed according to the methods described herein. In some examples, aspects of the operations of 2920 may be performed by a relay communication component as described with reference to FIGS. 17 through 20.

Figure 30:
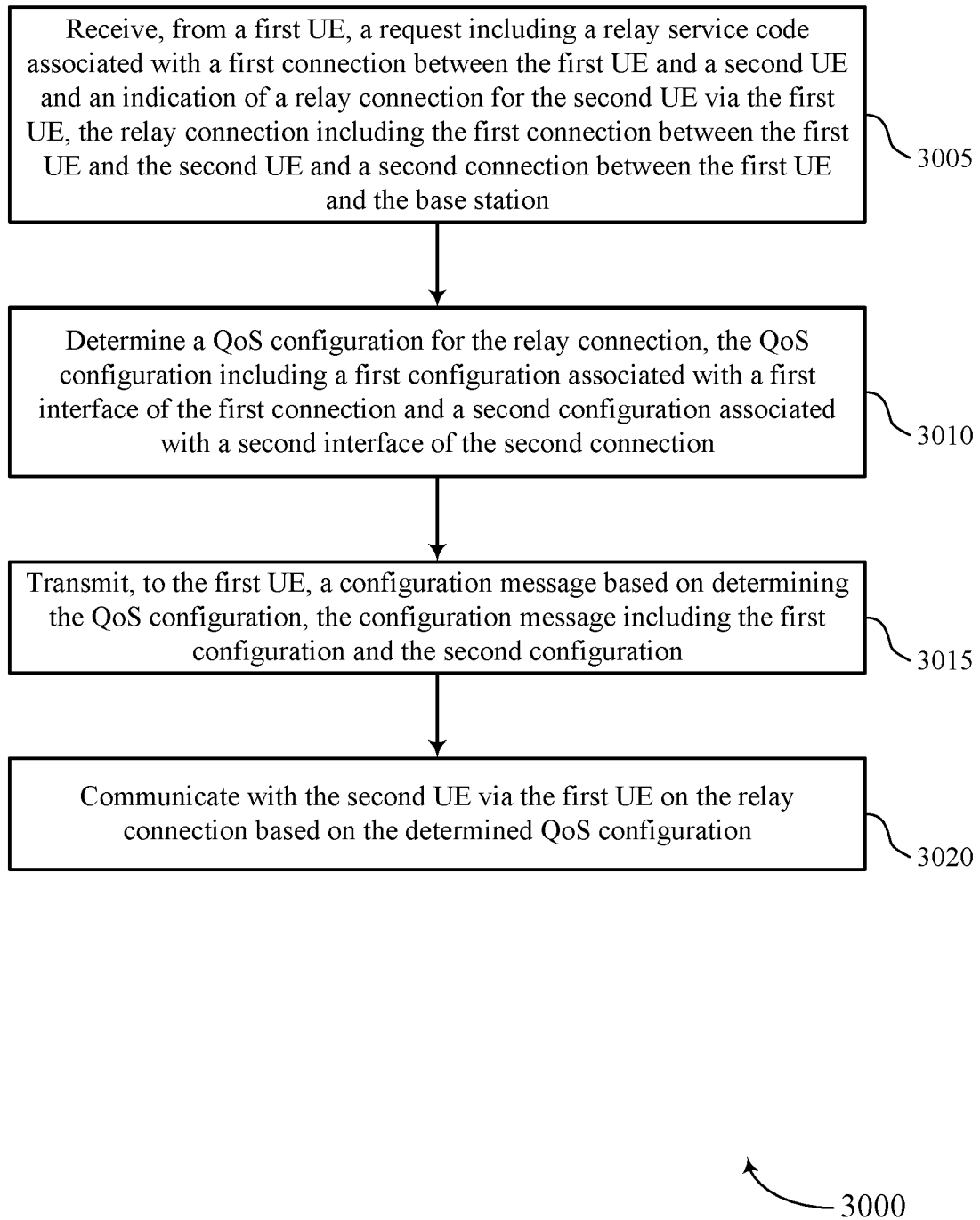

FIG. 30 shows a flowchart illustrating a method 3000 that supports QoS support for sidelink relay service in accordance with aspects of the present disclosure. The operations of method 3000 may be implemented by a base station 105 or its components as described herein. For example, the operations of method 3000 may be performed by a communications manager as described with reference to FIGS. 17 through 20. In some examples, a base station may execute a set of instructions to control the functional elements of the base station to perform the functions described below. Additionally or alternatively, a base station may perform aspects of the functions described below using special-purpose hardware.

At 3005, the base station may receive, from a first UE, a request including a relay service code associated with a first connection between the first UE and a second UE and an indication of a relay connection for the second UE via the first UE, the relay connection including the first connection between the first UE and the second UE and a second connection between the first UE and the base station. The operations of 3005 may be performed according to the methods described herein. In some examples, aspects of the operations of 3005 may be performed by a relay service request component as described with reference to FIGS. 17 through 20.

At 3010, the base station may determine a QoS configuration for the relay connection, the QoS configuration including a first configuration associated with a first interface of the first connection and a second configuration associated with a second interface of the second connection. The operations of 3010 may be performed according to the methods described herein. In some examples, aspects of the operations of 3010 may be performed by a QoS configuration component as described with reference to FIGS. 17 through 20.

At 3015, the base station may transmit, to the first UE, a configuration message based on determining the QoS configuration, the configuration message including the first configuration and the second configuration. The operations of 3015 may be performed according to the methods described herein. In some examples, aspects of the operations of 3015 may be performed by a QoS configuration transmitter as described with reference to FIGS. 17 through 20.

At 3020, the base station may communicate with the second UE via the first UE on the relay connection based on the determined QoS configuration. The operations of 3020 may be performed according to the methods described herein. In some examples, aspects of the operations of 3020 may be performed by a relay communication component as described with reference to FIGS. 17 through 20.

Figure 31:
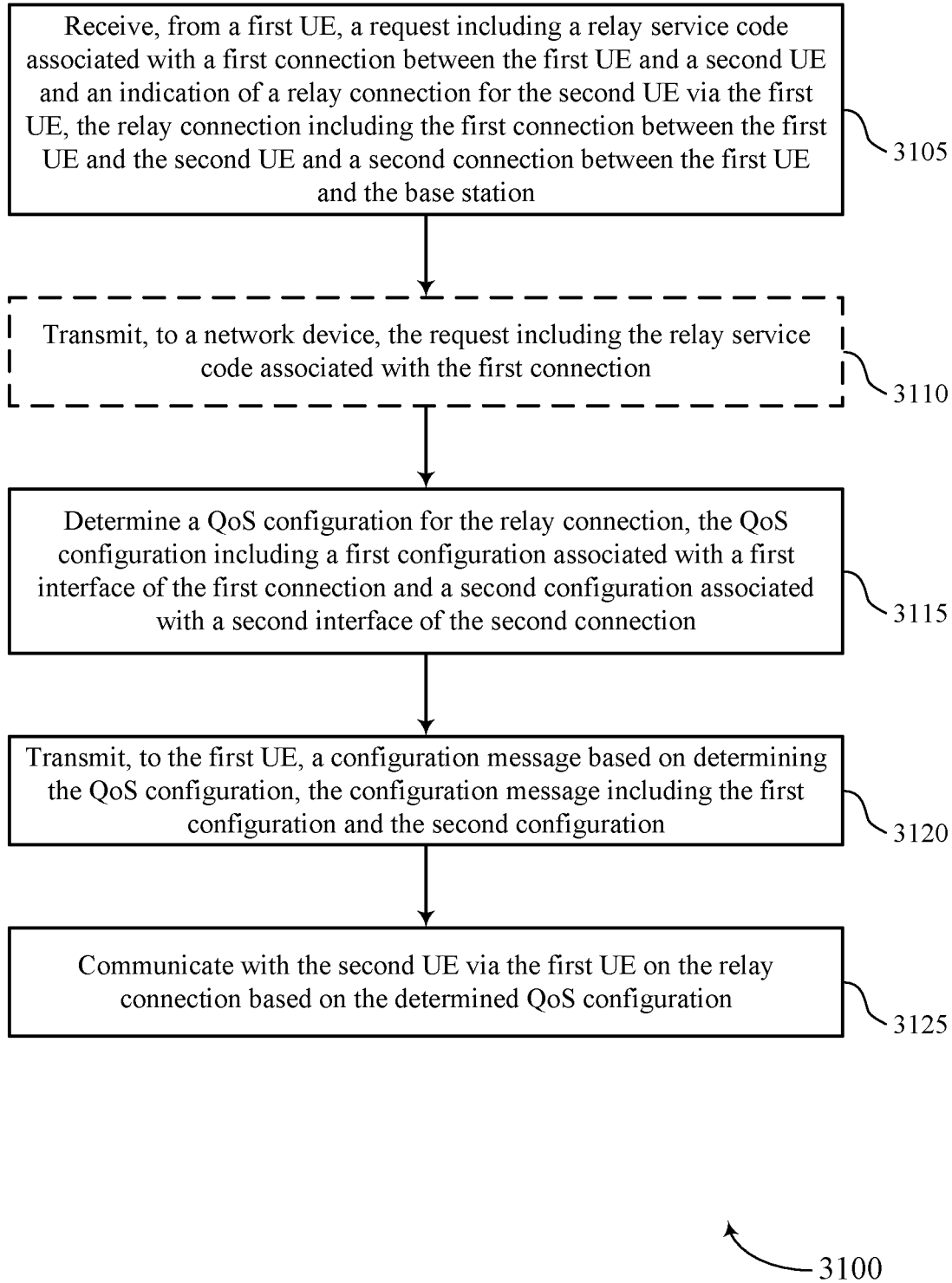

FIG. 31 shows a flowchart illustrating a method 3100 that supports QoS support for sidelink relay service in accordance with aspects of the present disclosure. The operations of method 3100 may be implemented by a base station 105 or its components as described herein. For example, the operations of method 3100 may be performed by a communications manager as described with reference to FIGS. 17 through 20. In some examples, a base station may execute a set of instructions to control the functional elements of the base station to perform the functions described below. Additionally or alternatively, a base station may perform aspects of the functions described below using special-purpose hardware.

At 3105, the base station may receive, from a first UE, a request including a relay service code associated with a first connection between the first UE and a second UE and an indication of a relay connection for the second UE via the first UE, the relay connection including the first connection between the first UE and the second UE and a second connection between the first UE and the base station. The operations of 3105 may be performed according to the methods described herein. In some examples, aspects of the operations of 3105 may be performed by a relay service request component as described with reference to FIGS. 17 through 20.

At 3110, the base station may transmit, to a network device, the request including the relay service code associated with the first connection. The operations of 3110 may be performed according to the methods described herein. In some examples, aspects of the operations of 3110 may be performed by a relay service request component as described with reference to FIGS. 17 through 20.

At 3115, the base station may determine a QoS configuration for the relay connection, the QoS configuration including a first configuration associated with a first interface of the first connection and a second configuration associated with a second interface of the second connection. The operations of 3115 may be performed according to the methods described herein. In some examples, aspects of the operations of 3115 may be performed by a QoS configuration component as described with reference to FIGS. 17 through 20.

At 3120, the base station may transmit, to the first UE, a configuration message based on determining the QoS configuration, the configuration message including the first configuration and the second configuration. The operations of 3120 may be performed according to the methods described herein. In some examples, aspects of the operations of 3120 may be performed by a QoS configuration transmitter as described with reference to FIGS. 17 through 20.

At 3125, the base station may communicate with the second UE via the first UE on the relay connection based on the determined QoS configuration. The operations of 3125 may be performed according to the methods described herein. In some examples, aspects of the operations of 3125 may be performed by a relay communication component as described with reference to FIGS. 17 through 20.

Figure 32:
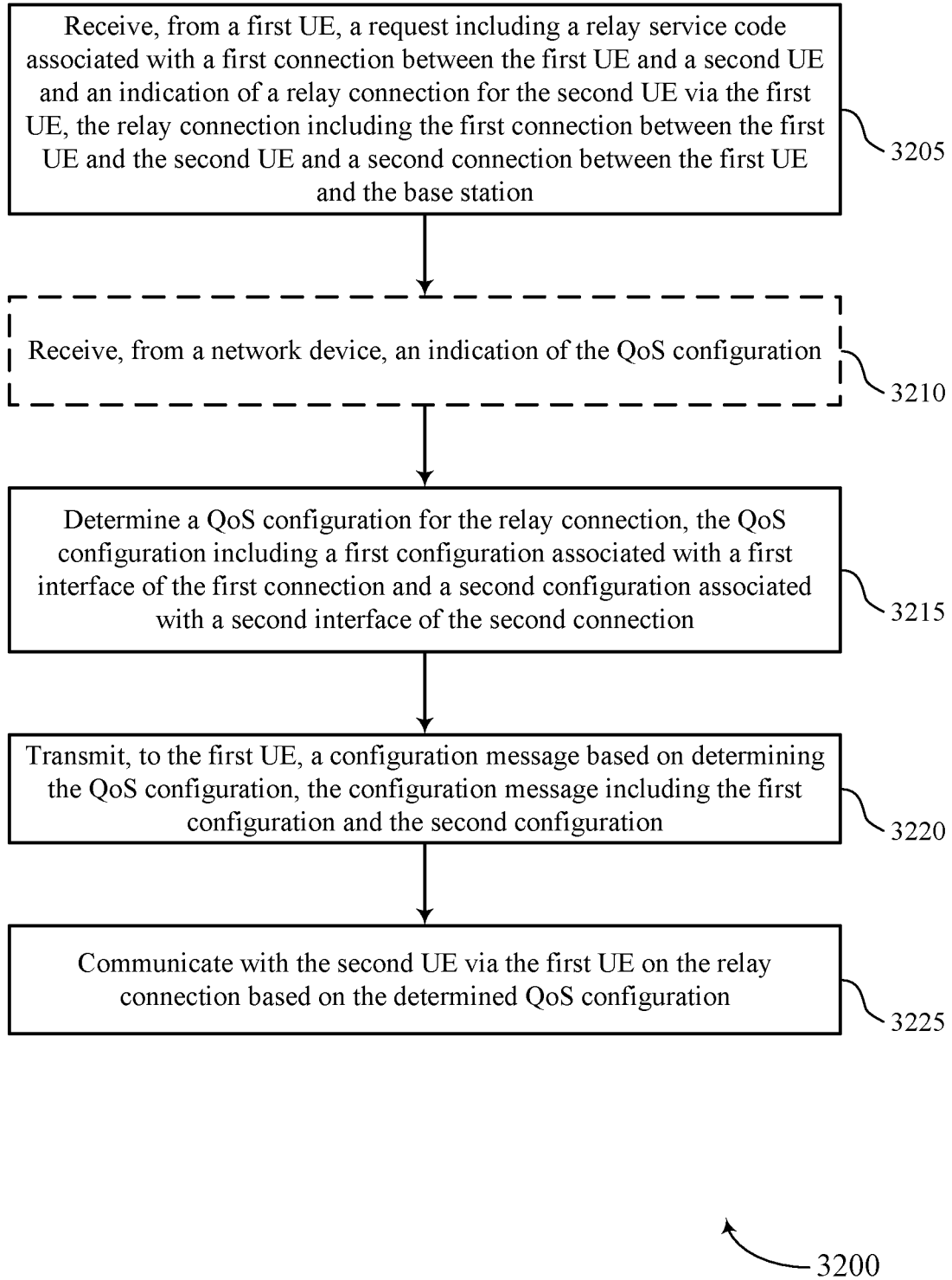

FIG. 32 shows a flowchart illustrating a method 3200 that supports QoS support for sidelink relay service in accordance with aspects of the present disclosure. The operations of method 3200 may be implemented by a base station 105 or its components as described herein. For example, the operations of method 3200 may be performed by a communications manager as described with reference to FIGS. 17 through 20. In some examples, a base station may execute a set of instructions to control the functional elements of the base station to perform the functions described below. Additionally or alternatively, a base station may perform aspects of the functions described below using special-purpose hardware.

At 3205, the base station may receive, from a first UE, a request including a relay service code associated with a first connection between the first UE and a second UE and an indication of a relay connection for the second UE via the first UE, the relay connection including the first connection between the first UE and the second UE and a second connection between the first UE and the base station. The operations of 3205 may be performed according to the methods described herein. In some examples, aspects of the operations of 3205 may be performed by a relay service request component as described with reference to FIGS. 17 through 20.

At 3210, the base station may receive, from a network device, an indication of the QoS configuration. The operations of 3210 may be performed according to the methods described herein. In some examples, aspects of the operations of 3210 may be performed by a QoS configuration component as described with reference to FIGS. 17 through 20.

At 3215, the base station may determine a QoS configuration for the relay connection, the QoS configuration including a first configuration associated with a first interface of the first connection and a second configuration associated with a second interface of the second connection. The operations of 3215 may be performed according to the methods described herein. In some examples, aspects of the operations of 3215 may be performed by a QoS configuration component as described with reference to FIGS. 17 through 20.

At 3220, the base station may transmit, to the first UE, a configuration message based on determining the QoS configuration, the configuration message including the first configuration and the second configuration. The operations of 3220 may be performed according to the methods described herein. In some examples, aspects of the operations of 3220 may be performed by a QoS configuration transmitter as described with reference to FIGS. 17 through 20.

At 3225, the base station may communicate with the second UE via the first UE on the relay connection based on the determined QoS configuration. The operations of 3225 may be performed according to the methods described herein. In some examples, aspects of the operations of 3225 may be performed by a relay communication component as described with reference to FIGS. 17 through 20.

Figure 33:
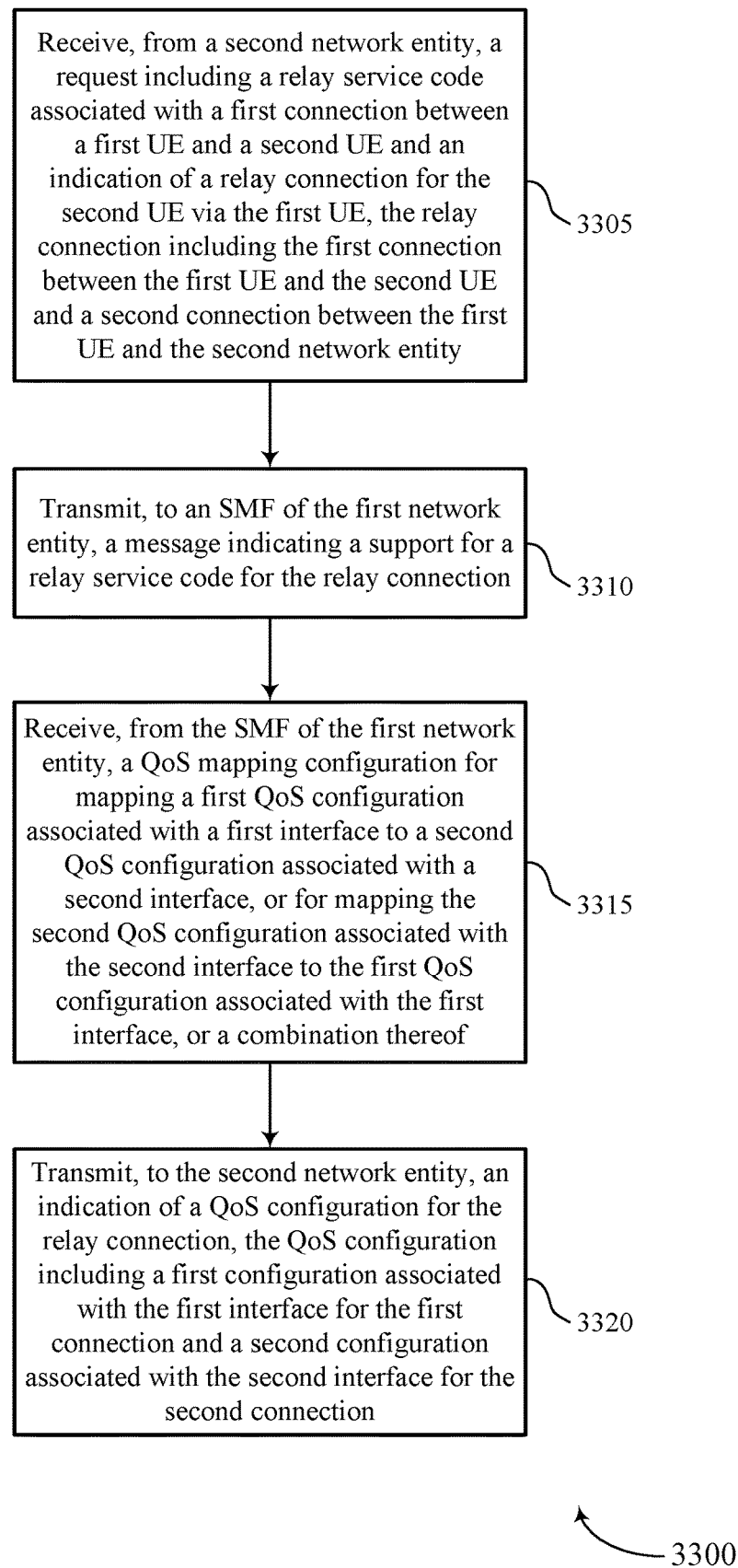

FIG. 33 shows a flowchart illustrating a method 3300 that supports QoS support for sidelink relay service in accordance with aspects of the present disclosure. The operations of method 3300 may be implemented by a network entity or its components as described herein. For example, the operations of method 3300 may be performed by a network device communications manager as described with reference to FIGS. 21 through 24. In some examples, a network entity may execute a set of instructions to control the functional elements of the network entity to perform the functions described below. Additionally or alternatively, a network entity may perform aspects of the functions described below using special-purpose hardware.

At 3305, the network entity may receive, from a second network entity, a request including a relay service code associated with a first connection between a first UE and a second UE and an indication of a relay connection for the second UE via the first UE, the relay connection including the first connection between the first UE and the second UE and a second connection between the first UE and the second network entity. The operations of 3305 may be performed according to the methods described herein. In some examples, aspects of the operations of 3305 may be performed by a relay service request receiver as described with reference to FIGS. 21 through 24.

At 3310, the network entity may transmit, to an SMF of the first network entity, a message indicating a support for a relay service code for the relay connection. The operations of 3310 may be performed according to the methods described herein. In some examples, aspects of the operations of 3310 may be performed by a relay service support component as described with reference to FIGS. 21 through 24.

At 3315, the network entity may receive, from the SMF of the first network entity, a QoS mapping configuration for mapping a first QoS configuration associated with a first interface to a second QoS configuration associated with a second interface, or for mapping the second QoS configuration associated with the second interface to the first QoS configuration associated with the first interface, or a combination thereof. The operations of 3315 may be performed according to the methods described herein. In some examples, aspects of the operations of 3315 may be performed by a QoS determination component as described with reference to FIGS. 21 through 24.

At 3320, the network entity may transmit, to the second network entity, an indication of a QoS configuration for the relay connection, the QoS configuration including a first configuration associated with the first interface for the first connection and a second configuration associated with the second interface for the second connection. The operations of 3320 may be performed according to the methods described herein. In some examples, aspects of the operations of 3320 may be performed by a QoS configuration indicator as described with reference to FIGS. 21 through 24.

Figure 34:
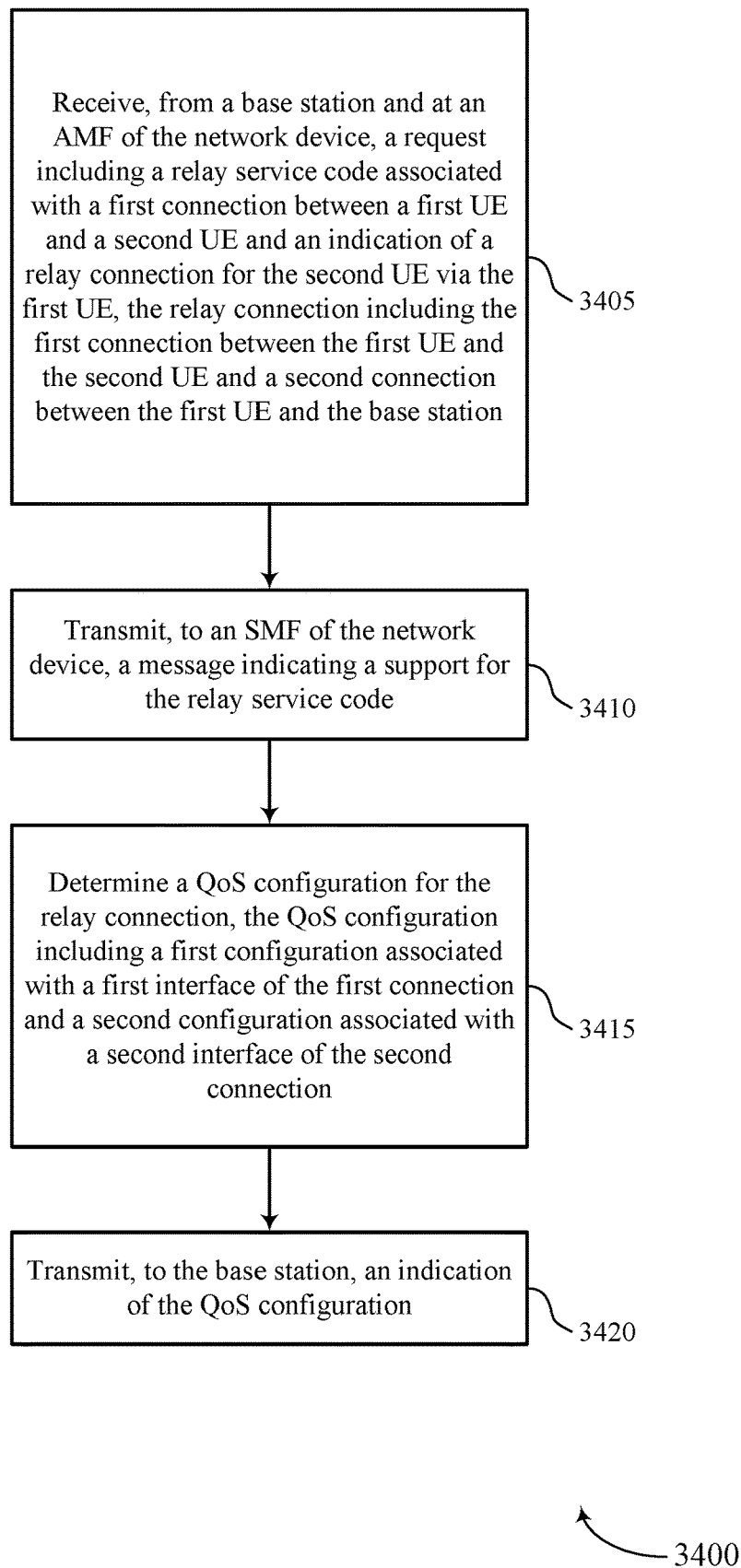

FIG. 34 shows a flowchart illustrating a method 3400 that supports QoS support for sidelink relay service in accordance with aspects of the present disclosure. The operations of method 3400 may be implemented by a network entity or its components as described herein. For example, the operations of method 3400 may be performed by a network device communications manager as described with reference to FIGS. 21 through 24. In some examples, a network entity may execute a set of instructions to control the functional elements of the network entity to perform the functions described below. Additionally or alternatively, a network entity may perform aspects of the functions described below using special-purpose hardware.

At 3405, the network entity may receive, from a base station and at an AMF of the network device, a request including a relay service code associated with a first connection between a first UE and a second UE and an indication of a relay connection for the second UE via the first UE, the relay connection including the first connection between the first UE and the second UE and a second connection between the first UE and the base station. The operations of 3405 may be performed according to the methods described herein. In some examples, aspects of the operations of 3405 may be performed by a relay service request receiver as described with reference to FIGS. 21 through 24.

At 3410, the network entity may transmit, to an SMF of the network device, a message indicating a support for the relay service code. The operations of 3410 may be performed according to the methods described herein. In some examples, aspects of the operations of 3410 may be performed by a relay service support component as described with reference to FIGS. 21 through 24.

At 3415, the network entity may determine a QoS configuration for the relay connection, the QoS configuration including a first configuration associated with a first interface of the first connection and a second configuration associated with a second interface of the second connection. The operations of 3415 may be performed according to the methods described herein. In some examples, aspects of the operations of 3415 may be performed by a QoS determination component as described with reference to FIGS. 21 through 24.

At 3420, the network entity may transmit, to the base station, an indication of the QoS configuration. The operations of 3420 may be performed according to the methods described herein. In some examples, aspects of the operations of 3420 may be performed by a QoS configuration indicator as described with reference to FIGS. 21 through 24.

Figure 35:
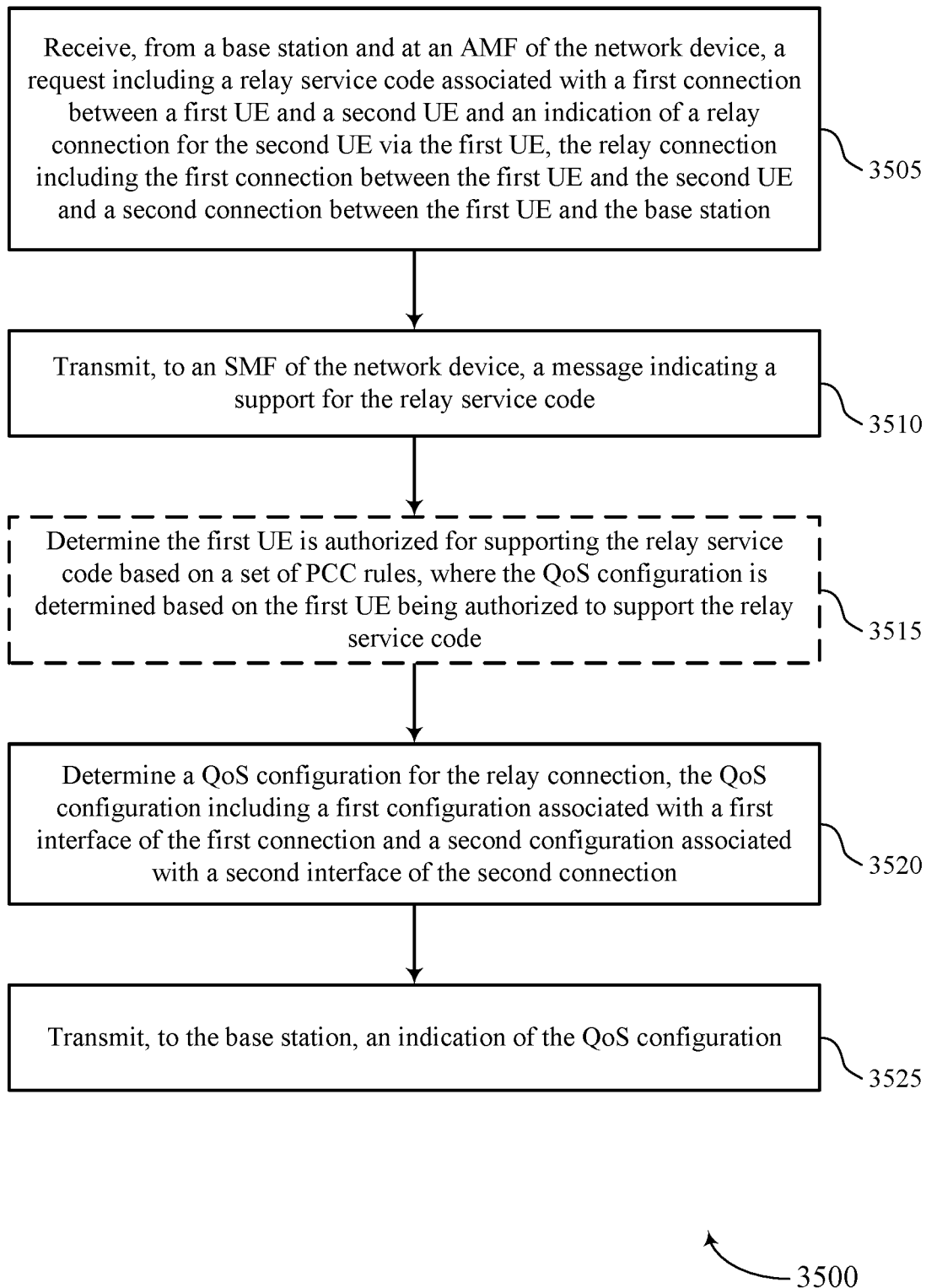

FIG. 35 shows a flowchart illustrating a method 3500 that supports QoS support for sidelink relay service in accordance with aspects of the present disclosure. The operations of method 3500 may be implemented by a network entity or its components as described herein. For example, the operations of method 3500 may be performed by a network device communications manager as described with reference to FIGS. 21 through 24. In some examples, a network entity may execute a set of instructions to control the functional elements of the network entity to perform the functions described below. Additionally or alternatively, a network entity may perform aspects of the functions described below using special-purpose hardware.

At 3505, the network entity may receive, from a base station and at an AMF of the network device, a request including a relay service code associated with a first connection between a first UE and a second UE and an indication of a relay connection for the second UE via the first UE, the relay connection including the first connection between the first UE and the second UE and a second connection between the first UE and the base station. The operations of 3505 may be performed according to the methods described herein. In some examples, aspects of the operations of 3505 may be performed by a relay service request receiver as described with reference to FIGS. 21 through 24.

At 3510, the network entity may transmit, to an SMF of the network device, a message indicating a support for the relay service code. The operations of 3510 may be performed according to the methods described herein. In some examples, aspects of the operations of 3510 may be performed by a relay service support component as described with reference to FIGS. 21 through 24.

At 3515, the network entity may determine the first UE is authorized for supporting the relay service code based on a set of PCC rules, where the QoS configuration is determined based on the first UE being authorized to support the relay service code. The operations of 3515 may be performed according to the methods described herein. In some examples, aspects of the operations of 3515 may be performed by a relay service authorization component as described with reference to FIGS. 21 through 24.

At 3520, the network entity may determine a QoS configuration for the relay connection, the QoS configuration including a first configuration associated with a first interface of the first connection and a second configuration associated with a second interface of the second connection. The operations of 3520 may be performed according to the methods described herein. In some examples, aspects of the operations of 3520 may be performed by a QoS determination component as described with reference to FIGS. 21 through 24.

At 3525, the network entity may transmit, to the base station, an indication of the QoS configuration. The operations of 3525 may be performed according to the methods described herein. In some examples, aspects of the operations of 3525 may be performed by a QoS configuration indicator as described with reference to FIGS. 21 through 24.

Figure 36:
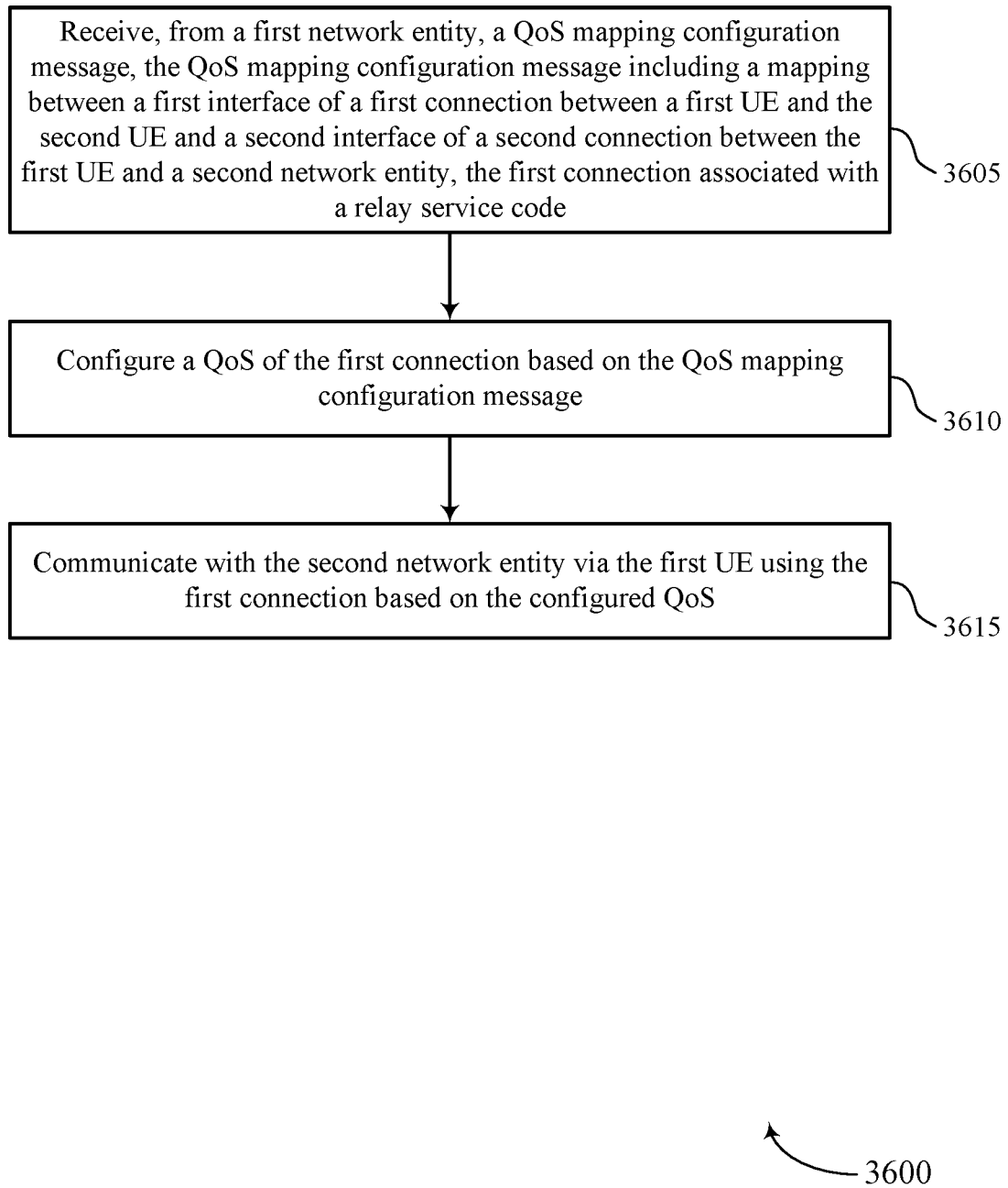

FIG. 36 shows a flowchart illustrating a method 3600 that supports QoS support for sidelink relay service in accordance with aspects of the present disclosure. The operations of method 3600 may be implemented by a UE 115 (e.g., a remote UE 115) or its components as described herein. For example, the operations of method 3600 may be performed by a UE communications manager as described with reference to FIGS. 13 through 16. In some examples, a UE may execute a set of instructions to control the functional elements of the UE to perform the functions described below. Additionally or alternatively, a UE may perform aspects of the functions described below using special-purpose hardware.

At 3605, the UE may receive, from a first network entity, a QoS mapping configuration message, the QoS mapping configuration message including a mapping between a first interface of a first connection between a first UE and the second UE and a second interface of a second connection between the first UE and a second network entity, the first connection associated with a relay service code. The operations of 3605 may be performed according to the methods described herein. In some examples, aspects of the operations of 3605 may be performed by a QoS configuration receiver as described with reference to FIGS. 13 through 16.

At 3610, the UE may configure a QoS of the first connection based on the QoS mapping configuration message. The operations of 3610 may be performed according to the methods described herein. In some examples, aspects of the operations of 3610 may be performed by a QoS configuration determination component as described with reference to FIGS. 13 through 16.

At 3615, the UE may communicate with the second network entity via the first UE using the first connection based on the configured QoS. The operations of 3615 may be performed according to the methods described herein. In some examples, aspects of the operations of 3615 may be performed by a communications component as described with reference to FIGS. 13 through 16.

Figure 37:
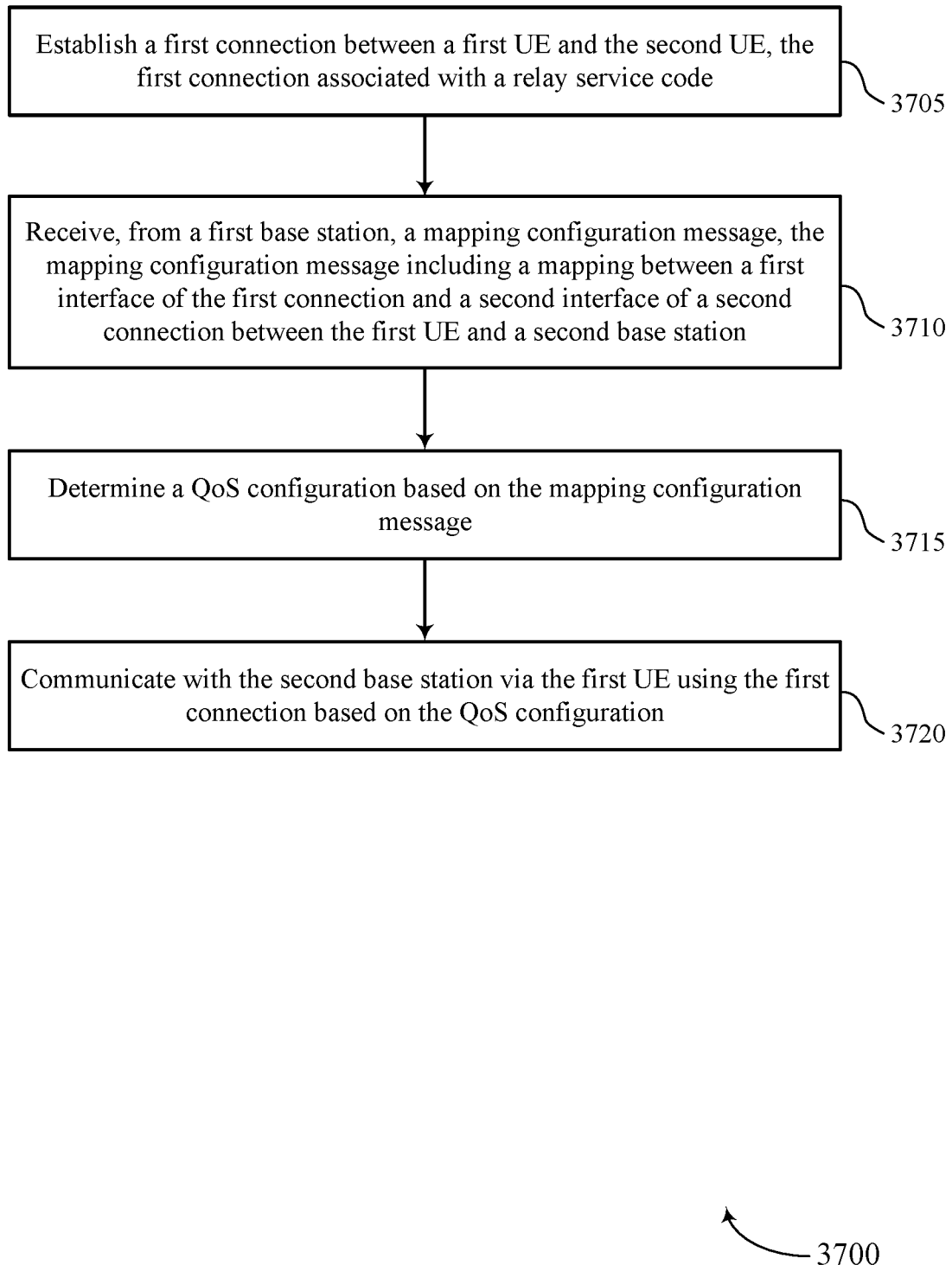

FIG. 37 shows a flowchart illustrating a method 3700 that supports QoS support for sidelink relay service in accordance with aspects of the present disclosure. The operations of method 3700 may be implemented by a UE 115 (e.g., a remote UE 115) or its components as described herein. For example, the operations of method 3700 may be performed by a UE communications manager as described with reference to FIGS. 13 through 16. In some examples, a UE may execute a set of instructions to control the functional elements of the UE to perform the functions described below. Additionally or alternatively, a UE may perform aspects of the functions described below using special-purpose hardware.

At 3705, the UE may establish a first connection between a first UE and the second UE, the first connection associated with a relay service code. The operations of 3705 may be performed according to the methods described herein. In some examples, aspects of the operations of 3705 may be performed by a relay connection establishment component as described with reference to FIGS. 13 through 16.

At 3710, the UE may receive, from a first base station, a mapping configuration message, the mapping configuration message including a mapping between a first interface of the first connection and a second interface of a second connection between the first UE and a second base station. The operations of 3710 may be performed according to the methods described herein. In some examples, aspects of the operations of 3710 may be performed by a QoS configuration receiver as described with reference to FIGS. 13 through 16.

At 3715, the UE may determine a QoS configuration based on the mapping configuration message. The operations of 3715 may be performed according to the methods described herein. In some examples, aspects of the operations of 3715 may be performed by a QoS configuration determination component as described with reference to FIGS. 13 through 16.

At 3720, the UE may communicate with the second base station via the first UE using the first connection based on the QoS configuration. The operations of 3720 may be performed according to the methods described herein. In some examples, aspects of the operations of 3720 may be performed by a communications component as described with reference to FIGS. 13 through 16.

The following provides an overview of aspects of the present disclosure:

Aspect 1: A method for wireless communications at a first UE, comprising: transmitting, to a network entity, an indication for a relay connection for a second UE via the first UE, the relay connection comprising a first connection between the first UE and the second UE and a second connection between the first UE and the network entity; receiving, from the network entity, a quality of service mapping configuration for mapping a first quality of service configuration associated with a first interface to a second quality of service configuration associated with a second interface, or for mapping the second quality of service configuration associated with the second interface to the first quality of service configuration associated with the first interface, or a combination thereof; configuring a first quality of service of the first connection and a second quality of service of the second connection based at least in part on the quality of service mapping configuration; and routing traffic from the second UE to the network entity via the relay connection based at least in part on the first quality of service and the second quality of service.

Aspect 2: The method of aspect 1, further comprising: receiving, from the second UE, a first request comprising an indication of a relay service code, wherein the first connection between the first UE and the second UE is associated with the relay service code; and establishing a unicast sidelink connection with the second UE based at least in part on receiving the relaying request, wherein the first connection comprises the unicast sidelink connection.

Aspect 3: The method of aspect 2, further comprising: transmitting, to the network entity, an assistance information comprising the indication of the relay connection and a quality of service indicator request for the first interface of the first connection.

Aspect 4: The method of any of aspects 1 through 3, wherein the first quality of service configuration corresponds to a first quality of service indicator, and the second quality of service configuration corresponds to a second quality of service indicator.

Aspect 5: The method of any of aspects 1 through 4, further comprising: generating a mapping between the first interface and the second interface based at least in part on the quality of service mapping configuration; and determining, based at least in part on the generated mapping, a first indicator associated with the first interface, or a second indicator associated with the second interface, or both, wherein the first indicator is determined for the relay connection for services that have been switched from a connection between the second UE and an additional network entity to the relay connection and the second indicator is determined for the connection between the second UE and the additional network entity for services that have been switched from the relay connection to the connection between the second UE and the additional network entity.

Aspect 6: The method of any of aspects 1 through 5, further comprising: receiving, from the network entity, the quality of service mapping configuration in a registration policy message as part of a registration procedure, a protocol data unit (PDU) session establishment response message, a PDU session modification response message, or a combination thereof.

Aspect 7: The method of any of aspects 1 through 6, wherein the quality of service mapping configuration is preconfigured in the first UE.

Aspect 8: The method of any of aspects 1 through 7, further comprising: determining a first quality of service indicator for the first interface, a second quality of service indicator for the second interface, or both.

Aspect 9: The method of aspect 8, further comprising: determining the first quality of service indicator, the second quality of service indicator, or both based at least in part on an end-to-end quality of service for the relay connection.

Aspect 10: The method of any of aspects 8 through 9, wherein the first quality of service indicator, the second quality of service indicator, or both are indicative of a quality of service identifier associated with a resource type, a priority level, a packet delay budget, a packet error rate, an averaging window duration, a maximum data burst volume, or a combination thereof, for different types of services.

Aspect 11: The method of any of aspects 1 through 10, wherein receiving the quality of service mapping configuration message comprises: receiving a Radio Resource Control (RRC) reconfiguration message comprising the quality of service mapping configuration message; and modifying the first connection based at least in part on the RRC reconfiguration message.

Aspect 12: The method of aspect 11, further comprising: generating a mapping configuration between the first interface and the second interface based at least in part on the RRC reconfiguration message.

Aspect 13: The method of aspect 12, wherein the mapping configuration comprises a mapping between quality of service flow identifiers for each interface, logical channel identifiers for each interface, or a combination thereof.

Aspect 14: The method of any of aspects 1 through 13, further comprising: determining a change in a quality of service for the first interface of the first connection; transmitting, to the base station, assistance information indicating the determined change; and receiving, from the base station, a modified quality of service configuration for the first interface, for the second interface, or both, based at least in part on the transmitted assistance information.

Aspect 15: The method of aspect 14, further comprising: receiving, from the second UE, a reception link performance indication for the first connection, wherein the change in the quality of service is determined based at least in part on the reception link performance indication.

Aspect 16: The method of any of aspects 1 through 15, wherein the first interface comprises a PC5 interface; and the second interface comprises a Uu interface.

Aspect 17: A method for wireless communications at a first network entity, comprising: receiving, from a second network entity, a quality of service mapping configuration comprising a first configuration associated with a first interface of a first connection and a second configuration associated with a second interface of a second connection; receiving, from a first UE, a request comprising a relay service code associated with the first connection between the first UE and a second UE and an indication of a relay connection for the second UE via the first UE, the relay connection comprising the first connection between the first UE and the second UE and the second connection between the first UE and the first network entity; transmitting, to the first UE, a configuration message based at least in part on the quality of service mapping configuration, the configuration message comprising the first configuration and the second configuration; and communicating with the second UE via the first UE on the relay connection.

Aspect 18: The method of aspect 17, further comprising: transmitting, to a network device, the request comprising the relay service code associated with the first connection.

Aspect 19: The method of aspect 18, wherein the request comprising the relay service code is forwarded from the first UE to the network device.

Aspect 20: The method of aspect 18, wherein the request comprising the relay service code is transmitted to the network device via an N2 reference interface.

Aspect 21: The method of any of aspects 17 through 20, further comprising: determining a first quality of service indicator for the first interface, a second quality of service indicator for the second interface, or both.

Aspect 22: A method for wireless communications at a first network entity, comprising: receiving, from a second network entity, a request comprising a relay service code associated with a first connection between a first UE and a second UE and an indication of a relay connection for the second UE via the first UE, the relay connection comprising the first connection between the first UE and the second UE and a second connection between the first UE and the second network entity; transmitting, to a session management function of the first network entity, a message indicating a support for a relay service code for the relay connection; receiving, from the session management function of the first network entity, a quality of service mapping configuration for mapping a first quality of service configuration associated with a first interface to a second quality of service configuration associated with a second interface, or for mapping the second quality of service configuration associated with the second interface to the first quality of service configuration associated with the first interface, or a combination thereof; and transmitting, to the second network entity, an indication of a quality of service configuration for the relay connection, the quality of service configuration comprising a first configuration associated with the first interface for the first connection and a second configuration associated with the second interface for the second connection.

Aspect 23: The method of aspect 22, further comprising: determining a first quality of service indicator for the first interface, a second quality of service indicator for the second interface, or both.

Aspect 24: The method of aspect 23, wherein the first quality of service indicator, the second quality of service indicator, or both are determined based at least in part on an end-to-end quality of service for the relay connection.

Aspect 25: The method of any of aspects 22 through 24, wherein determining the quality of service configuration further comprises: determining the first UE is authorized for supporting the relay service code based at least in part on a set of policy and charging control rules, wherein the quality of service configuration is determined based at least in part on the first UE being authorized to support the relay service code.

Aspect 26: A method for wireless communications at a second UE, comprising: receiving, from a first network entity, a quality of service mapping configuration message, the quality of service mapping configuration message comprising a mapping between a first interface of a first connection between a first UE and the second UE and a second interface of a second connection between the first UE and a second network entity, the first connection associated with a relay service code; configuring a quality of service of the first connection based at least in part on the quality of service mapping configuration message; and communicating with the second network entity via the first UE using the first connection based at least in part on the configured quality of service.

Aspect 27: The method of aspect 26, further comprising: determining one or more first quality of service indicators associated with the first interface for the first connection to use for services that have been switched from a connection between the second UE and the first network entity to the first connection; or determining one or more second quality of service indicators associated with the second interface for the connection between the second UE and the first network entity to use for services that have been switched from the first connection to the connection between the second UE and the first network entity.

Aspect 28: The method of aspect 27, wherein the one or more first quality of service indicators comprise one or more PC5 specific quality of service indicators, one or more PC5 specific quality of service identifiers, or a combination thereof, and the one or more second quality of service indicators comprise one or more Uu specific quality of service indicators, one or more Uu specific quality of service identifiers, or a combination thereof.

Aspect 29: The method of any of aspects 26 through 28, wherein receiving the quality of service mapping configuration message comprises: receiving, from the first network entity, a registration policy message as part of a registration procedure, a protocol data unit (PDU) session establishment response message, a PDU session modification response message, or a combination thereof indicating the quality of service mapping configuration message.

Aspect 30: The method of any of aspects 26 through 29, wherein the quality of service mapping configuration message is associated with a relay service or a group of relay services.

Aspect 31: A method for wireless communications at a first UE, comprising: establishing a first connection between the first UE and a second UE, the first connection associated with a relay service code; transmitting, to a base station, a request comprising the relay service code and an indication of a relay connection for the second UE via the first UE, the relay connection comprising the first connection between the first UE and the second UE and a second connection between the first UE and the base station; receiving, from the base station, a configuration message in response to transmitting the request, the configuration message comprising a first configuration associated with a first interface of the first connection and a second configuration associated with a second interface of the second connection; determining a quality of service configuration based at least in part on the first configuration and the second configuration; and routing traffic from the second UE to the base station via the relay connection based at least in part on the quality of service configuration.

Aspect 32: The method of aspect 31, wherein establishing the first connection between the first UE and the second UE comprises: receiving, from the second UE, a relaying request comprising an indication of the relay service code; and establishing a unicast sidelink connection with the second UE based at least in part on receiving the relaying request.

Aspect 33: The method of aspect 32, further comprising: transmitting, to the base station, an assistance information comprising the indication of the relay connection and a quality of service indicator request for the first interface of the first connection.

Aspect 34: The method of any of aspects 32 through 33, wherein the first connection comprises the unicast sidelink connection.

Aspect 35: The method of any of aspects 31 through 34, further comprising: determining a mapping configuration for a first indicator associated with the first interface to a second indicator associated with the second interface, for the second indicator associated with the second interface to the first indicator associated with the first interface, or a combination thereof, wherein the request transmitted to the base station further comprises the mapping configuration.

Aspect 36: The method of aspect 35, further comprising: generating a mapping between the first interface and the second interface based at least in part on the mapping configuration, wherein the mapping is used to determine the first indicator for the relay connection for services that have been switched from a connection between the second UE and an additional base station to the relay connection, the second indicator for the connection between the second UE and the additional base station for services that have been switched from the relay connection to the connection between the second UE and the additional base station, or a combination thereof.

Aspect 37: The method of any of aspects 35 through 36, further comprising: receiving, from the base station, the mapping configuration in a registration policy message as part of a registration procedure, a protocol data unit (PDU) session establishment response message, a PDU session modification response message, or a combination thereof.

Aspect 38: The method of any of aspects 35 through 37, wherein the mapping configuration is preconfigured in the first UE.

Aspect 39: The method of any of aspects 31 through 38, further comprising: determining a first quality of service indicator for the first interface, a second quality of service indicator for the second interface, or both.

Aspect 40: The method of aspect 39, wherein the first quality of service indicator, the second quality of service indicator, or both are determined based at least in part on an end-to-end quality of service for the relay connection.

Aspect 41: The method of any of aspects 39 through 40, wherein the first quality of service indicator, the second quality of service indicator, or both are indicative of a quality of service identifier associated with a resource type, a priority level, a packet delay budget, a packet error rate, an averaging window duration, a maximum data burst volume, or a combination thereof for different types of services.

Aspect 42: The method of any of aspects 31 through 41, wherein receiving the configuration message comprises: receiving a Radio Resource Control (RRC) reconfiguration message comprising the configuration message; and modifying the first connection based at least in part on the RRC reconfiguration message.

Aspect 43: The method of aspect 42, further comprising: generating a mapping configuration between the first interface and the second interface based at least in part on the RRC reconfiguration message.

Aspect 44: The method of aspect 43, wherein the mapping configuration comprises a mapping between quality of service flow identifiers for each interface, logical channel identifiers for each interface, or a combination thereof.

Aspect 45: The method of any of aspects 31 through 44, further comprising: determining a change in a quality of service for the first interface of the first connection; transmitting, to the base station, assistance information indicating the determined change; and receiving, from the base station, a modified quality of service configuration for the first interface, for the second interface, or both, based at least in part on the transmitted assistance information.

Aspect 46: The method of aspect 45, further comprising: receiving, from the second UE, a reception link performance indication for the first connection, wherein the change in the quality of service is determined based at least in part on the reception link performance indication.

Aspect 47: The method of any of aspects 31 through 46, wherein the first interface comprises a PC5 interface; and the second interface comprises a Uu interface.

Aspect 48: The method of any of aspects 31 through 47, further comprising: establishing a unicast link with the second UE, wherein the relay connection is established based at least in part on establishing the unicast link.

Aspect 49: The method of any of aspects 31 through 48, wherein the request comprises a protocol data unit (PDU) session establishment request or a PDU session modification request.

Aspect 50: A method for wireless communications at a base station, comprising: receiving, from a first UE, a request comprising a relay service code associated with a first connection between the first UE and a second UE and an indication of a relay connection for the second UE via the first UE, the relay connection comprising the first connection between the first UE and the second UE and a second connection between the first UE and the base station; determining a quality of service configuration for the relay connection, the quality of service configuration comprising a first configuration associated with a first interface of the first connection and a second configuration associated with a second interface of the second connection; transmitting, to the first UE, a configuration message based at least in part on determining the quality of service configuration, the configuration message comprising the first configuration and the second configuration; and communicating with the second UE via the first UE on the relay connection based at least in part on the determined quality of service configuration.

Aspect 51: The method of aspect 50, further comprising: transmitting, to a network device, the request comprising the relay service code associated with the first connection.

Aspect 52: The method of aspect 51, wherein the request comprising the relay service code is forwarded from the first UE to the network device.

Aspect 53: The method of aspect 51, wherein the request comprising the relay service code is transmitted to the network device via an N2 reference interface.

Aspect 54: The method of any of aspects 50 through 53, wherein determining the quality of service configuration comprises: receiving, from a network device, an indication of the quality of service configuration.

Aspect 55: The method of aspect 54, wherein the indication of the quality of service configuration is received in a protocol data unit (PDU) session request during PDU session establishment or modification.

Aspect 56: The method of any of aspects 50 through 55, further comprising: determining a first quality of service indicator for the first interface, a second quality of service indicator for the second interface, or both.

Aspect 57: The method of aspect 56, wherein the first quality of service indicator, the second quality of service indicator, or both are determined based at least in part on an end-to-end quality of service for the relay connection.

Aspect 58: The method of any of aspects 56 through 57, wherein the first quality of service indicator, the second quality of service indicator, or both are indicative of a quality of service identifier associated with a resource type, a priority level, a packet delay budget, a packet error rate, an averaging window duration, a maximum data burst volume, or a combination thereof for different types of services.

Aspect 59: The method of any of aspects 50 through 58, further comprising: determining to modify a quality of service for the first interface of the first connection based at least in part on the quality of service configuration; and transmitting, to the first UE, an indication of the modified quality of service.

Aspect 60: The method of any of aspects 50 through 59, further comprising: determining a mapping configuration for a first indicator associated with the first interface to a second indicator associated with the second interface, wherein the request transmitted to the base station further comprises the mapping configuration; and transmitting, to the first UE, the second UE, or both, the mapping configuration in a registration policy message as part of a registration procedure, a protocol data unit (PDU) session establishment response message, a PDU session modification response message, or a combination thereof.

Aspect 61: The method of aspect 60, wherein determining the mapping configuration comprises: receiving the mapping configuration from a network device.

Aspect 62: The method of any of aspects 50 through 61, further comprising: receiving, from the first UE, assistance information indicating a change in a quality of service for the first interface of the first connection; and transmitting, to the first UE, a modified quality of service configuration for the first interface, for the second interface, or both, based at least in part on the received assistance information.

Aspect 63: The method of any of aspects 50 through 62, wherein the first interface comprises a PC5 interface; and the second interface comprises a Uu interface.

Aspect 64: The method of any of aspects 50 through 63, wherein the request comprises a protocol data unit (PDU) session establishment request, or a PDU session modification request, or a sidelink assistance information message from the first UE, the second UE, or both.

Aspect 65: The method of any of aspects 50 through 64, wherein the configuration message comprises a Radio Resource Control (RRC) reconfiguration message.

Aspect 66: A method for wireless communications at a network device, comprising: receiving, from a base station and at an access and mobility management function of the network device, a request comprising a relay service code associated with a first connection between a first UE and a second UE and an indication of a relay connection for the second UE via the first UE, the relay connection comprising the first connection between the first UE and the second UE and a second connection between the first UE and the base station; transmitting, to a session management function of the network device, a message indicating a support for the relay service code; determining a quality of service configuration for the relay connection, the quality of service configuration comprising a first configuration associated with a first interface of the first connection and a second configuration associated with a second interface of the second connection; and transmitting, to the base station, an indication of the quality of service configuration.

Aspect 67: The method of aspect 66, further comprising: determining a first quality of service indicator for the first interface, a second quality of service indicator for the second interface, or both.

Aspect 68: The method of aspect 67, wherein the first quality of service indicator, the second quality of service indicator, or both are determined based at least in part on an end-to-end quality of service for the relay connection.

Aspect 69: The method of any of aspects 67 through 68, wherein the first quality of service indicator, the second quality of service indicator, or both are indicative of a quality of service identifier associated with a resource type, a priority level, a packet delay budget, a packet error rate, an averaging window duration, a maximum data burst volume, or a combination thereof for different types of services.

Aspect 70: The method of any of aspects 66 through 69, wherein determining the quality of service configuration further comprises: determining the first UE is authorized for supporting the relay service code based at least in part on a set of policy and charging control rules, wherein the quality of service configuration is determined based at least in part on the first UE being authorized to support the relay service code.

Aspect 71: The method of any of aspects 66 through 70, wherein transmitting the message indicating the support for the relay service code comprises: transmitting, to the session management function of the network device, a network slice management function message comprising the support for the relay service code.

Aspect 72: The method of any of aspects 66 through 71, further comprising: performing a quality of service modification procedure based at least in part on a change in a quality of service for the first connection, the second connection, or both.

Aspect 73: The method of any of aspects 66 through 72, wherein the indication of the quality of service configuration comprises a protocol data unit (PDU) session establishment request or a PDU session modification request.

Aspect 74: The method of any of aspects 66 through 73, wherein the indication of the quality of service configuration comprises an end-to-end quality of service configuration for the first connection and the second connection.

Aspect 75: A method for wireless communications at a second UE, comprising: establishing a first connection between a first UE and the second UE, the first connection associated with a relay service code; receiving, from a first base station, a mapping configuration message, the mapping configuration message comprising a mapping between a first interface of the first connection and a second interface of a second connection between the first UE and a second base station; determining a quality of service configuration based at least in part on the mapping configuration message; and communicating with the second base station via the first UE using the first connection based at least in part on the quality of service configuration.

Aspect 76: The method of aspect 75, further comprising: determining one or more first quality of service indicators for the first connection to use for services that have been switched from a connection between the second UE and the first base station to the first connection, one or more second quality of service indicators for the second interface for the connection between the second UE and the first base station to use for services that have been switched from the first connection to the connection between the second UE and the first base station, or a combination thereof.

Aspect 77: The method of aspect 76, wherein the one or more first quality of service indicators comprise one or more PC5 specific quality of service indicators, one or more PC5 specific quality of service identifiers, or a combination thereof, and the one or more second quality of service indicators comprise one or more Uu specific quality of service indicators, one or more Uu specific quality of service identifiers, or a combination thereof.

Aspect 78: The method of any of aspects 75 through 77, wherein receiving the mapping configuration message comprises: receiving, from the first base station, a registration policy message as part of a registration procedure, a protocol data unit (PDU) session establishment response message, a PDU session modification response message, or a combination thereof indicating the mapping configuration message.

Aspect 79: The method of any of aspects 75 through 78, wherein the first interface comprises a PC5 interface; and the second interface comprises a Uu interface.

Aspect 80: An apparatus for wireless communications at a first UE, comprising a processor; and memory coupled to the processor, the processor and memory configured to perform a method of any of aspects 1 through 16.

Aspect 81: An apparatus for wireless communications at a first UE, comprising at least one means for performing a method of any of aspects 1 through 16.

Aspect 82: A non-transitory computer-readable medium storing code for wireless communications at a first UE, the code comprising instructions executable by a processor to perform a method of any of aspects 1 through 16.

Aspect 83: An apparatus for wireless communications at a first network entity, comprising a processor; and memory coupled to the processor, the processor and memory configured to perform a method of any of aspects 17 through 21.

Aspect 84: An apparatus for wireless communications at a first network entity, comprising at least one means for performing a method of any of aspects 17 through 21.

Aspect 85: A non-transitory computer-readable medium storing code for wireless communications at a first network entity, the code comprising instructions executable by a processor to perform a method of any of aspects 17 through 21.

Aspect 86: An apparatus for wireless communications at a first network entity, comprising a processor; and memory coupled to the processor, the processor and memory configured to perform a method of any of aspects 22 through 25.

Aspect 87: An apparatus for wireless communications at a first network entity, comprising at least one means for performing a method of any of aspects 22 through 25.

Aspect 88: A non-transitory computer-readable medium storing code for wireless communications at a first network entity, the code comprising instructions executable by a processor to perform a method of any of aspects 22 through 25.

Aspect 89: An apparatus for wireless communications at a second UE, comprising a processor; and memory coupled to the processor, the processor and memory configured to perform a method of any of aspects 26 through 30.

Aspect 90: An apparatus for wireless communications at a second UE, comprising at least one means for performing a method of any of aspects 26 through 30.

Aspect 91: A non-transitory computer-readable medium storing code for wireless communications at a second UE, the code comprising instructions executable by a processor to perform a method of any of aspects 26 through 30.

Aspect 92: An apparatus for wireless communications at a first UE, comprising a processor; and memory coupled to the processor, the processor and memory configured to perform a method of any of aspects 31 through 49.

Aspect 93: An apparatus for wireless communications at a first UE, comprising at least one means for performing a method of any of aspects 31 through 49.

Aspect 94: A non-transitory computer-readable medium storing code for wireless communications at a first UE, the code comprising instructions executable by a processor to perform a method of any of aspects 31 through 49.

Aspect 95: An apparatus for wireless communications at a base station, comprising a processor; and memory coupled to the processor, the processor and memory configured to perform a method of any of aspects 50 through 65.

Aspect 96: An apparatus for wireless communications at a base station, comprising at least one means for performing a method of any of aspects 50 through 65.

Aspect 97: A non-transitory computer-readable medium storing code for wireless communications at a base station, the code comprising instructions executable by a processor to perform a method of any of aspects 50 through 65.

Aspect 98: An apparatus for wireless communications at a network device, comprising a processor; and memory coupled to the processor, the processor and memory configured to perform a method of any of aspects 66 through 74.

Aspect 99: An apparatus for wireless communications at a network device, comprising at least one means for performing a method of any of aspects 66 through 74.

Aspect 100: A non-transitory computer-readable medium storing code for wireless communications at a network device, the code comprising instructions executable by a processor to perform a method of any of aspects 66 through 74.

Aspect 101: An apparatus for wireless communications at a second UE, comprising a processor; and memory coupled to the processor, the processor and memory configured to perform a method of any of aspects 75 through 79.

Aspect 102: An apparatus for wireless communications at a second UE, comprising at least one means for performing a method of any of aspects 75 through 79.

Aspect 103: A non-transitory computer-readable medium storing code for wireless communications at a second UE, the code comprising instructions executable by a processor to perform a method of any of aspects 75 through 79. It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
   transmitting, to a network entity, an indication for a relay connection for a second UE via the first UE, the relay connection comprising a first connection between the first UE and the second UE and a second connection between the first UE and the network entity;
   receiving, from the network entity, a quality of service mapping configuration for mapping a first quality of service configuration associated with a first interface to a second quality of service configuration associated with a second interface, or for mapping the second quality of service configuration associated with the second interface to the first quality of service configuration associated with the first interface, or a combination thereof, the quality of service mapping configuration indicating a data radio bearer associated with the relay connection;
   generating a mapping between the first interface and the second interface based at least in part on the quality of service mapping configuration;
   determining, based at least in part on the generated mapping, a first indicator associated with the first interface, or a second indicator associated with the second interface, or both;
   configuring a first quality of service of the first connection and a second quality of service of the second connection based at least in part on the quality of service mapping configuration and the first indicator, the second indicator, or both; and
   routing traffic from the second UE to the network entity via the relay connection based at least in part on the first quality of service and the second quality of service.

2. The method of claim 1, further comprising:
   receiving, from the second UE, a first request comprising an indication of a relay service code, wherein the first connection between the first UE and the second UE is associated with the relay service code; and
   establishing a unicast sidelink connection with the second UE based at least in part on receiving the first request, wherein the first connection comprises the unicast sidelink connection.

3. The method of claim 2, further comprising:
   transmitting, to the network entity, an assistance information comprising the indication of the relay connection and a second request for the first interface of the first connection.

4. The method of claim 1, wherein the first quality of service configuration corresponds to a first quality of service indicator, and the second quality of service configuration corresponds to a second quality of service indicator.

5. The method of claim 1, wherein determining the first indicator associated with the first interface, or the second indicator associated with the second interface, or both further comprises:
   determining, based at least in part on the generated mapping, the first indicator associated with the first interface, or the second indicator associated with the second interface, or both, wherein the first indicator is determined for the relay connection for services that have been switched from a connection between the second UE and an additional network entity to the relay connection and the second indicator is determined for the connection between the second UE and the additional network entity for services that have been switched from the relay connection to the connection between the second UE and the additional network entity.

6. The method of claim 1, further comprising:
   receiving, from the network entity, the quality of service mapping configuration in a registration policy message as part of a registration procedure, a protocol data unit (PDU) session establishment response message, a PDU session modification response message, or a combination thereof.

7. The method of claim 1, wherein the quality of service mapping configuration is preconfigured in the first UE.

8. The method of claim 1, further comprising:
determining a first quality of service indicator for the first interface, a second quality of service indicator for the second interface, or both.

9. The method of claim 8, further comprising:
determining the first quality of service indicator, the second quality of service indicator, or both based at least in part on an end-to-end quality of service for the relay connection.

10. The method of claim 8, wherein the first quality of service indicator, the second quality of service indicator, or both are indicative of a quality of service identifier associated with a resource type, a priority level, a packet delay budget, a packet error rate, an averaging window duration, a maximum data burst volume, or a combination thereof, for different types of services.

11. The method of claim 1, wherein receiving the quality of service mapping configuration message comprises:
receiving a Radio Resource Control (RRC) reconfiguration message comprising the quality of service mapping configuration message; and
modifying the first connection based at least in part on the RRC reconfiguration message.

12. The method of claim 11, further comprising:
generating a mapping configuration between the first interface and the second interface based at least in part on the RRC reconfiguration message.

13. The method of claim 12, wherein the mapping configuration comprises a mapping between quality of service flow identifiers for each interface, logical channel identifiers for each interface, or a combination thereof.

14. The method of claim 1, further comprising:
determining a change in a quality of service for the first interface of the first connection;
transmitting, to the network entity, assistance information indicating the determined change; and
receiving, from the network entity, a modified quality of service configuration for the first interface, for the second interface, or both, based at least in part on the transmitted assistance information.

15. The method of claim 14, further comprising:
receiving, from the second UE, a reception link performance indication for the first connection, wherein the change in the quality of service is determined based at least in part on the reception link performance indication.

16. The method of claim 1, wherein:
the first interface comprises a PC5 interface; and
the second interface comprises a Uu interface.

17. A method for wireless communications at a first network entity, comprising:
receiving, from a second network entity, a quality of service mapping configuration comprising a first configuration associated with a first interface of a first connection and a second configuration associated with a second interface of a second connection;
receiving, from a first user equipment (UE), a request comprising a relay service code associated with the first connection between the first UE and a second UE and an indication of a relay connection for the second UE via the first UE, the relay connection comprising the first connection between the first UE and the second UE and the second connection between the first UE and the first network entity;
determining a first quality of service indicator associated with the first interface, a second quality of service indicator associated with the second interface, or both;
transmitting, to the first UE, a configuration message based at least in part on the quality of service mapping configuration and the first indicator, the second indicator, or both, the configuration message comprising the first configuration, the second configuration, and an indication of a data radio bearer associated with the relay connection; and
communicating with the second UE via the first UE on the data radio bearer associated with the relay connection.

18. The method of claim 17, further comprising:
transmitting, to a network device, the request comprising the relay service code associated with the first connection.

19. The method of claim 18, wherein the request comprising the relay service code is forwarded from the first UE to the network device.

20. The method of claim 18, wherein the request comprising the relay service code is transmitted to the network device via an N2 reference interface.

21. A method for wireless communications at a first network entity, comprising:
receiving, from a second network entity, a request comprising a relay service code associated with a first connection between a first user equipment (UE) and a second UE and an indication of a relay connection for the second UE via the first UE, the relay connection comprising the first connection between the first UE and the second UE and a second connection between the first UE and the second network entity;
transmitting, to a session management function of the first network entity, a message indicating a support for a relay service code for the relay connection;
receiving, from the session management function of the first network entity, a quality of service mapping configuration for mapping a first quality of service configuration associated with a first interface to a second quality of service configuration associated with a second interface, or for mapping the second quality of service configuration associated with the second interface to the first quality of service configuration associated with the first interface, or a combination thereof; and
transmitting, to the second network entity, an indication of a quality of service configuration for the relay connection, the quality of service configuration comprising a first configuration associated with the first interface for the first connection and a second configuration associated with the second interface for the second connection.

22. The method of claim 21, further comprising:
determining a first quality of service indicator for the first interface, a second quality of service indicator for the second interface, or both.

23. The method of claim 22, wherein the first quality of service indicator, the second quality of service indicator, or both are determined based at least in part on an end-to-end quality of service for the relay connection.

24. The method of claim 21, wherein determining the quality of service configuration further comprises:
determining the first UE is authorized for supporting the relay service code based at least in part on a set of policy and charging control rules, wherein the quality of service configuration is determined based at least in part on the first UE being authorized to support the relay service code.

25. A method for wireless communications at a second user equipment (UE), comprising:
- receiving, from a first network entity, a quality of service mapping configuration message, the quality of service mapping configuration message comprising a mapping between a first interface of a first connection between a first UE and the second UE and a second interface of a second connection between the first UE and a second network entity, the first connection associated with a relay service code and a data radio bearer;
- determining one or more first quality of service indicators associated with the first interface, one or more second quality of service indicators associated with the second interface, or both;
- configuring a quality of service of the first connection based at least in part on the quality of service mapping configuration message and the one or more first quality of service indicators, the one or more second quality of service indicators, or both; and
- communicating with the second network entity via the first UE using the data radio bearer associated with the first connection based at least in part on the configured quality of service.

26. The method of claim 25, wherein determining the one or more first quality of service indicators associated with the first interface, the one or more second quality of service indicators associated with the second interface, or both further comprise:
- determining the one or more first quality of service indicators associated with the first interface for the first connection to use for services that have been switched from a connection between the second UE and the first network entity to the first connection; or
- determining the one or more second quality of service indicators associated with the second interface for the connection between the second UE and the first network entity to use for services that have been switched from the first connection to the connection between the second UE and the first network entity.

27. The method of claim 25, wherein the one or more first quality of service indicators comprise one or more PC5 specific quality of service indicators, one or more PC5 specific quality of service identifiers, or a combination thereof, and the one or more second quality of service indicators comprise one or more Uu specific quality of service indicators, one or more Uu specific quality of service identifiers, or a combination thereof.

28. The method of claim 25, wherein receiving the quality of service mapping configuration message comprises:
- receiving, from the first network entity, a registration policy message as part of a registration procedure, a protocol data unit (PDU) session establishment response message, a PDU session modification response message, or a combination thereof indicating the quality of service mapping configuration message.

29. The method of claim 25, wherein the quality of service mapping configuration message is associated with a relay service or a group of relay services.

* * * * *